(12) United States Patent
Kubo et al.

(10) Patent No.: US 8,031,280 B2
(45) Date of Patent: *Oct. 4, 2011

(54) LIQUID CRYSTAL DISPLAY DEVICE

(75) Inventors: Masumi Kubo, Ikoma (JP); Akihiro Yamamoto, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/805,548

(22) Filed: Aug. 5, 2010

(65) Prior Publication Data

US 2010/0309400 A1    Dec. 9, 2010

Related U.S. Application Data

(63) Continuation of application No. 10/560,340, filed as application No. PCT/JP2004/008423 on Jun. 9, 2004, now Pat. No. 7,791,676.

(30) Foreign Application Priority Data

Jun. 11, 2003 (JP) ................................. 2003-166930

(51) Int. Cl.
*G02F 1/1343* (2006.01)

(52) U.S. Cl. .......................................... 349/38; 349/146

(58) Field of Classification Search ........................ None
See application file for complete search history.

(56) References Cited

U.S. PATENT DOCUMENTS

| | | |
|---|---|---|
| 5,777,700 A | 7/1998 | Kaneko et al. |
| 6,081,315 A | 6/2000 | Matsuyama et al. |
| 6,115,089 A | 9/2000 | Hayashi |
| 6,195,140 B1 | 2/2001 | Kubo et al. |
| 6,278,503 B1 | 8/2001 | Nishikawa et al. |
| 6,424,397 B1 | 7/2002 | Kuo |
| 6,665,041 B2 | 12/2003 | Liao et al. |
| 6,707,511 B2 | 3/2004 | Kim et al. |
| 6,710,825 B2 | 3/2004 | Kubo et al. |
| 6,710,837 B1 | 3/2004 | Song et al. |
| 6,788,375 B2 | 9/2004 | Ogishima et al. |
| 6,862,062 B2 | 3/2005 | Kubo et al. |

(Continued)

FOREIGN PATENT DOCUMENTS

JP    2000-310793    11/2000

(Continued)

OTHER PUBLICATIONS

U.S. Appl. No. 10/560,340, filed Dec. 12, 2005; Kubo et al.

(Continued)

*Primary Examiner* — Lucy Chien
(74) *Attorney, Agent, or Firm* — Nixon & Vanderhye P.C.

(57) ABSTRACT

A liquid crystal display device of the present invention includes a picture element electrode in a first substrate on the liquid crystal layer side in each picture element region, and a counter electrode in a second substrate opposing the picture element electrode via the liquid crystal layer. In each picture element region, the picture element electrode includes a solid portion including multiple unit solid portions; and the liquid crystal layer is in a vertical orientation state with no voltage, and upon voltage application, forms a liquid crystal domain taking a radially-inclined orientation in positional correspondence with each unit solid portion by an oblique electric field produced near the unit solid portion. The liquid crystal display device further includes a storage capacitor connected electrically in parallel to a liquid crystal capacitor, and the storage capacitor is at least partially located in an area with no solid portion of the first substrate.

25 Claims, 27 Drawing Sheets

U.S. PATENT DOCUMENTS

| | | |
|---|---|---|
| 6,924,876 B2 | 8/2005 | Kubo et al. |
| 6,950,160 B2 | 9/2005 | Kubo et al. |
| 6,965,422 B2 | 11/2005 | Kubo et al. |
| 7,154,569 B2 * | 12/2006 | Lee et al. .................. 349/48 |
| 7,375,781 B2 | 5/2008 | Kubo |
| 7,505,102 B2 | 3/2009 | Kubo et al. |
| 7,791,676 B2 | 9/2010 | Kubo et al. |
| 2001/0048499 A1 | 12/2001 | Numano et al. |
| 2001/0052889 A1 | 12/2001 | Fukunishi |
| 2002/0036740 A1 | 3/2002 | Kubo et al. |
| 2002/0036744 A1 | 3/2002 | Kubo et al. |
| 2002/0075436 A1 | 6/2002 | Kubo et al. |
| 2002/0080320 A1 | 6/2002 | Suzuki et al. |
| 2002/0105509 A1 | 8/2002 | Johnson et al. |
| 2003/0107695 A1 | 6/2003 | Kubo et al. |
| 2004/0041770 A1 | 3/2004 | Kubo et al. |
| 2004/0201810 A1 | 10/2004 | Kubo et al. |
| 2005/0001947 A1 | 1/2005 | Ogishima et al. |
| 2005/0001964 A1 | 1/2005 | Kubo et al. |
| 2005/0168674 A1 | 8/2005 | Kubo |
| 2005/0174528 A1 | 8/2005 | Kubo et al. |
| 2005/0237463 A1 | 10/2005 | Kubo |

FOREIGN PATENT DOCUMENTS

| | | |
|---|---|---|
| JP | 2002-303887 | 10/2002 |

OTHER PUBLICATIONS

English translation of the International Preliminary Report on Patentability mailed May 11, 2006 in corresponding PCT application No. PCT/JP2004/008423.

International Search Report for PCT/JP2004/008423 dated Aug. 31, 2004 (English and Japanese).

* cited by examiner (a)

(b)

(a)

(b)

(c)

(d)

(a)

(b)

(c)

(a)

(b)

(c)

(a)

14A
14b'
14a
14b (b)

14B
14b'
14a
14b (a)

(b)

(a)

(b)

(a)

(b)

(a) s=2.75 μm
(b) s=2.25 μm (a)

(b)

(a)

(b)

(a)

(b)

(a)

(b)

(c)

(a)

(b)

(a)

(b)

(c)

(d)

(a)

(b)

LIQUID CRYSTAL DISPLAY DEVICE

This application is a Continuation of application Ser. No. 10/560,340, filed Dec. 12, 2005 now U.S. Pat. No. 7,791,676, which is a National Phase of PCT/JP2004/008423 filed Jun. 9, 2004, which designates the United States, and claims priority to JP 2003-166930 filed Jun. 11, 2003, the entire contents of which are all hereby incorporated herein by reference in this application.

TECHNICAL FIELD

The present invention relates to a liquid crystal display device, and more particularly to a liquid crystal display device having a wide viewing angle characteristic and providing a high quality display.

BACKGROUND ART

In recent years, thin and lightweight liquid crystal display devices have been used as personal computer displays and display sections of mobile information terminal devices. However, conventional twisted nematic (TN) type and super twisted nematic (STN) type liquid crystal display devices have a problem of narrow viewing angle. Various technical developments have been undertaken to solve the problem.

A typical technique for improving the viewing angle characteristic of a TN or STN type liquid crystal display device is to add an optical compensation plate. Another approach is to employ a transverse electric field mode, in which an electric field horizontal with respect to the substrate surface is applied across the liquid crystal layer. Transverse electric field mode liquid crystal display devices have been mass-produced and attracting public attention in recent years. Still another technique is to employ a DAP (deformation of vertical aligned phase) mode, in which a nematic liquid crystal material having a negative dielectric anisotropy is used as a liquid crystal material and a vertical alignment film is used as an alignment film. This is a type of ECB (electrically controlled birefringence) mode, in which the transmittance is controlled by using the birefringence of liquid crystal molecules.

While the transverse electric field mode is an effective approach to improve the viewing angle, the production process thereof imposes a significantly narrower production margin than that of a normal TN type device. This arises a problem that it is difficult to realize stable production of the device. Such a narrow production margin is imposed because the display brightness or the contrast ratio is significantly influenced by variations in the gap between the substrates or a shift in the direction of the transmission axis (polarization axis) of a polarization plate with respect to the orientation axis of the liquid crystal molecules. It requires further technical developments to precisely control these factors and thus to realize stable production of the device.

In order to realize a uniform display without roughness with a DAP mode liquid crystal display device, alignment control is necessary. Alignment control can be provided by, for example, subjecting the surface of an alignment film to rubbing. However, rubbing is not suitable for mass-production because when a vertical alignment film is subjected to rubbing, rubbing streaks are likely to appear in the displayed image.

In view of this, the present inventors, along with others, has proposed the following technique (Japanese Laid-Open Patent Publication No. 2003-043525): A predetermined electrode structure including an opening and a solid portion is formed in one of a pair of electrodes opposing each other with a liquid crystal layer interposed therebetween, and a plurality of liquid crystal domains each taking a radially-inclined orientation are formed in the opening and the solid portion by an oblique electric field produced in an edge portion of the opening. Using this technique, the liquid crystal domains taking a radially-inclined orientation are formed stably and highly continuously, which can improve the viewing angle characteristic and the display quality.

However, as liquid crystal display devices become increasingly common, higher display characteristics are demanded therefor. A still higher numerical aperture is desired for realizing a brighter display.

DISCLOSURE OF INVENTION

In order to overcome the problems described above, the present invention provide a liquid crystal display device having a wide viewing angle characteristic, providing a high display quality, and realizing a bright display.

A liquid crystal display device according to the present invention comprises a first substrate, a second substrate, and a liquid crystal layer provided between the first substrate and the second substrate and has a plurality of picture element regions. The first substrate includes a picture element electrode provided on the side of the liquid crystal layer, the picture element electrode being provided in each of the plurality of picture element regions, and a switching element electrically connected to the picture element electrode. The second substrate includes a counter electrode opposing the picture element electrode with the liquid crystal layer interposed therebetween. In each of the plurality of picture element regions, the picture element electrode includes a solid portion including a plurality of unit solid portions; and the liquid crystal layer is in a vertical orientation state when no voltage is applied between the picture element electrode and the counter electrode, and when a voltage is applied between the picture element electrode and the counter electrode, forms a liquid crystal domain taking a radially-inclined orientation in a region corresponding to each of the plurality of unit solid portions by an oblique electric field produced in the vicinity of each of the plurality of unit solid portions of the picture element electrode. The liquid crystal display device further comprises, in each of the plurality of picture element regions, a storage capacitor connected electrically in parallel to a liquid crystal capacitor which includes the picture element electrode, the counter electrode, and the liquid crystal layer. In each of the plurality of picture element regions, the first substrate has an area where no solid portion of the picture element electrode is provided. At least a part of the storage capacitor is located in the area of the first substrate where no solid portion is provided. Owing to this, the above-described objective is achieved.

In one preferred embodiment, the switching element is a thin film transistor.

In one preferred embodiment, the storage capacitor includes a storage capacitor line, a storage capacitor electrode opposing the storage capacitor line and electrically connected to a drain electrode of the thin film transistor, and a first insulating layer provided between the storage capacitor line and the storage capacitor electrode.

In one preferred embodiment, at least a part of the storage capacitor line, at least a part of the storage capacitor electrode, and at least a part of the first insulating layer are located in the area.

In one preferred embodiment, the first substrate includes a scanning line electrically connected to a gate electrode of the thin film transistor and a signal line electrically connected to a source electrode of the thin film transistor.

In one preferred embodiment, the storage capacitor line includes at least one line stem extending generally parallel to the scanning line and a line branch branched from the at least one line stem; and the storage capacitor electrode includes at least one electrode stem opposing the at least one line stem with the first insulating layer interposed therebetween and an electrode branch branched from the at least one electrode stem.

In one preferred embodiment, the line branch and the electrode branch are branched so as to overlap a central portion of one of the plurality of unit solid portions or the vicinity thereof.

In one preferred embodiment, the at least one line stem is a plurality of line stems, and the at least one electrode stem is a plurality of electrode stems.

Preferably, the first substrate further includes a second insulating layer for covering at least the thin film transistor and the storage capacitor electrode; and the picture element electrode is provided on the second insulating layer.

Preferably, the second insulating layer is formed of a resin material.

Preferably, the plurality of unit solid portions each have a shape having rotational symmetry.

In one preferred embodiment, the plurality of unit solid portions each have a generally circular shape.

In one preferred embodiment, the plurality of unit solid portions each have a generally rectangular shape with generally arc-shaped corners.

In one preferred embodiment, the plurality of unit solid portions each have a shape with acute corners.

Preferably, the plurality of unit solid portions have substantially the same shape and substantially the same size as one another, and form at least one unit lattice arranged to have rotational symmetry.

In one preferred embodiment, the picture element electrode further has at least one opening, and the liquid crystal layer forms a liquid crystal domain taking a radially-inclined orientation in a region corresponding to the at least one opening by the oblique electric field when a voltage is applied between the picture element electrode and the counter electrode.

Preferably, the at least one opening includes a plurality of openings having substantially the same shape and substantially the same size as one another, and at least some of the plurality of openings forms at least one unit lattice arranged to have rotational symmetry.

Preferably, each of the at least the some of the plurality of openings has a shape having rotational symmetry.

In one preferred embodiment, each of the at least the some of the plurality of openings has a generally circular shape.

Preferably, in each of the plurality of picture element regions, a sum of area sizes of the plurality of openings of the picture element electrode is smaller than an area size of the solid portion of the picture element electrode.

In one preferred embodiment, the liquid crystal display device according to the present invention further comprises a protrusion provided in each of the plurality of openings of the picture element electrode. The protrusion has the same cross-sectional shape as that of the plurality of openings in a planar direction, and a side surface of the protrusion exerts an orientation-regulating force acting upon the liquid crystal molecules in the liquid crystal layer in the same direction as an orientation-regulating direction provided by the oblique electric field.

In one preferred embodiment, the first substrate may further include a dielectric layer provided on one surface of the first electrode, the one surface being farther from the liquid crystal layer, and a further electrode opposing at least a part of the at least one opening of the first electrode with the dielectric layer interposed therebetween.

In one preferred embodiment, the second substrate has an orientation-regulating structure in an area corresponding to each of the plurality of unit solid portions, the orientation-regulating structure exerting an orientation-regulating force for placing the liquid crystal molecules in the liquid crystal layer into a radially-inclined orientation at least in a state where a voltage is applied between the picture element electrode and the counter electrode.

Preferably, the orientation-regulating structure is provided in an area corresponding to a central portion of each of the plurality of unit solid portions or the vicinity thereof.

Preferably, in the liquid crystal domain formed in correspondence with each of the plurality of unit solid portions, the orientation-regulating direction provided by the orientation-regulating structure is in conformity with the direction of the radially-inclined orientation provided by the oblique electric field.

In one preferred embodiment, the orientation-regulating structure exerts an orientation-regulating force even in a state where no voltage is applied between the picture element electrode and the counter electrode.

In one preferred embodiment, the orientation-regulating structure is a protrusion included in the counter substrate and protruding toward the liquid crystal layer.

In one preferred embodiment, a part of the storage capacitor overlaps the orientation-regulating structure.

In one preferred embodiment, the liquid crystal domain takes a spiral radially-inclined orientation.

Another liquid crystal display device according to the present invention comprises a first substrate, a second substrate, and a liquid crystal layer provided between the first substrate and the second substrate; and has a plurality of picture element regions. The first substrate includes a picture element electrode provided on the side of the liquid crystal layer, the picture element electrode being provided in each of the plurality of picture element regions, and a switching element electrically connected to the picture element electrode. The second substrate includes a counter electrode opposing the picture element electrode with the liquid crystal layer interposed therebetween. In each of the plurality of picture element regions, the picture element electrode has at least one opening or slit; and the liquid crystal layer is in a vertical orientation state when no voltage is applied between the picture element electrode and the counter electrode, and when a voltage is applied between the picture element electrode and the counter electrode, is orientation-regulated by an oblique electric field produced in an edge portion of the at least one opening or slit of the picture element electrode. The liquid crystal display device further comprises, in each of the plurality of picture element regions, a storage capacitor connected electrically in parallel to a liquid crystal capacitor which includes the picture element electrode, the counter electrode, and the liquid crystal layer. At least a part of the storage capacitor overlaps the at least one opening or slit of the picture element electrode.

In one preferred embodiment, the switching element is a thin film transistor.

In one preferred embodiment, the storage capacitor includes a storage capacitor line, a storage capacitor electrode opposing the storage capacitor line and electrically connected to a drain electrode of the thin film transistor, and a first insulating layer provided between the storage capacitor line and the storage capacitor electrode.

Preferably, the first substrate further includes a second insulating layer for covering at least the thin film transistor and the storage capacitor electrode; and the picture element electrode is provided on the second insulating layer.

Preferably, the second insulating layer is formed of a resin material.

In one preferred embodiment, the at least one opening or slit is a plurality of slit.

In one preferred embodiment, the second substrate includes a plurality of ribs provided in an area corresponding to an area of the picture element electrode which is between the plurality of slits.

Alternatively, the counter electrode has a plurality of further slits provided in an area corresponding to an area of the picture element electrode which is between the plurality of slits.

Hereinafter, the functions of the present invention will be described.

In a liquid crystal display device according to the present invention, a picture element electrode provided in each picture element region has a solid portion including a plurality of unit solid portions. The liquid crystal layer is in a vertical orientation state in the absence of an applied voltage. In the presence of an applied voltage, the liquid crystal layer forms a plurality of liquid crystal domains taking a radially-inclined orientation by an oblique electric field produced in the vicinity of each of the plurality of unit solid portions. Namely, the external shape of the picture element electrode is defined such that, when a voltage is applied between the picture element electrode and the counter electrode, an oblique electric field is produced in the vicinity of the unit solid portions and thus the liquid crystal domains taking a radially-inclined orientation are formed. The liquid crystal layer is typically formed of a liquid crystal material having a negative dielectric anisotropy, and is orientation-regulated by a vertical alignment layer provided at both ends thereof (for example, a vertical alignment film).

The liquid crystal domains obtained by the oblique electric field are formed in regions corresponding to the unit solid portions. A display is realized by the orientation in liquid crystal domains changing in accordance with the voltage. Each liquid crystal domain takes a radially-inclined orientation and thus takes an orientation having a high degree of rotational symmetry. Therefore, the viewing angle dependence of the display quality is low, and a wide viewing angle characteristic is realized.

A portion of the picture element electrode where a conductive film is provided is referred to as a "solid portion", and a portion of the solid portion where an electric field for forming one liquid crystal domain is produced is referred to as a "unit solid portion". A unit solid portion is typically formed of a continuous conductive film.

In a liquid crystal display device according to the present invention, at least a part of the storage capacitor is located in an area of the picture element electrode with no solid portion. Therefore, the effective numerical aperture (transmittance) is suppressed from being lowered due to the storage capacitor typically including a light-shielding member, and thus the size of the area in the solid portion contributing to the display can be increased. As a result, a bright display is realized.

In order to sufficiently increase the numerical aperture, it is preferable that a largest possible part of the storage capacitor is located in an area with no solid portion. Specifically, preferably at least ¼ of, more preferably at least ½ of, and still more preferably almost the entirety of, the storage capacitor is located in an area with no solid portion.

As the switching element electrically connected to the picture element electrode, a thin film transistor, for example, is usable.

Typically, the storage capacitor includes a storage capacitor line, a storage capacitor electrode opposing the storage capacitor line and electrically connected to a drain electrode of the thin film transistor, and a first insulating layer provided between the storage capacitor line and the storage capacitor electrode. At least a part of the storage capacitor line, at least a part of the storage capacitor electrode, and at least a part of the dielectric layer are located in the area with no solid portion.

One of a pair of substrates opposing each other with the liquid crystal layer interposed therebetween typically includes a scanning line electrically connected to a gate electrode of the thin film transistor and a signal line electrically connected to a source electrode of the thin film transistor.

Since the storage capacitor line and the storage capacitor electrode has a branch structure, a high degree of freedom is provided regarding the arrangement of the storage capacitor in the picture element region. As a result, a sufficiently high effective numerical aperture can be obtained while a sufficient value capacitance is guaranteed. Specifically, the storage capacitor line includes at least one line stem extending generally parallel to the scanning line and a line branch branched from the at least one line stem. The storage capacitor electrode includes at least one electrode stem opposing the at least one line stem with the first insulating layer interposed therebetween and an electrode branch branched from the at least one electrode stem. The above effect is provided by such a structure. The line branch and the electrode branch are, for example, branched so as to overlap the center of each unit solid portion or the vicinity thereof.

Where the storage capacitor line includes a plurality of line stems and the storage capacitor electrode includes a plurality of electrode stems, the degree of designing freedom is further enhanced. Thus, a larger part of the storage capacitor can be located in an area with no solid portion, and the liquid crystal display device can be designed to have a higher numerical aperture.

In one arrangement, the substrate including the picture element electrode includes a second insulating layer for covering at least the thin film transistor and the storage capacitor electrode, and the picture element electrode is provided on the second insulating layer. With this arrangement, the picture element electrode can be provided so as to partially overlap the thin film transistor or the lines. Thus, the numerical aperture can be still increased.

In order to produce an oblique electric field having a sufficient strength to obtain a radially-inclined orientation, the second insulating layer is preferably a thick film. The storage capacitor electrode included in the storage capacitor is electrically connected to the drain electrode of the thin film transistor, and has substantially the same potential as that of the solid portion of the picture element electrode. Therefore, if a part of the storage capacitor electrode is located in an area with no solid portion, the equipotential line produced upon application of a voltage does not sufficiently drop at the area with no solid portion. As a result, a sufficiently strong oblique electric field may not be produced in the vicinity of the unit solid portion. Where the second insulating layer is a thick film, the voltage drop caused by the second insulating layer can be sufficiently large, and thus the equipotential line can sufficiently drop at the area with no solid portion. As a result, a sufficiently strong oblique electric field can be produced in the vicinity of the unit solid portion. Also where the second insulating layer is a thick film, one surface of the second insulating layer which is closer to the liquid crystal layer can be substantially flat. This prevents the solid portion of the picture element electrode formed on the surface from being stepped. In order to obtain a sufficiently stable radially-inclined orientation, the second insulating layer has a specific thickness of preferably 1 µm or greater, and more preferably 2.5 µm or greater.

The second insulating layer is easily formed to be a thick film by using a resin material (for example, a photosensitive transparent resin material such as an acrylic resin).

Where the shape of the unit solid portion (the shape as viewed in a direction normal to a substrate) has rotational symmetry, the stability of the radially-inclined orientation of the liquid crystal domain formed in a region corresponding to the unit solid portion can be improved. In order to reduce the viewing angle dependence of the liquid crystal domain, the shape of the unit solid portion preferably has a high degree of rotational symmetry (preferably with at least a two-fold rotation axis, and more preferably with at least a four-fold rotation axis).

Where the shape of the unit solid portion is generally circular or generally elliptical, the continuity of the liquid crystal molecules taking a radially-inclined orientation is increased, and thus the stability of the orientation is improved.

By contrast, where the shape of the unit solid portion is generally rectangular, the area size ratio of the unit solid portion with respect to the picture element region (effective numerical aperture) is increased. Therefore, the optical characteristics (for example, the transmittance) against the voltage applied across the liquid crystal layer is increased.

Where the shape of the unit solid portion is generally rectangular with arc-shaped corners, both the orientation stability and the optical characteristics can be increased.

Where the unit solid portion has a shape with acute corners (for example, a generally star-like shape), the number of edges of the electrode for producing an oblique electric field is increased. Therefore, the oblique electric field can act on a greater number of liquid crystal molecules. As a result, the response speed is increased.

In one arrangement, a plurality of unit solid portions have substantially the same shape and substantially the same size as one another, and form at least one unit lattice arranged to have rotational symmetry. With this arrangement, a plurality of liquid crystal domains can be arranged at a high degree of symmetry using the unit lattice as the unit. Therefore, the viewing angle dependence of the display quality can be alleviated. Where the entirety of the picture element region is divided into unit lattices, the orientation in the liquid crystal layer can be stabilized throughout the picture element region. For example, a plurality of unit solid portions can be arranged such that the centers of unit solid portions form a square lattice.

The picture element electrode may further have at least one opening. Where the picture element electrode has an opening, a great number of unit solid portions can be easily formed and thus a great number of liquid crystal domains can be easily formed in the picture element region.

Where the opening is provided, a liquid crystal domain taking a radially-inclined orientation can be formed even in a region corresponding to the opening by an oblique electric field produced in the vicinity of the unit solid portion, i.e., in edge portions of the opening. The liquid crystal domain formed above the unit solid portion and the liquid crystal domain formed above the opening are formed by the oblique electric field. Therefore, these liquid crystal domains are adjacent to each other and alternately located. The orientations of the liquid crystal molecules in the adjacent liquid crystal domains are essentially continuous with each other. Accordingly, no disclination line is generated between the liquid crystal domain formed above the opening and the liquid crystal domain formed above the solid portion. The display quality does not decline due to the disclination line, and the stability of the orientation of the liquid crystal molecules is high.

Where the liquid crystal molecules take a radially-inclined orientation in a region corresponding to the opening as well as a region corresponding to the solid portion of the picture element electrode, the orientation continuity of the liquid crystal molecules is high. Thus, a stable orientation is realized and a uniform display without roughness is obtained. Especially, in order to realize a good response characteristic (high response speed), it is preferable that the oblique electric field for controlling the orientation of the liquid crystal molecules acts on a great number of liquid crystal molecules. For realizing this, it is preferable to form a great number of openings (edge portions). When liquid crystal domains taking a stable radially-inclined orientation are formed in correspondence with the openings, a decline in the display quality (generation of roughness), which could be caused by forming a great number of openings in order to improve the response characteristic, can be suppressed.

In the case where a liquid crystal domain taking a radially-inclined orientation is formed in correspondence with the solid portion (unit solid portion), the orientation continuity of the liquid crystal molecules in the picture element region is obtained even if the liquid crystal domain formed in correspondence with the opening does not take a radially-inclined orientation. Therefore, the radially-inclined orientation of the liquid crystal domain formed in correspondence with the solid portion is stabilized. Especially when the area size of the opening is small, the contribution of the opening to the display is also small. Therefore, even if the liquid crystal domain taking a radially-inclined orientation is not formed in correspondence with the opening, the display quality does not decline to a problematic level.

In one arrangement, at least some of the plurality of openings have substantially the same shape and substantially the same size as one another and forms at least one unit lattice arranged to have rotational symmetry. With this arrangement, a plurality of liquid crystal domains can be arranged at a high degree of symmetry using the unit lattice as the unit. Therefore, the viewing angle dependence of the display quality can be alleviated. Where the entire picture element region is divided into unit lattices, the orientation of the liquid crystal molecules can be stabilized throughout the picture element region. For example, the openings can be arranged such that the centers thereof form a square lattice.

Where at least some of the plurality of openings (typically, the openings forming a unit lattice) each have a shape having rotational symmetry (as viewed in a direction normal a substrate), the stability of the radially-inclined orientation of the liquid crystal domains formed above the openings can be improved. In order to reduce the viewing angle dependence of the liquid crystal domain, the shape of the openings preferably has a high degree of rotational symmetry (preferably with at least a two-fold rotation axis, and more preferably with at least a four-fold rotation axis).

The shape of the opening (as viewed in a direction normal to a substrate) is, for example, generally circular or generally polygonal (for example, square).

It is preferable that in each of the plurality of picture element regions, a sum of area sizes of the openings formed in the picture element electrode is smaller than an area size of the solid portion. As the area size of the solid portion is larger, the area size of the liquid crystal layer directly influenced by the electric field produced by the electrode (defined in the plane as viewed in a direction normal to a substrate) is larger. Therefore, the optical characteristics (for example, the transmittance) against the voltage applied across the liquid crystal layer is increased.

Which of the arrangement having generally circular openings or the arrangement having generally circular unit solid portions should be adopted can be determined based on in which arrangement the area size of the solid portion can be increased. A preferred arrangement is appropriately selected depending on the pitch of the picture element. Typically, when the pitch exceeds about 25 µm, it is preferable that the opening is formed such that the solid portion is generally circular. When the pitch is equal to or less than about 25 µm, it is preferable that the opening is generally circular.

In order to increase the resistance against a stress, a protrusion having a side surface with an orientation-regulating force acting on the liquid crystal molecules in the liquid crystal layer in the same direction as the orientation-regulating direction provided by the above-mentioned oblique electric field may be provided in the opening of the electrode. The cross-sectional shape of the protrusion is the same as the shape of the opening. It is preferable that the shape of the protrusion has rotational symmetry, like the above-mentioned shapes of the opening. However, the liquid crystal molecules, the orientation of which is regulated by the orientation-regulating force of the side surface of the protrusion, do not easily respond to the voltage (the retardation change by the voltage is small). This can reduce the contrast ratio of the display. Accordingly, the size, height and number of the protrusions are preferably set so as not to reduce the display quality.

In the above-described electrode structure in which one of a pair of electrode has openings, a problem may arise that the light utilization factor is lowered. This occurs because a sufficient retardation change is not obtained due to a sufficient level of voltage not being applied across the regions of liquid crystal layer corresponding to the openings. This can be solved the following structure. A dielectric layer is provided on one surface of the electrode having the openings, the surface being farther from the liquid crystal layer, and another electrode is provided so as to oppose at least a part of each opening of the first electrode with the dielectric layer interposed therebetween (two-layer electrode). With such a structure, a sufficient level of voltage can be applied across the regions of the liquid crystal layer corresponding to the openings. As a result, the light utilization factor and the response characteristic can be improved.

A substrate opposing the substrate including the picture element electrode (counter substrate) may have an orientation-regulating structure in areas corresponding to the plurality of unit solid portions. The orientation-regulating structure exerts an orientation-regulating force for placing the liquid crystal molecules in the liquid crystal layer into a radially-inclined orientation at least in a state where a voltage is applied. In this case, the orientation-regulating force, provided by the picture element electrode having the unit solid portions and the orientation-regulating structure, acts on the liquid crystal molecules at least in the presence of an applied voltage. Therefore, the radially-inclined orientation of the liquid crystal domains is further stabilized, and a decline in the display quality caused by application of a stress to the liquid crystal layer (for example, generation of an after image) can be suppressed.

Where the orientation-regulating structure is provided in an area corresponding to the center of the unit solid portion or the vicinity thereof, the position of the central axis of the radially-inclined orientation can be fixed. Therefore, the resistance of the radially-inclined orientation against a stress is effectively improved.

In the liquid crystal domains formed in correspondence with the unit solid portions, the orientation-regulating direction provided by the orientation-regulating structure may be set to match the direction of the radially-inclined orientation provided by the oblique electric field. In this case, the orientation continuity and stability are increased. Thus, the display quality and the response characteristic are improved.

The orientation-regulating structure provides an effect of stabilizing the orientation as long as it exerts the orientation-regulating force at least in the presence of an applied voltage. In one arrangement, the orientation-regulating force is exerted even in the absence of an applied voltage. This arrangement has an advantage of stabilizing the orientation regardless of the level of the applied voltage. The orientation-regulating effect is provided even if the orientation-regulating force of the orientation-regulating structure is slightly weak. Therefore, the orientation can be sufficiently stabilized even with a structure which is small as compared to the size of the picture element. Since the orientation-regulating force of the orientation-regulating structure can be weaker than the orientation-regulating force of the picture element electrode including the unit solid portions, various arrangements can be used for the orientation-regulating structure.

The orientation-regulating structure is, for example, a protrusion protruding from a substrate toward the liquid crystal layer. The protrusion can exert an orientation-regulating force even in the absence of an applied voltage. Such a protrusion can be produced by a simple process, which is preferable in terms of productivity.

It should be noted that a vertical orientation liquid crystal layer, in which the liquid crystal molecules are substantially vertically oriented to the substrate surface in the absence of an applied voltage, is used. In this case, when the orientation-regulating structure exerting an orientation-regulating force even in the absence of an applied voltage is used, the display quality is declined. However, even a relatively weak orientation-regulating force of the orientation-regulating structure is effective. Therefore, the orientation can be sufficiently stabilized even with a structure which is small as compared to the picture element. Thus, the display quality in the absence of an applied voltage may not decline to a problematic level. Depending on the use of the liquid crystal display device (for example, the magnitude of stress externally applied) or the structure of the electrode (the strength of the orientation-regulating force provided by the picture element electrode), an orientation-regulating structure exerting a relatively strong orientation-regulating force is provided. In this case, a light-shielding layer may be provided in order to suppress the decline in the display quality caused by the orientation-regulating structure. In this case, a part of the storage capacitor may overlap the orientation-regulating structure so as to act as a light-shielding layer. With such a structure, a sufficiently large level of capacitance can guaranteed without reducing the brightness unnecessarily.

In one arrangement, the liquid crystal domains take a spiral radially-inclined orientation. With this arrangement, the orientation is further stabilized, and a uniform display without roughness is realized. The response speed is also increased. A spiral radially-inclined orientation is realized by, for example, a material obtained by adding a chiral agent to a nematic liquid crystal material having a negative dielectric anisotropy. Whether the spiral is clockwise or counterclockwise is determined by the type of chiral agent.

In another liquid crystal display device according to the present invention, a picture element electrode provided in each picture element region has an opening or a slit. The liquid crystal layer is in a vertical orientation state in the absence of an applied voltage. In the presence of an applied voltage, the liquid crystal layer is orientation-regulated by an oblique electric field produced in edge portions of each opening or slit. A display is realized in this manner. In this liquid crystal display device according to the present invention, at least a part of the storage capacitor overlaps the opening or slit of the picture element electrode. Therefore, the effective numerical aperture (transmittance) is suppressed from being lowered due to the storage capacitor typically including a light-shielding member, and thus the size of the area contributing to the display (the area of the picture element electrode where the conductive film is provided) can be increased. As a result, a bright display is realized.

In order to sufficiently increase the numerical aperture, it is preferable that a largest possible part of the storage capacitor overlaps the opening or slit. Specifically, preferably at least ¼ of, more preferably at least ½ of, and still more preferably almost the entirety of, the storage capacitor overlaps.

As the switching element electrically connected to the picture element electrode, a thin film transistor, for example, is usable.

Typically, the storage capacitor includes a storage capacitor line, a storage capacitor electrode opposing the storage capacitor line and electrically connected to a drain electrode of the thin film transistor, and a first insulating layer provided between the storage capacitor line and the storage capacitor electrode.

In one arrangement, the substrate including the picture element electrode further includes a second insulating layer for covering at least the thin film transistor and the storage capacitor electrode, and the picture element electrode is provided on the second insulating layer. With this arrangement, the picture element electrode can be provided so as to partially overlap the thin film transistor or the lines. Thus, the numerical aperture can be still increased.

In order to produce an oblique electric field having a sufficient strength to obtain a radially-inclined orientation, the second insulating layer is preferably a thick film. The storage capacitor electrode included in the storage capacitor is electrically connected to the drain electrode of the thin film transistor, and has substantially the same potential as that of the conductive film of the picture element electrode. Therefore, if a part of the storage capacitor electrode overlaps the opening or slit, the equipotential line produced upon application of a voltage does not sufficiently drop at the opening or slit. As a result, a sufficiently strong oblique electric field may not be produced in the edge portions of the opening or slit. Where the second insulating layer is a thick film, the voltage drop caused by the second insulating layer can be sufficiently large and thus the equipotential line can sufficiently drop at the opening or slit. As a result, a sufficiently strong oblique electric field can be produced in the edge portions of the opening or slit. Also where the second insulating layer is a thick film, one surface of the second insulating layer which is closer to the liquid crystal layer can be substantially flat. This prevents the picture element electrode formed on the surface from being stepped. In order to obtain a sufficiently strong orientation-regulating force, the second insulating layer has a specific thickness of preferably 1 μm or greater, and more preferably 2.5 μm or greater.

The second insulating layer is easily formed to be a thick film by using a resin material (for example, a photosensitive transparent resin material such as an acrylic resin).

BRIEF DESCRIPTION OF DRAWINGS

FIG. 1(a) and FIG. 1(b) schematically show a structure of one picture element region of a liquid crystal display device 100 according to the present invention, wherein FIG. 1(a) is a plan view, and FIG. 1(b) is a cross-sectional view taken along line 1B-1B' in FIG. 1(a).

FIG. 12(a) and FIG. 12(b) schematically show a structure of one picture element region of the liquid crystal display device 100 according to the present invention, wherein FIG. 12(a) is a plan view, and FIG. 12(b) is a cross-sectional view taken along line 12B-12B' in FIG. 12(a).

Figure 15:
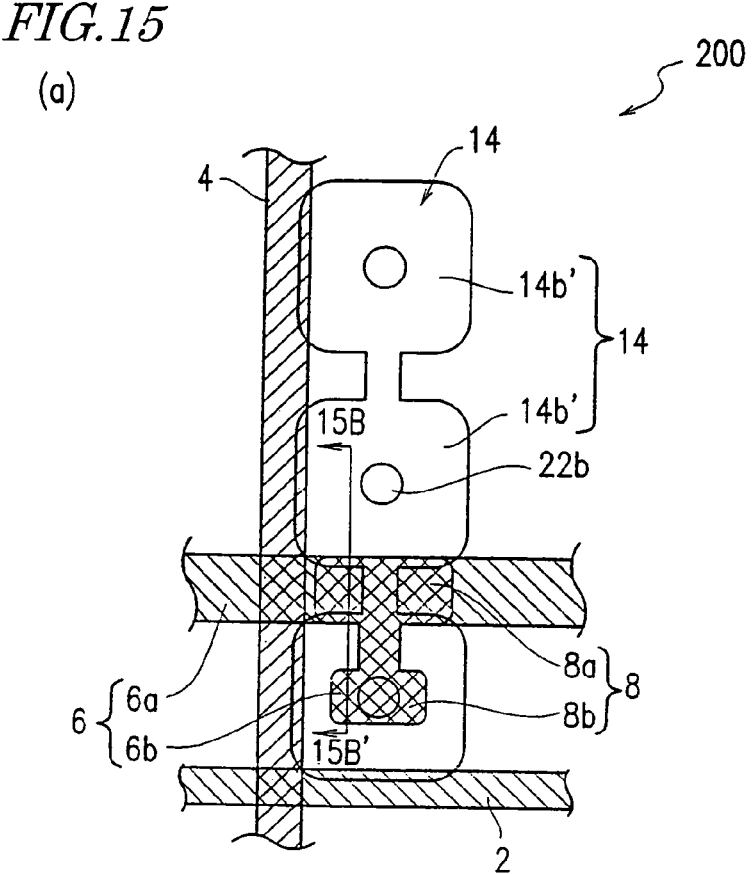
FIG. 15(a) and FIG. 15(b) schematically show a structure of one picture element region of another liquid crystal display device 200 according to the present invention, wherein FIG.
Figure 15:
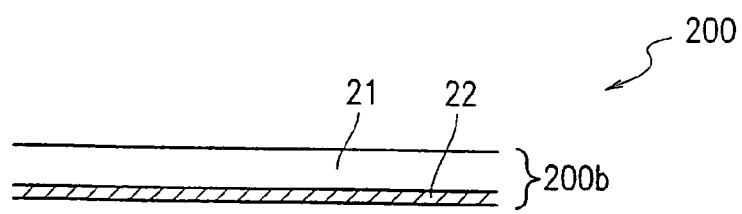
Figure 15:
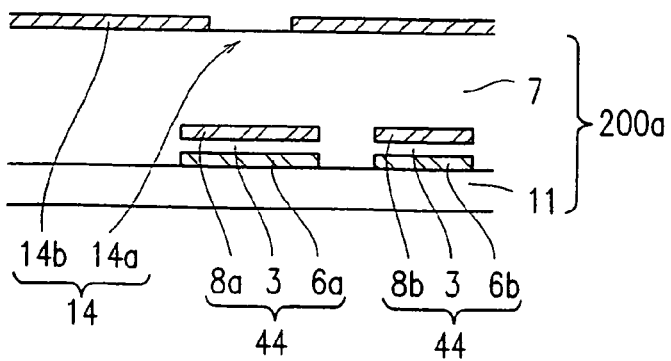

15(*a*) is a plan view, and FIG. 15(*b*) is a cross-sectional view taken along line 15B-15B' in FIG. 15(*a*).

Figure 16:
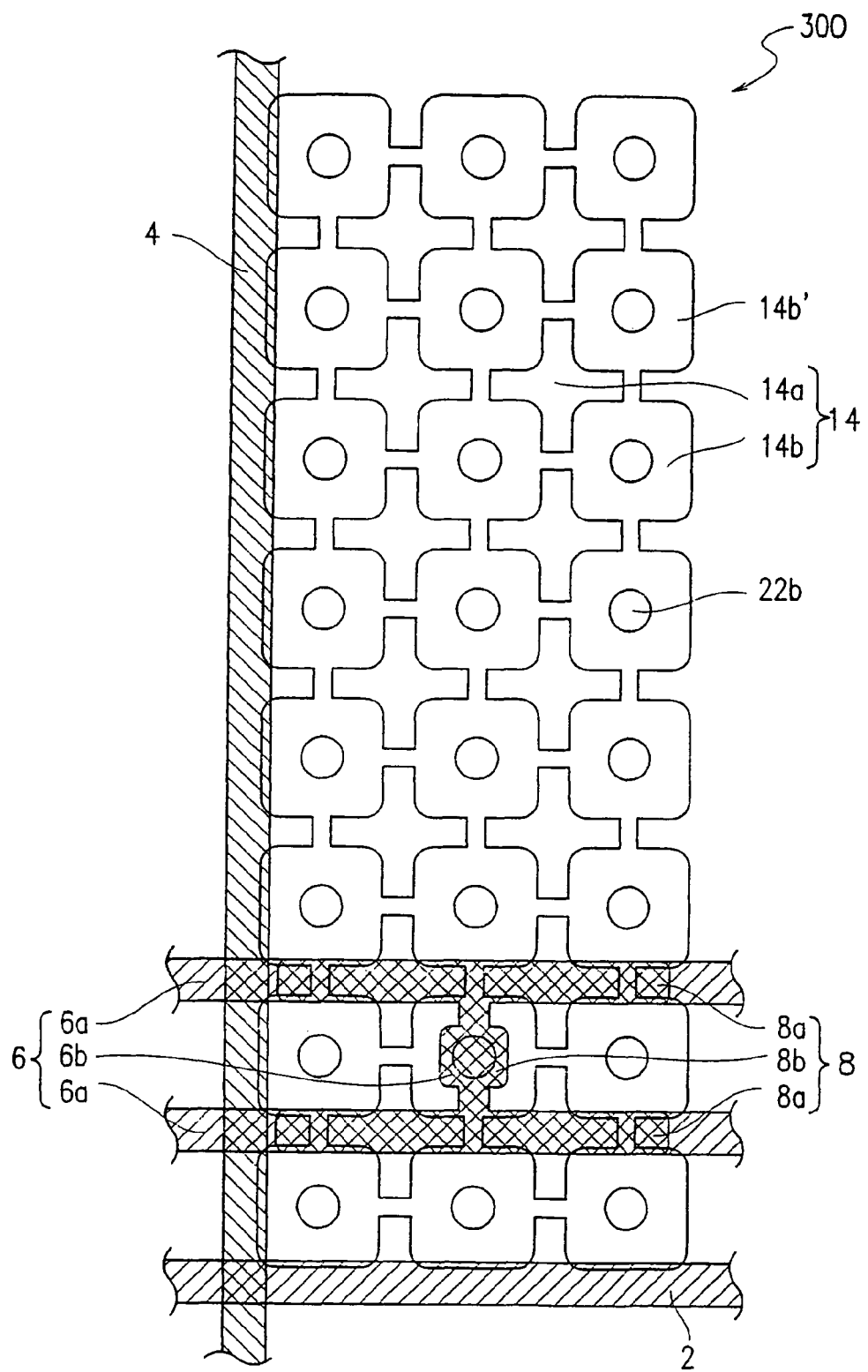

FIG. 16 schematically shows a structure of one picture element region of still another liquid crystal display device 300 according to the present invention.

Figure 17:
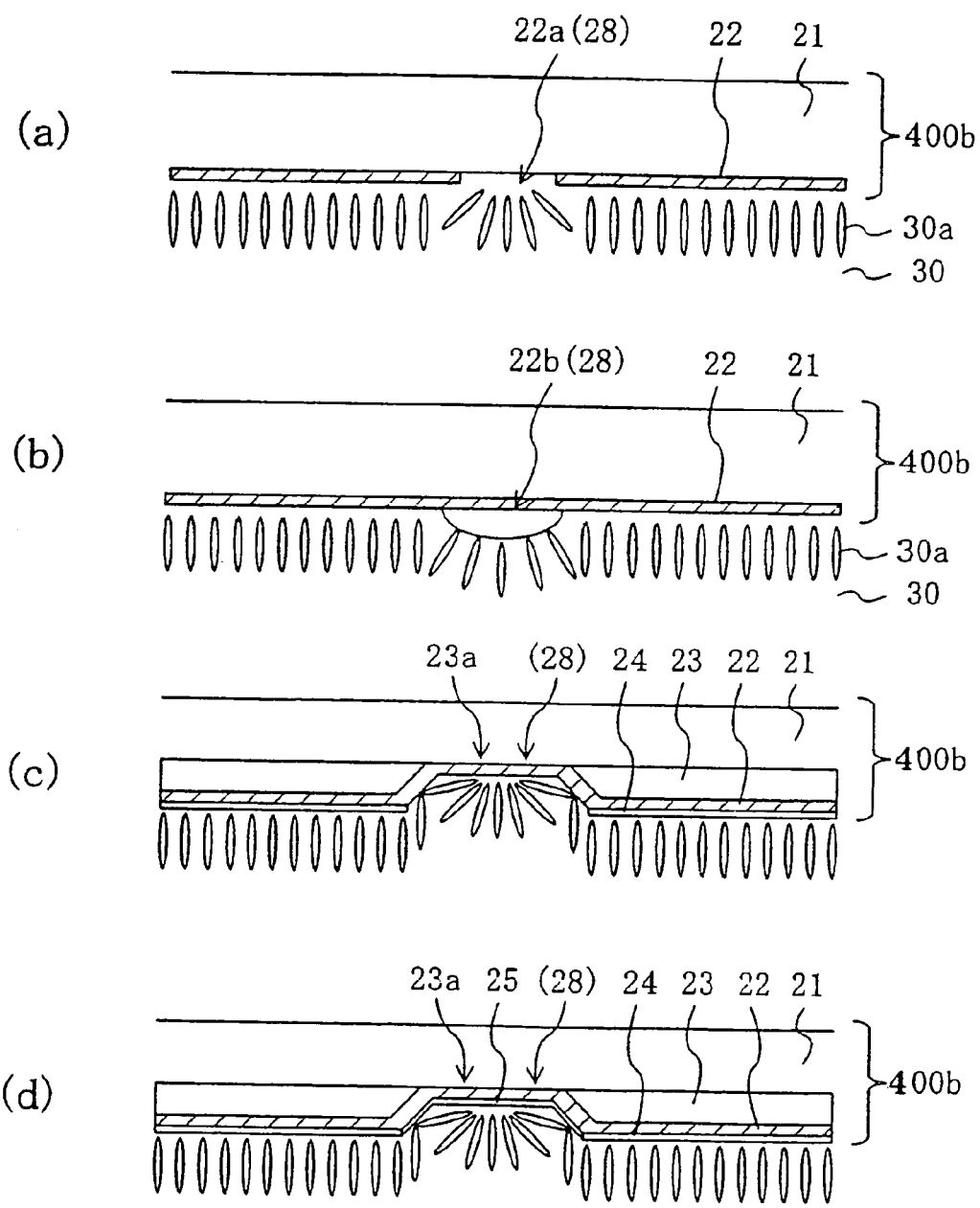

FIG. 17(*a*) through FIG. 17(*d*) schematically show a counter substrate 400*b* having an orientation-regulating structure 28.

Figure 18:
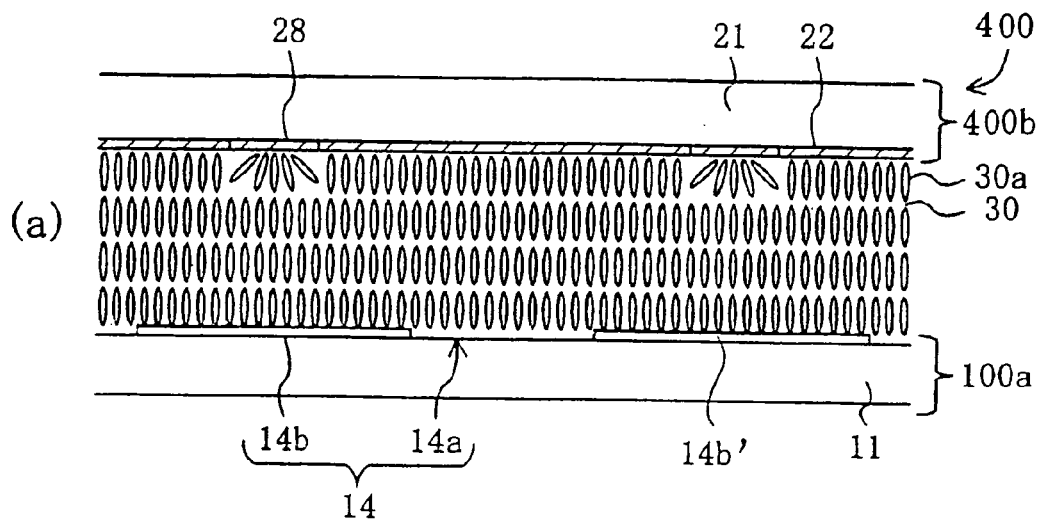
Figure 18:
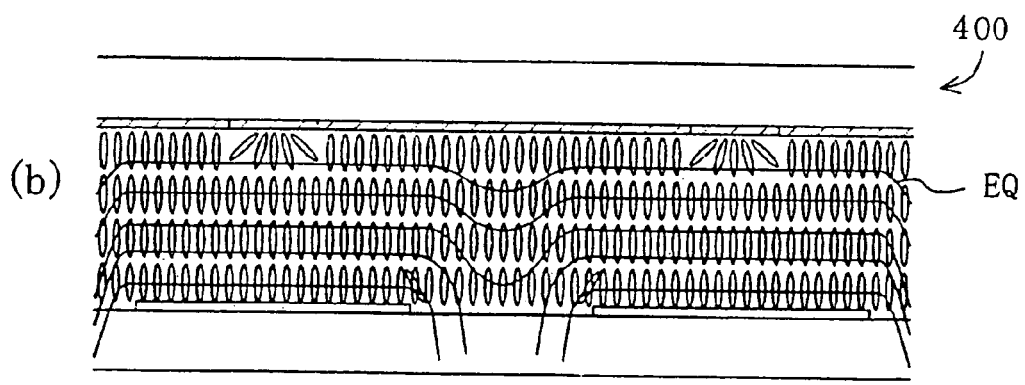
Figure 18:
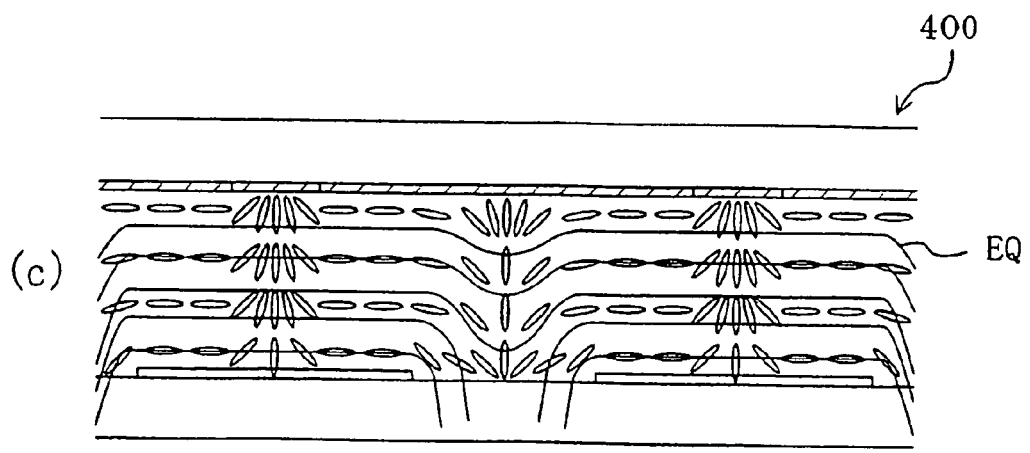

FIG. 18(*a*), FIG. 18(*b*) and FIG. 18(*c*) schematically show a cross-sectional structure of one picture element region of a liquid crystal display device 400 having an orientation-regulating structure, wherein FIG. 18(*a*) shows a state in the absence of an applied voltage, FIG. 18(*b*) shows a state where the orientation has just started to change (initial ON state), and FIG. 18(*c*) shows a steady state.

Figure 19:
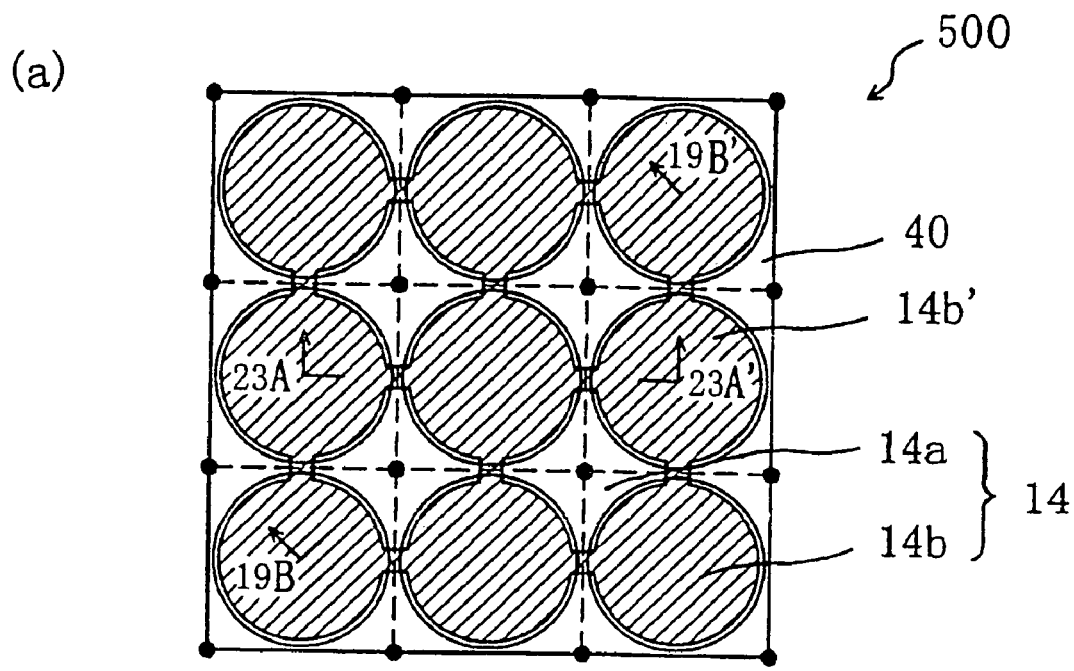
Figure 19:
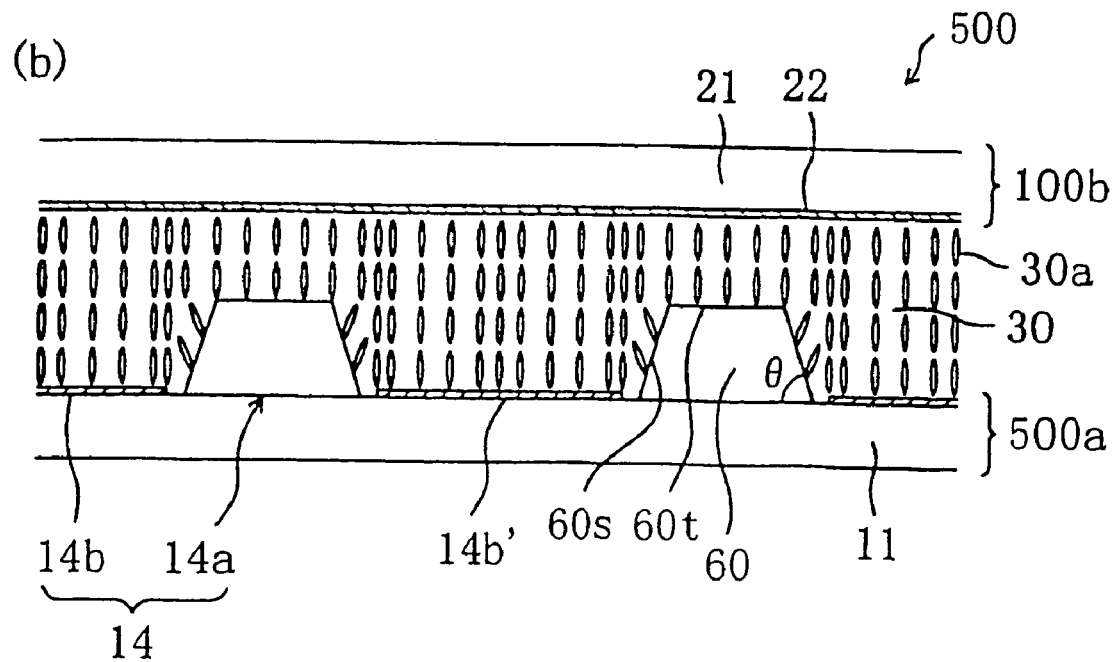

FIG. 19(*a*) and FIG. 19(*b*) schematically show a structure of one picture element region of still another liquid crystal display device 500 according to the present invention, wherein FIG. 19(*a*) is a plan view, and FIG. 19(*b*) is a cross-sectional view taken along line 19B-19B' in FIG. 19(*a*).

Figure 20:
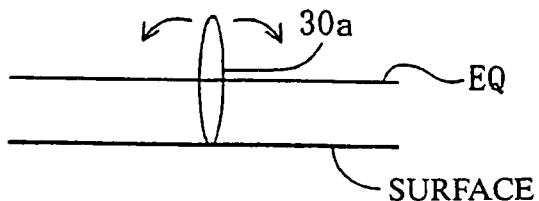
Figure 20:
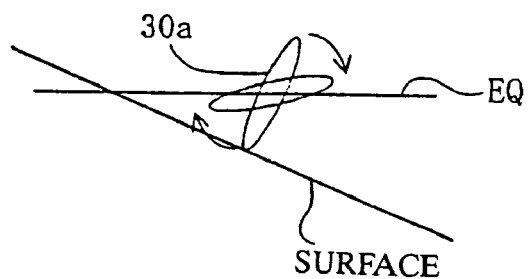
Figure 20:
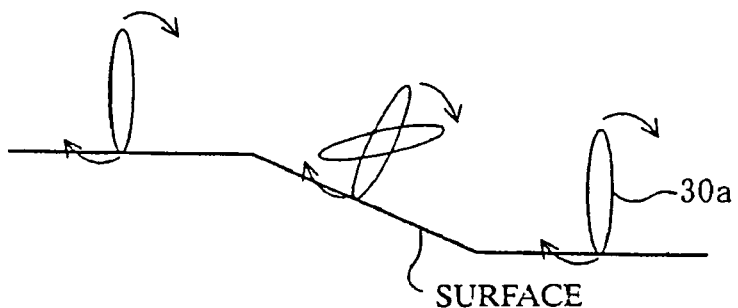
Figure 20:
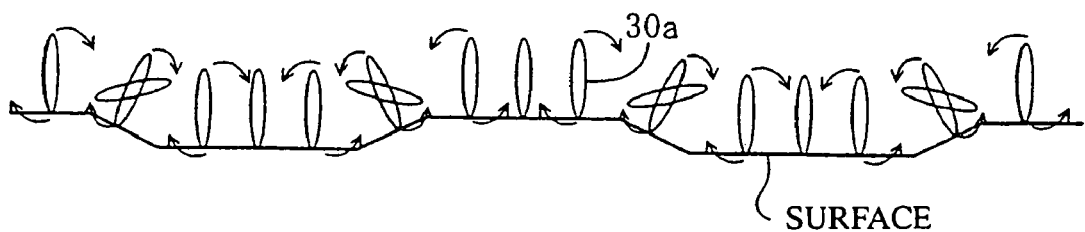

FIG. 20(*a*) through FIG. 20(*d*) schematically show the relationship between the orientation of liquid crystal molecules 30*a* and the surface configuration having a vertical alignment power.

Figure 21:
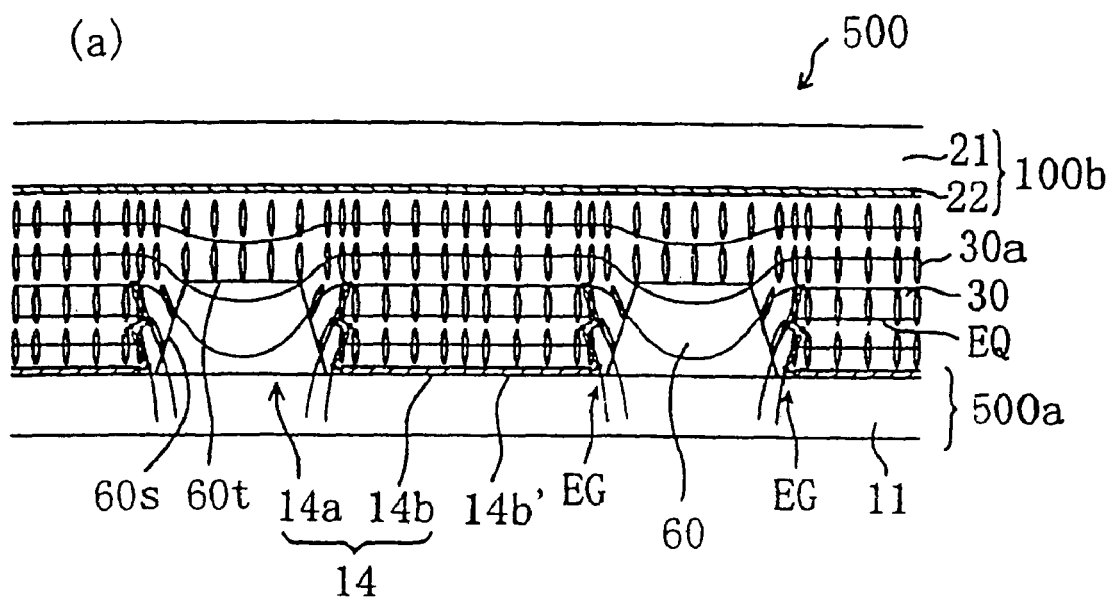
Figure 21:
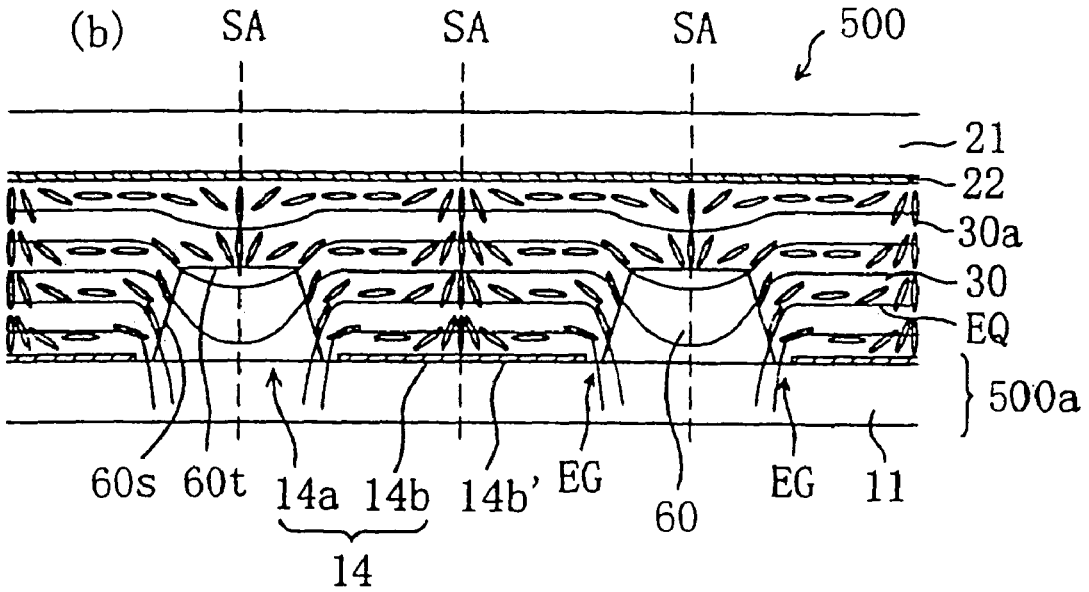

FIG. 21(*a*) and FIG. 21(*b*) schematically show a state where a voltage is applied across a liquid crystal display layer 30 in the liquid crystal display device 500, wherein FIG. 21(*a*) schematically shows a state where the orientation has just started to change (initial ON state), and FIG. 21(*b*) shows a steady state.

Figure 22:
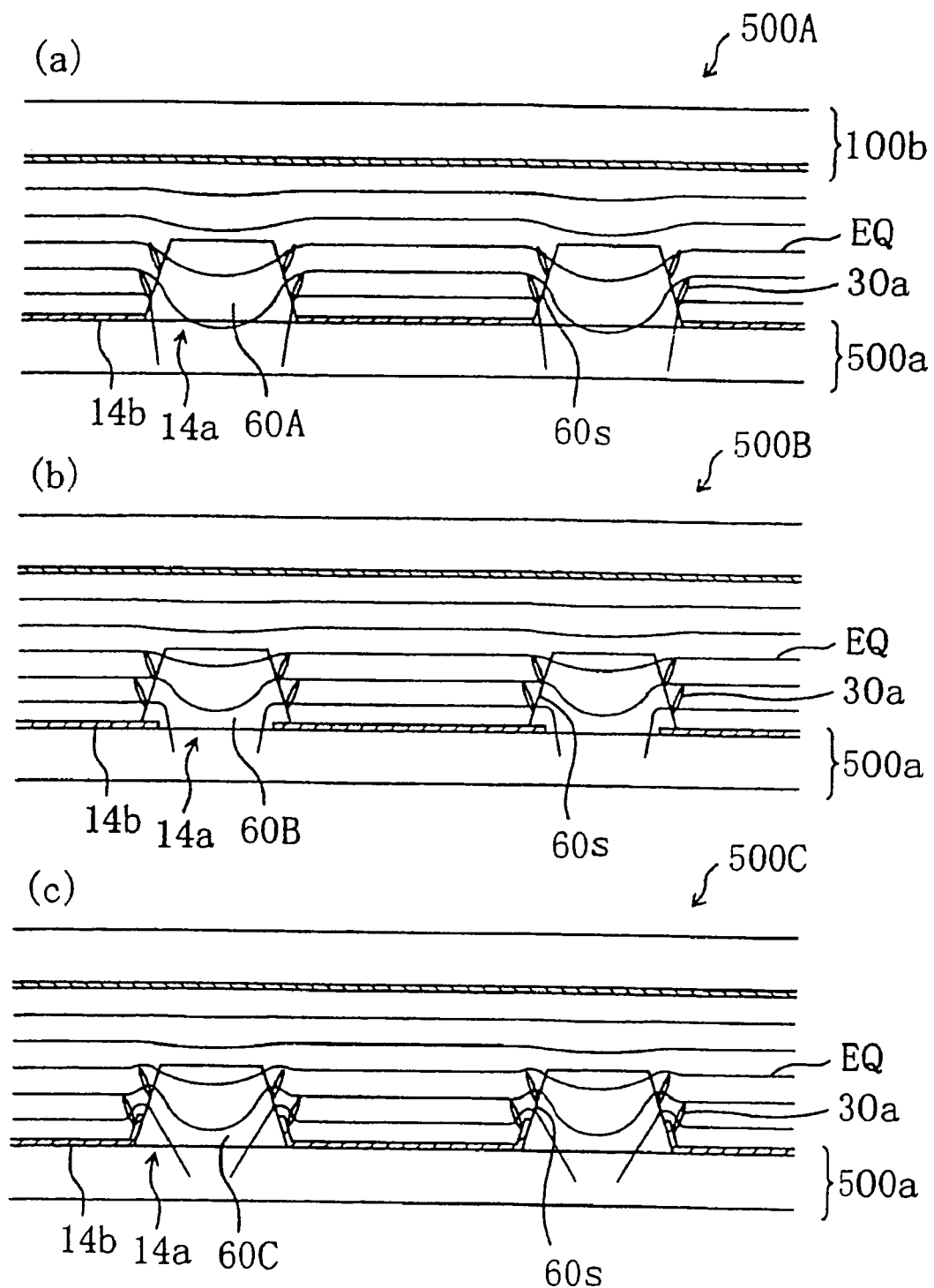

FIG. 22(*a*), FIG. 22(*b*) and FIG. 22(*c*) are respectively schematic cross-sectional views of liquid crystal display devices 500A, 500B and 500C which are different from one another in the positional relationship between the openings and the protrusions.

Figure 23:
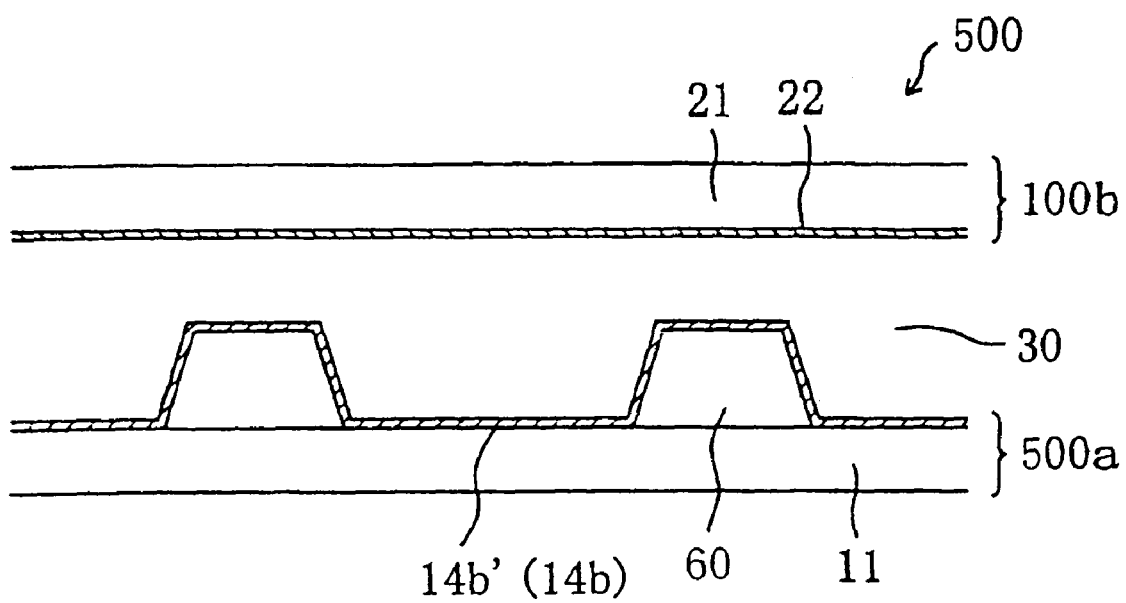

FIG. 23 schematically shows a cross-sectional structure of the liquid crystal display device 500, taken along line 23A-23A' in FIG. 19(*a*).

Figure 24:
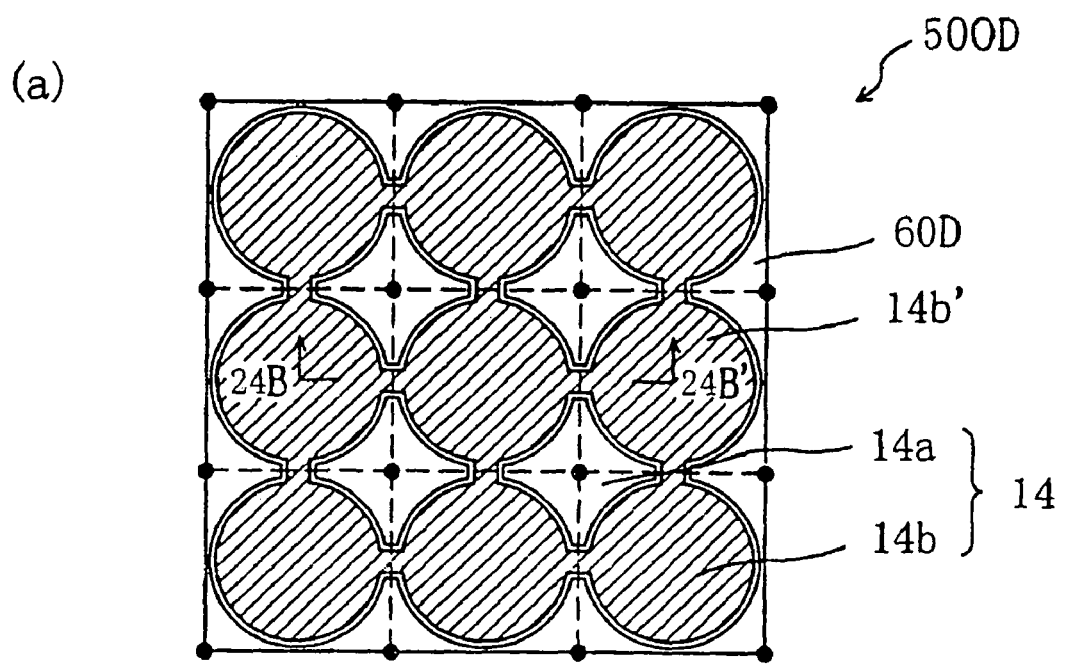
Figure 24:
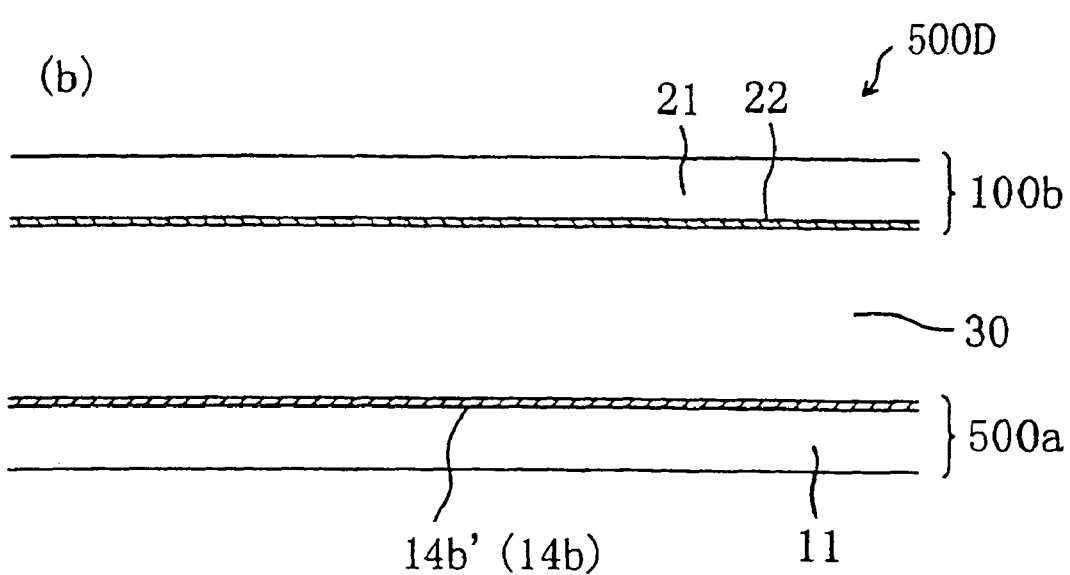

FIG. 24(*a*) and FIG. 24(*b*) schematically show a structure of one picture element region of still another liquid crystal display device 500D according to the present invention, wherein FIG. 24(*a*) is a plan view, and FIG. 24(*b*) is a cross-sectional view taken along line 24B-24B' in FIG. 24(*a*).

Figure 25:
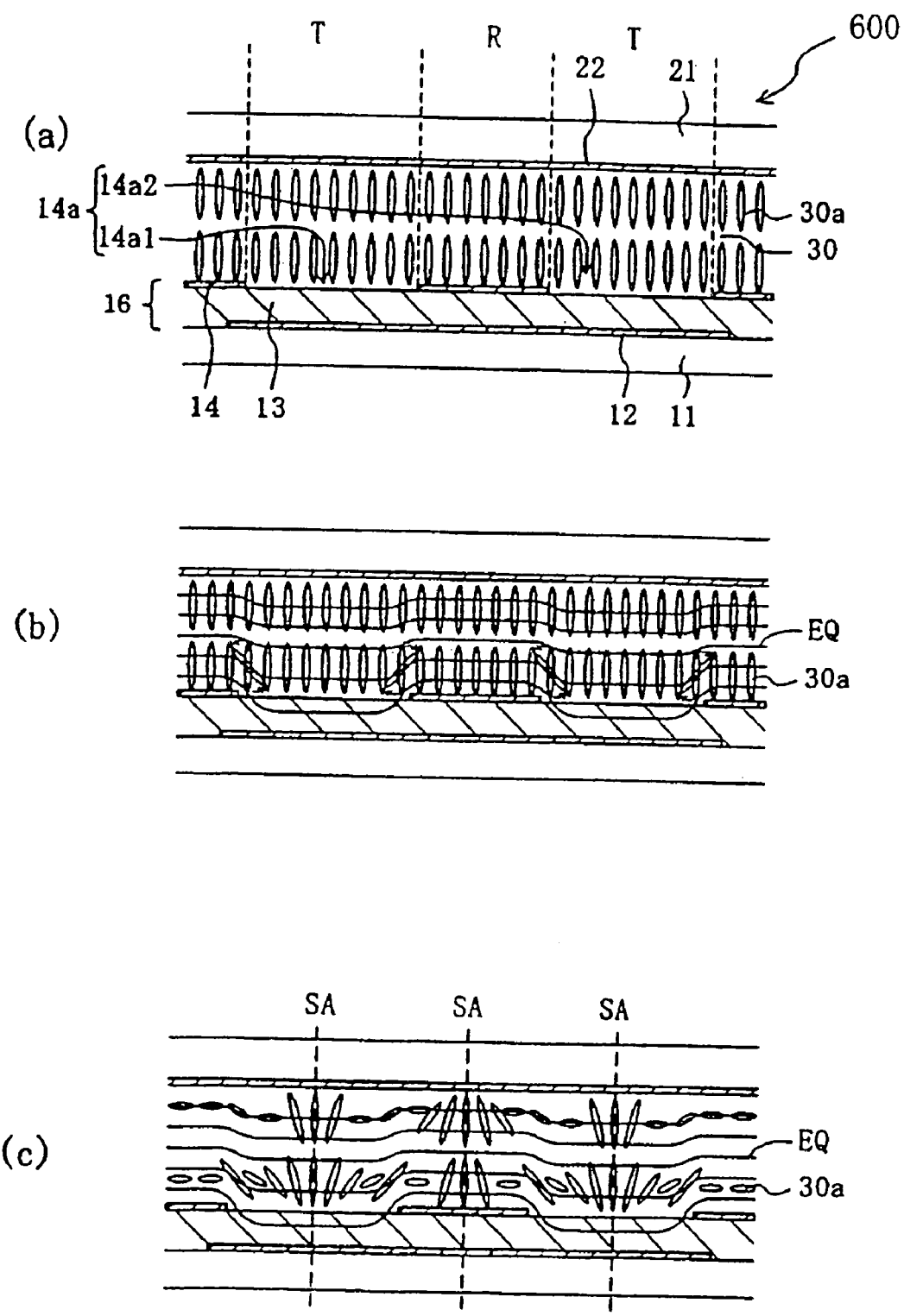

FIG. 25(*a*), FIG. 25(*b*) and FIG. 25(*c*) schematically show a cross-sectional structure of one picture element region of a liquid crystal display device 600 having a two-layer electrode, wherein FIG. 25(*a*) shows a state in the absence of an applied voltage, FIG. 25(*b*) shows a state where the orientation has just started to change (initial ON state), and FIG. 25(*c*) shows a steady state.

Figure 26:
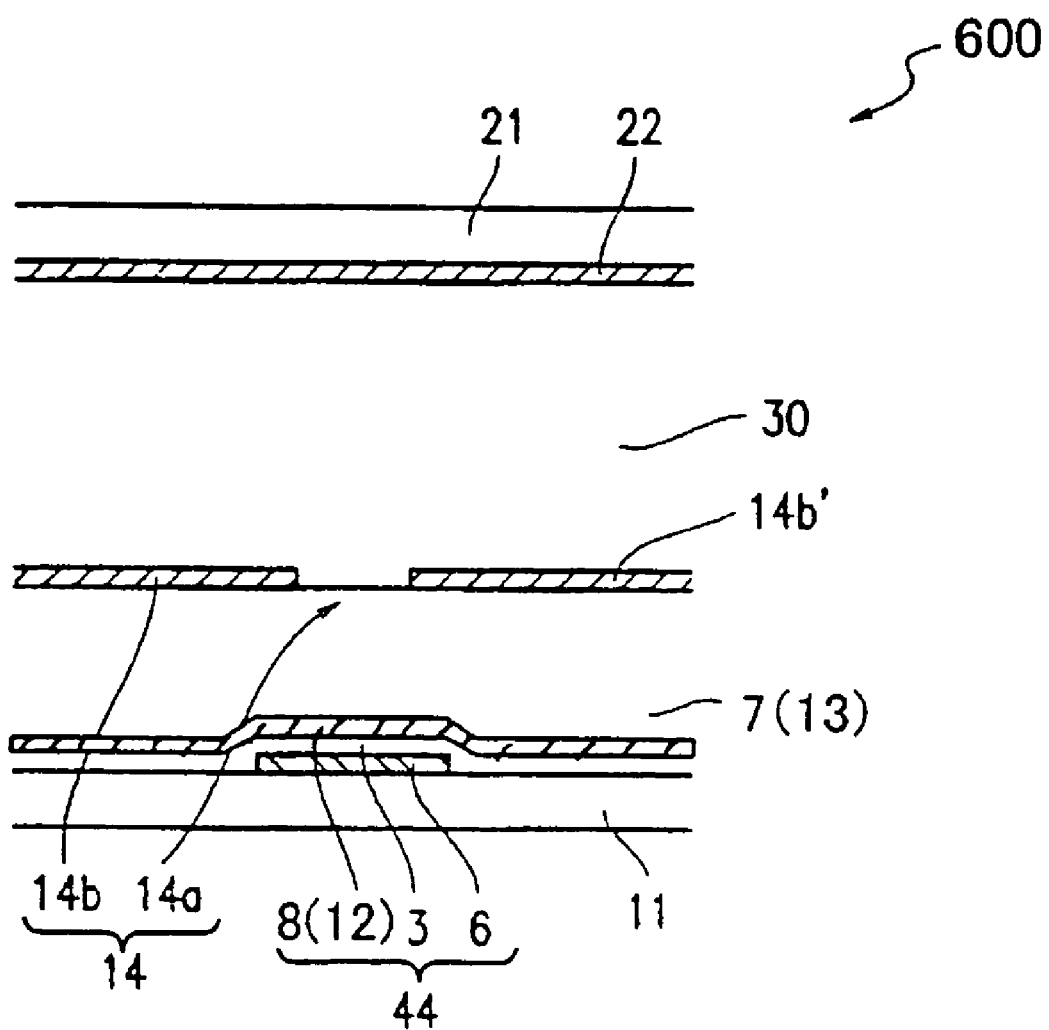

FIG. 26 schematically shows a cross-sectional structure of one picture element region of a liquid crystal display device 600 having a two-layer electrode.

Figure 27:
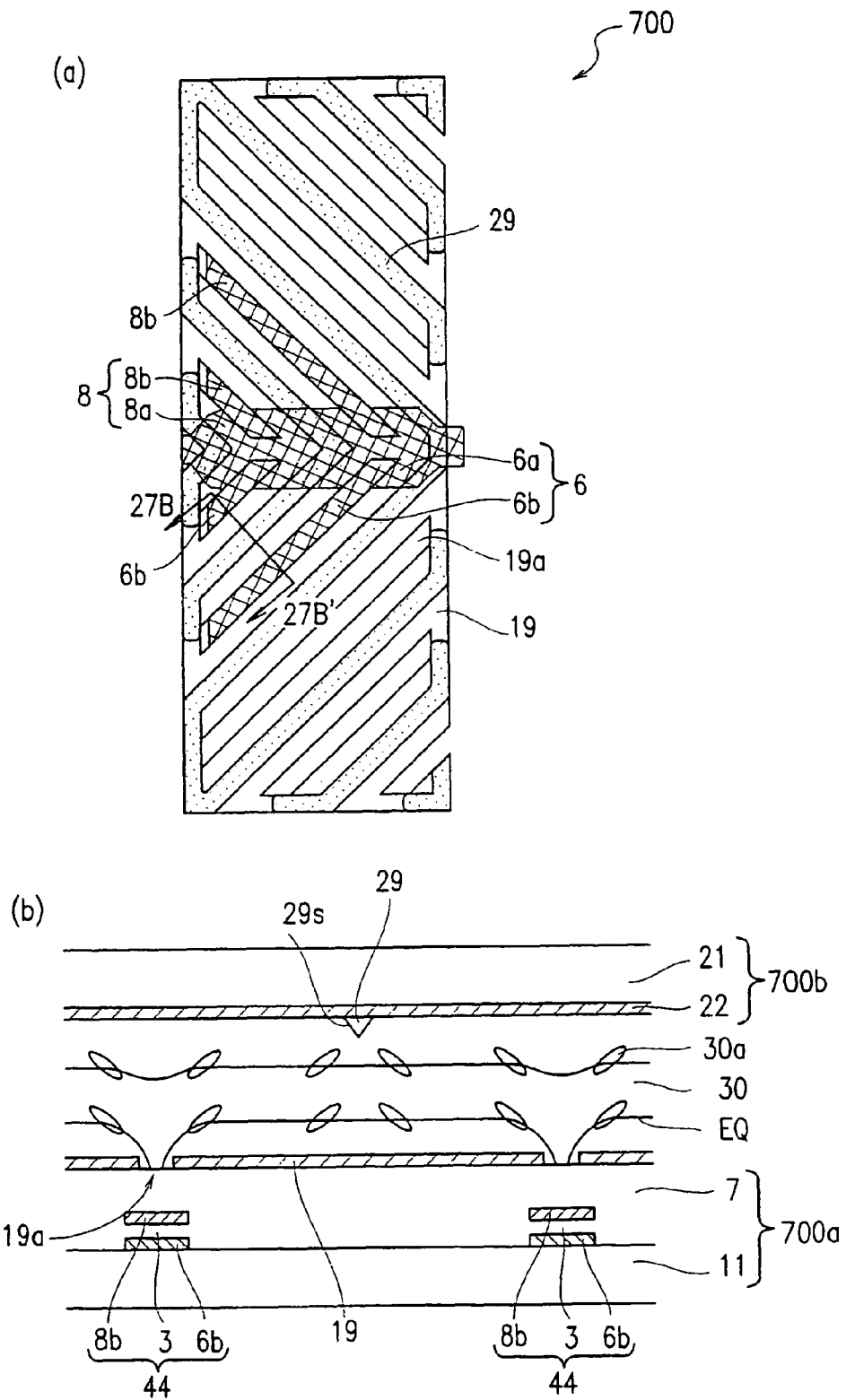

FIG. 27(*a*) and FIG. 27(*b*) schematically show a structure of one picture element region of still another liquid crystal display device 700 according to the present invention, wherein FIG. 27(*a*) is a plan view, and FIG. 27(*b*) is a cross-sectional view taken along line 27B-27B' in FIG. 27(*a*).

BEST MODE FOR CARRYING OUT THE INVENTION

Hereinafter, embodiments of the present invention will be described with reference to the accompanying drawings.

First, an electrode structure of a liquid crystal display device according to the present invention and functions thereof will be described. The following embodiments of the present invention will be described regarding an active matrix type liquid crystal display device using thin film transistors (TFTs). The following embodiments of the present invention will also be described regarding a transmission type liquid crystal display device, but the present invention is not limited thereto and is also applicable to a reflection type liquid crystal display device or a transmission-reflection combination type liquid crystal display device.

Note that in this specification, a region of a liquid crystal display device corresponding to a "picture element", which is the minimum unit of display, will be referred to as a "picture element region". In a color liquid crystal display device, a plurality of "picture elements" including R, G and B "picture elements" correspond to one "pixel". A picture element region is typically defined by a picture element electrode and an area of a counter electrode opposing the picture element electrode. In an arrangement with a black matrix, strictly speaking, a picture element region is a portion, which opposes an opening of the black matrix, in a region across which a voltage is applied according to the intended display state.

Figure 1:
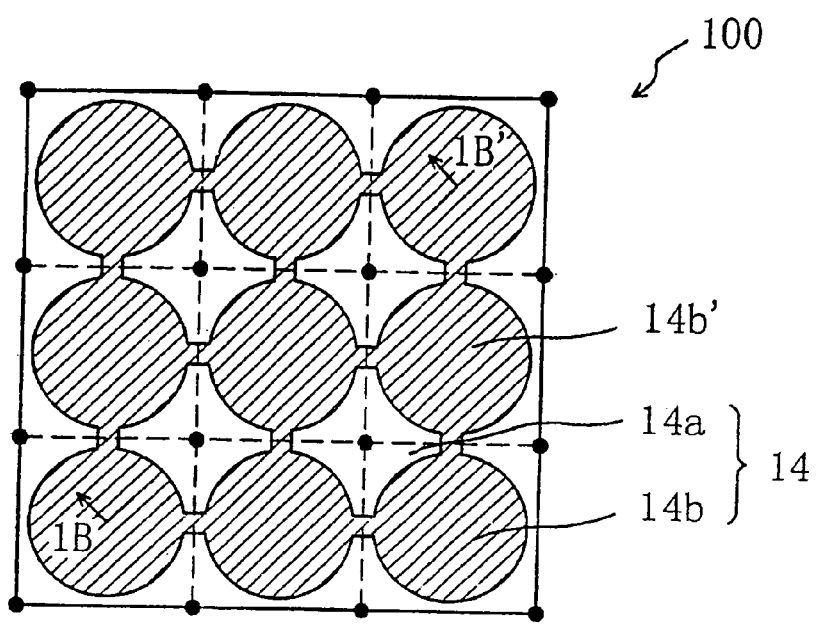
Figure 1:
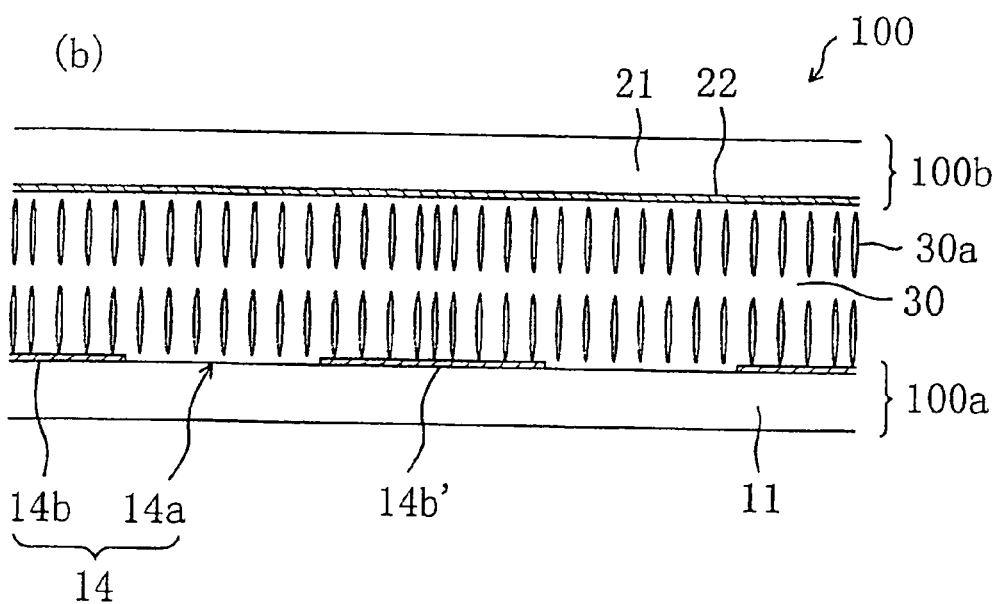

With reference to FIG. 1(*a*) and FIG. 1(*b*), a structure of one picture element region of a liquid crystal display device 100 according to an embodiment of the present embodiment will be described. In the following description, a color filter and a black matrix are omitted for the sake of simplicity. In the figures, each element having substantially the same function as that of the corresponding element of the liquid crystal display device 100 will be represented by the same reference numeral and will not be further described. FIG. 1(*a*) is a plan view of the picture element region as viewed in a direction normal to a substrate, and FIG. 1(*b*) is a cross-sectional view thereof taken along line 1B-1B' in FIG. 1(*a*). FIG. 1(*b*) shows a state where no voltage is applied across a liquid crystal layer.

The liquid crystal display device 100 includes an active matrix substrate (hereinafter, referred to as a "TFT substrate") 100*a*, a counter substrate (referred to also as a "color filter substrate") 100*b*, and a liquid crystal layer 30 provided between the TFT substrate 100*a* and the counter substrate 100*b*. Liquid crystal molecules 30*a* in the liquid crystal layer 30 have a negative dielectric anisotropy. As shown in FIG. 1(*b*), when no voltage is applied across the liquid crystal layer 30, the liquid crystal molecules 30*a* are oriented vertical to a surface of, and by virtue of, a vertical alignment film (not shown). The vertical alignment film is provided as a vertical alignment layer on one surface of each of the TFT substrate 100*a* and the counter substrate 100*b*, the one surface being closer to the liquid crystal layer 30. This state of the liquid crystal layer 30 is referred to as a "vertical orientation state". The liquid crystal molecules 30*a* in the liquid crystal layer 30 in the vertical orientation state may be slightly inclined from the direction normal to the surface of the vertical alignment film (the substrate surface) depending on the type of vertical alignment film or the type of liquid crystal material used. Generally, a "vertical orientation state" is a state where the axis of liquid crystal molecules (referred to also as an "axial direction") is oriented at an angle of about 85 degrees or greater with respect to the surface of the vertical alignment film.

The TFT substrate 100*a* of the liquid crystal display device 100 includes a transparent substrate (for example, glass substrate) 11 and a picture element electrode 14 provided on a surface thereof. The counter substrate 100*b* includes a transparent substrate (for example, a glass substrate) 21 and a counter electrode 22 provided on a surface thereof. The orientation in the liquid crystal layer 30 in each picture element region changes in accordance with the voltage applied between the picture element electrode 14 and the counter electrode 22, which are arranged to oppose each other with the liquid crystal layer 30 interposed therebetween. A display is realized by utilizing a phenomenon that the polarization state or amount of light passing through the liquid crystal layer 30 changes along with the change in the orientation in the liquid crystal layer 30.

The picture element electrode 14 of the liquid crystal display device 100 includes a plurality of openings 14a and a solid portion 14b. The picture element electrode 14 includes a conductive film (for example, an ITO film), and the openings 14a are areas of the picture element electrode 14 where the conductive film is not provided. The solid portion 14b is an area having the conductive film (i.e., the area other than the openings 14a). Each picture element electrode 14 includes a plurality of openings 14a, but the solid portion 14b is basically formed of one continuous conductive film.

The plurality of openings 14a are arranged such that the respective centers thereof form a square lattice pattern. A portion of the solid portion 14b', which is substantially surrounded by four openings 14a whose respective centers are located at the four lattice points that form one unit lattice, is generally circular (such a portion will be referred to as a "unit solid portion 14b'). Each opening 14a has four quarter-arc-shaped sides (edges), and has a generally star-like shape having a four-fold rotation axis at the center thereof. In this embodiment, in order to stabilize the orientation throughout the picture element region, unit lattices are formed up to ends of the picture element electrode 14. Namely, as shown in the figure, the openings 14a are provided also in end portions of the picture element electrode 14. The openings 14a provided in each end portion is, however, patterned to have a shape corresponding to about a half (an area corresponding to each side) of, or about a quarter (an area corresponding to each corner) of, the openings 14a located in the central portion of the picture element electrode 14.

The openings 14a located in the central portion of the picture element electrode 14 have substantially the same shape and substantially the same size as one another. The unit solid portions 14b' located in the unit lattices formed by the openings 14a are generally circular, and have substantially the same shape and substantially the same size as one another. Adjacent unit solid portions 14b' are connected to one another, and form the solid portion 14b acting as a substantially single conductive film.

When a voltage is applied between the picture element electrode 14 having the above-described structure and the counter electrode 22, a plurality of liquid crystal domains each taking a radially-inclined orientation are formed by an oblique electric field produced in edge portions of the openings 14a. One liquid crystal domain is formed in a region corresponding to each opening 14a, and one liquid crystal domain is formed in a region corresponding to each unit solid portion 14b'.

The picture element electrode 14 in this embodiment is square, but the shape of the picture element electrode 14 is not limited thereto. A general shape of the picture element electrode 14 is close to a rectangle (encompassing a square and an oblong rectangle), and thus the openings 14a can be regularly arranged in a square lattice pattern. Even where the picture element electrode 14 is not rectangular, the effects of the present invention are provided as long as the openings 14a are arranged regularly (for example, in a square lattice pattern as described above) such that liquid crystal domains are formed in the entirety of the picture element region.

In this embodiment, one picture element region includes a plurality of openings 14a. Alternatively, a plurality of liquid crystal domains may be formed in one picture element region by providing only one opening. For example, referring to FIG. 1(a), a region having four unit areas each defined by the dashed line is regarded as one picture element electrode. This picture element electrode is formed of one opening 14a and four unit solid portions 14b' located around the opening 14a. When a voltage is applied, five liquid crystal domains each taking a radially-inclined orientation are formed.

A plurality of liquid crystal domains can be formed in one picture element region even without forming any opening 14a. For example, two adjacent unit solid portions 14b' are regarded as one picture element electrode. This picture element electrode is formed of two unit solid portions 14b' with no opening 14a. Still, when a voltage is applied, two liquid crystal domains each taking a radially-inclined orientation are formed. As described above, as long as the picture element electrode includes at least unit solid portions 14b' for forming a plurality of liquid crystal domains each taking a radially-inclined orientation upon application of a voltage (i.e., as long as the picture element electrode has such an external shape), the continuity of the orientation of the liquid crystal molecules 30a in the picture element region is obtained. Therefore, the radially-inclined orientation of the liquid crystal domains formed in positional correspondence with the unit solid portions 14b' is stabilized.

Figure 2:
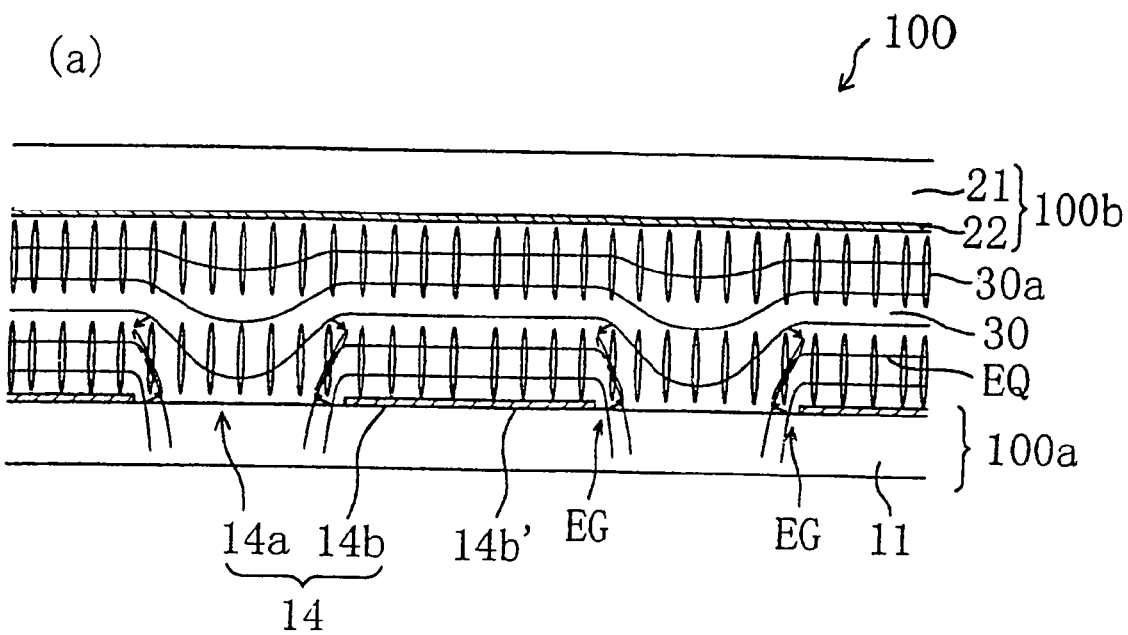
FIG. 2(a) and FIG. 2(b) show a state where a voltage is applied across a liquid crystal layer 30 in the liquid crystal display device 100, wherein FIG. 2(a) schematically shows a state where the orientation has just started to change (initial ON state), and FIG. 2(b) schematically shows a steady state.
Figure 2:
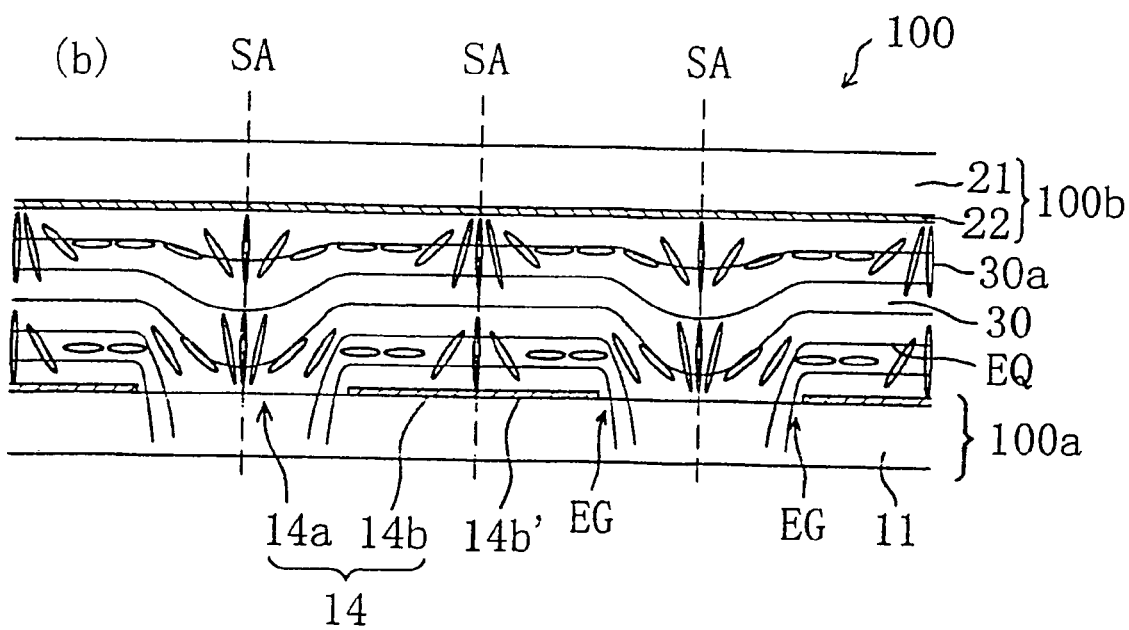

With reference to FIG. 2(a) and FIG. 2(b), the mechanism by which liquid crystal domains are formed by the above-mentioned oblique electric field will be described. FIG. 2(a) and FIG. 2(b) each show a state where a voltage is applied across the liquid crystal layer 30 shown in FIG. 1(b). FIG. 2(a) schematically shows a state where the orientation of the liquid crystal molecules 30a has just started to change (initial ON state) in accordance with the voltage applied across the liquid crystal layer 30. FIG. 2(b) schematically shows a state where the orientation of the liquid crystal molecules 30a, which has been changing in accordance with the applied voltage, has reached a steady state. In FIG. 2(a) and FIG. 2(b), curves EQ represent equipotential lines.

As shown in FIG. 1(a), when the picture element electrode 14 and the counter electrode 22 are at the same potential (a state where no voltage is applied across the liquid crystal layer 30), the liquid crystal molecules 30a in the picture element region are oriented vertical to the surfaces of the substrates 11 and 21.

When a voltage is applied across the liquid crystal layer 30, a potential gradient represented by the equipotential lines EQ shown in FIG. 2(a) (perpendicular to the electric force line) is produced. The equipotential lines EQ are parallel to the surfaces of the solid portion 14b of the picture element electrode 14 and the counter electrode 22 in a region of the liquid crystal layer 30 which is between the solid portion 14b and the counter electrode 22. In a region of the liquid crystal layer 30 corresponding to the opening 14a of the picture element electrode 14, the equipotential lines EQ drop. As a result, an oblique electric field represented by an inclined portion of the equipotential lines EQ is produced in a region of the liquid crystal layer 30 above an edge portion EG of the opening 14a (a peripheral portion within the opening 14a including an external boundary of the opening 14a).

Upon the liquid crystal molecules 30a having a negative dielectric anisotropy, a torque acts to direct the axial direction of such liquid crystal molecules 30a to be parallel to the equipotential lines EQ (perpendicular to the electric force line). Accordingly, as represented by the arrows in FIG. 2(a), the liquid crystal molecules 30a above the right edge portion EG of each opening 14a incline (rotate) clockwise, and the liquid crystal molecules 30a above the left edge portion EG of each opening 14a incline (rotate) counterclockwise. As a result, the liquid crystal molecules 30a above the edge portions EG are oriented parallel to the corresponding portions of the equipotential lines EQ.

Figure 3:
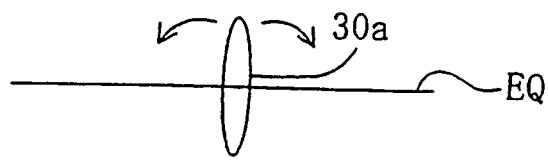
FIG. 3(a) through FIG. 3(d) each schematically show the relationship between an electric force line and an orientation of liquid crystal molecules.
Figure 3:
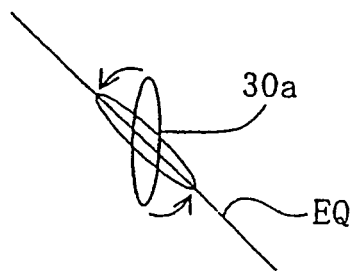
Figure 3:
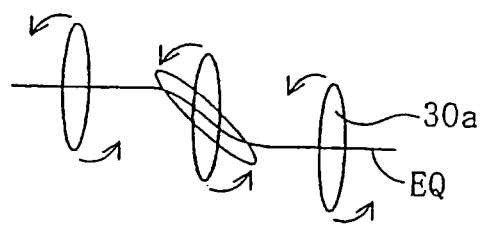
Figure 3:
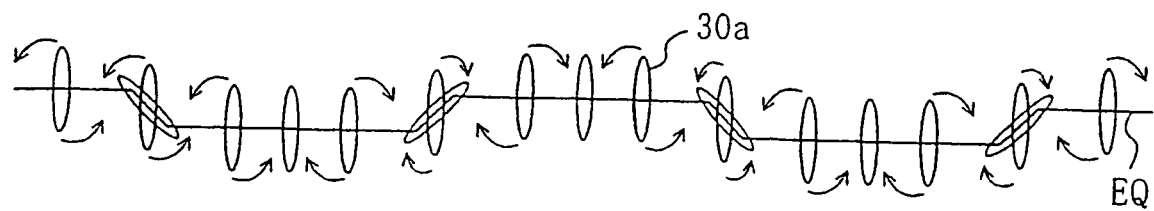

Referring to FIG. 3, the change in the orientation of the liquid crystal molecules 30a will be described in detail.

When an electric field is produced in the liquid crystal layer 30, a torque acts upon the liquid crystal molecules 30a having a negative dielectric anisotropy to direct the axial direction thereof to be parallel to the equipotential lines EQ. As shown in FIG. 3(a), when an electric field represented by an equipotential line EQ perpendicular to the axial direction of a liquid crystal molecule 30a is produced, either a torque urging the liquid crystal molecule 30a to incline clockwise or a torque urging the liquid crystal molecule 30a to incline counterclockwise is produced with the same probability. Therefore, in a region of the liquid crystal layer 30 which is between a pair of parallel plate-shape electrodes opposing each other, liquid crystal molecules 30a subjected to a clockwise torque and liquid crystal molecules 30a subjected to a counterclockwise torque both exist. As a result, the transition to the orientation in accordance with the voltage applied across the liquid crystal layer 30 may not proceed smoothly.

In FIG. 2(a), in the liquid crystal display device 100 of the present invention, an electric field represented by a portion of the equipotential lines EQ inclined with respect to the axial direction of the liquid crystal molecules 30a (an oblique electric field) is produced in each edge portion EG of each opening 14a. When this occurs, as shown in FIG. 3(b), the liquid crystal molecule 30a inclines in whichever direction that requires less inclination for the liquid crystal molecule 30a to be parallel to the equipotential line EQ (in the counterclockwise direction in the example of the figure). In FIG. 3(c), liquid crystal molecules 30a are located in a region where an electric field represented by an equipotential line EQ perpendicular to the axial direction thereof is produced. Such liquid crystal molecules 30a are inclined in the same direction as that of the liquid crystal molecule 30a located on the inclined portion of the equipotential line EQ, such that the orientation of the former liquid crystal molecules 30a is continuous (in conformity) with the orientation of the latter liquid crystal molecule 30a. In FIG. 3(d), an electric field represented by an equipotential line EQ having a continuous concave/convex pattern is applied. In this case, liquid crystal molecules 30a located on a flat portion of the equipotential line EQ are oriented so as to be in conformity with the orientation direction defined by the liquid crystal molecules 30a located on the adjacent inclined portions of the equipotential line EQ. The phrase "being located on an equipotential line EQ" as used herein means "being located within an electric field represented by the equipotential line EQ".

As described above, the liquid crystal molecules 30a change orientation thereof, starting from those located on the inclined portion of the equipotential lines EQ, and reach a steady state. Such a steady state is schematically shown in FIG. 2(b). The liquid crystal molecules 30a located above the center of the opening 14a and the vicinity thereof are influenced substantially equally by the respective orientations of the liquid crystal molecules 30a above the opposing edge portions EG of the opening 14a, and therefore are kept vertical to the equipotential lines EQ. The liquid crystal molecules 30a far from the center of the opening 14a are inclined by the influence of the orientation of the liquid crystal molecules 30a at the closer edge portion EG. In this manner, an inclined orientation symmetric about the center SA of the opening 14a is formed. In a direction perpendicular to the display surface of the liquid crystal display device 100 (a direction perpendicular to the surfaces of the substrates 11 and 21), such an orientation is viewed as a radial axial direction of the liquid crystal molecules 30a about the center of the opening 14a (not shown). In this specification, such an orientation will be referred to as a "radially-inclined orientation". In addition, a region of the liquid crystal layer 30 in which the liquid crystal molecules 30a take a radially-inclined orientation about a single axis will be referred to as a "liquid crystal domain".

A liquid crystal domain in which the liquid crystal molecules 30a take a radially-inclined orientation is formed also in a region corresponding to each unit solid portion 14b' which is substantially surrounded by the openings 14a. The liquid crystal molecules 30a in a region corresponding to each unit solid portion 14b' are influenced by the orientations of the liquid crystal molecules 30a above the edge portions EG of the openings 14a and take a radially-inclined orientation symmetric about the center SA of the unit solid portion 14b' (corresponding to the center of a unit lattice formed by the openings 14a).

The radially-inclined orientation of a liquid crystal domain formed above the unit solid portion 14b' and the radially-inclined orientation formed above the opening 14a are mutually continuous, and are both in conformity with the orientations of the liquid crystal molecules 30a above the edge portions EG of the openings 14b. The liquid crystal molecules 30a in the liquid crystal domain formed above the opening 14a are oriented in the shape of a cone that spreads upwardly (toward the substrate 100b), and the liquid crystal molecules 30a in the liquid crystal domain formed above the unit solid portion 14b' are oriented in the shape of a cone that spreads downwardly (toward the substrate 100a). As described above, the radially-inclined orientation in a liquid crystal domain formed above the opening 14a and the radially-inclined orientation in a liquid crystal domain formed above the unit solid portion 14b' are continuous with each other. Therefore, no disclination line (orientation defect) is formed along the boundary therebetween. This prevents the display quality from declining due to a disclination line.

In order to alleviate the viewing angle dependence of the display quality of a liquid crystal display device in all azimuth angles, the existence probabilities of the liquid crystal molecules oriented in various azimuth angle directions preferably have rotational symmetry, and more preferably have axial symmetry, in each picture element region. In other words, the liquid crystal domains formed in the entirety of the picture element region are arranged preferably to have rotational symmetry, and more preferably to have axial symmetry. However, it is not absolutely necessary that the liquid crystal domains should have rotational symmetry in the entirety of the picture element region. The liquid crystal layer in the picture element region only needs to be formed as a set of liquid crystal domains which are arranged to have rotational symmetry (or axial symmetry) (e.g., as a set of liquid crystal domains arranged in a square lattice pattern). Therefore, it is not absolutely necessary that the plurality of openings 14a in the picture element region should to be arranged to have rotational symmetry in the entirety of the picture element region. The openings 14a only need to exist as a set of openings 14a which are arranged to have rotational symmetry (or axial symmetry) (e.g., as a set of openings arranged in a square lattice pattern). The same is applicable to the unit solid portions 14b' substantially surrounded by the plurality of openings 14a. The shape of each liquid crystal domain preferably has rotational symmetry, and more preferably has axial symmetry. Accordingly, the shape of each opening 14a and each unit solid portion 14b' also preferably have rotational symmetry, and more preferably has axial symmetry.

Note that a sufficient level of voltage may not be applied across the liquid crystal layer 30 above the center of the opening 14a or the vicinity thereof, and as a result, the liquid crystal layer 30 in this region cannot contribute to the display. In other words, even if the radially-inclined orientation in the liquid crystal layer 30 above the center of the opening 14a and the vicinity thereof is disturbed to some extent (e.g., even if the central axis is shifted from the center of the opening 14a), the display quality may not decline. Therefore, at least the liquid crystal domains formed corresponding to the unit solid portions 14b' need to be arranged to have rotational symmetry, or preferably, axial symmetry.

As described above with reference to FIG. 2(a) and FIG. 2(b), the picture element electrode 14 of the liquid crystal display device 100 of the present invention has a plurality of openings 14a and produces an electric field, represented by equipotential lines EQ having inclined portions, in a region of the liquid crystal layer 30 corresponding to the picture element region. The liquid crystal molecules 30a having a negative dielectric anisotropy in the liquid crystal layer 30, which are in a vertical orientation state in the absence of an applied voltage, are triggered to change the orientation direction thereof by the change in the orientation of the liquid crystal molecules 30a located on the inclined portions of the equipotential lines EQ. As a result, liquid crystal domains having a stable radially-inclined orientation are formed above the openings 14a and the solid portion 14b. The orientation of the liquid crystal molecules in such a liquid crystal domain changes in accordance with the voltage applied across the liquid crystal layer. Thus, a display is realized.

Now, the shape (as viewed in a direction normal to a substrate) and arrangement of the openings 14a of the picture element electrode 14 of the liquid crystal display device 100 in this embodiment will be described.

The display characteristics of a liquid crystal display device exhibit an azimuth angle dependence due to the orientation state (optical anisotropy) of the liquid crystal molecules. In order to reduce the azimuth angle dependence of the display characteristics, it is preferable that the liquid crystal molecules are oriented in all azimuth angles with substantially the same probability. It is more preferable that the liquid crystal molecules in each picture element region are oriented in all azimuth angles with substantially the same probability. Accordingly, the openings 14a preferably have a shape which enables liquid crystal domains to be formed such that the liquid crystal molecules 30a in each picture element region are oriented in all azimuth angles with substantially the same probability. Specifically, the shape of each opening 14a preferably has rotational symmetry (more preferably, symmetry with at least a two-fold rotation axis) about a symmetry axis extending through the center of the opening 14a (in the normal direction). It is also preferable that the plurality of openings 14a are arranged to have rotational symmetry. The shape of each unit solid portion 14b' substantially surrounded by the openings 14a preferably has rotational symmetry. It is also preferable that the unit solid portions 14b' are arranged to have rotational symmetry.

It is not absolutely necessary that the openings 14a and the unit solid portions 14b' should be arranged to have rotational symmetry in the entirety of the picture element region. As shown in FIG. 1(a), the picture element region only needs to be formed of a combination of, for example, a plurality of square lattices (having symmetry with a four-fold rotation axis) as the minimum unit. With such an arrangement, the liquid crystal molecules can be oriented in all azimuth angles with substantially the same probability in the entirety of the picture element region.

Figure 4:
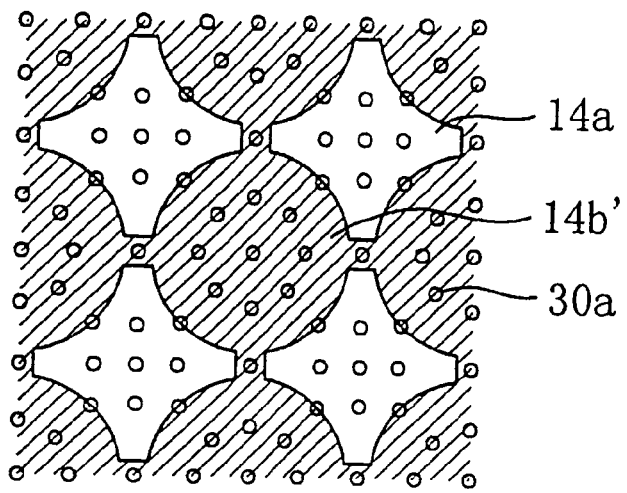
FIG. 4(a) through FIG. 4(c) each schematically show an orientation of liquid crystal molecules in the liquid crystal display device 100 of the present invention as viewed in a direction normal to a substrate.
Figure 4:
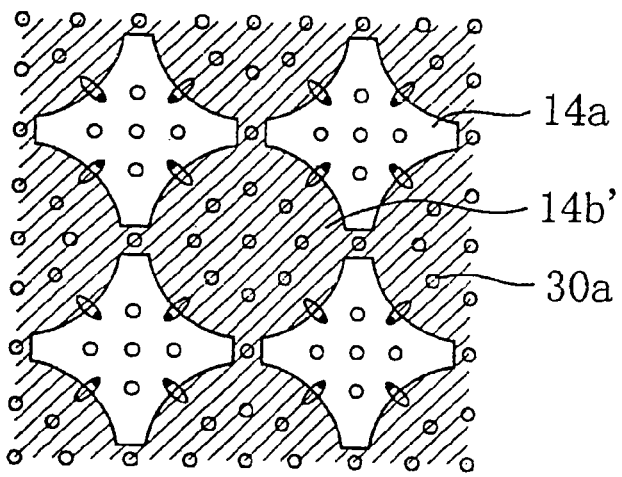
Figure 4:
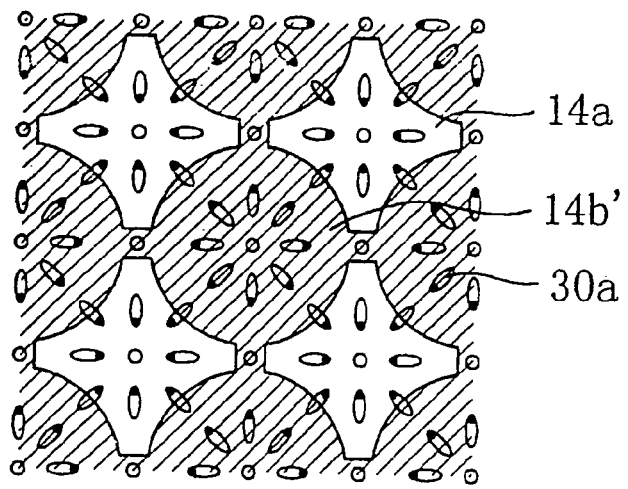

With reference to FIG. 4(a) through FIG. 4(c), the orientation of the liquid crystal molecules 30a in the case where the generally star-shaped openings 14a and the generally circular unit solid portions 14b shown in FIG. 1(a) are arranged in a square lattice pattern so as to have rotational symmetry will be described.

FIG. 4(a) through FIG. 4(c) each schematically show an orientation of the liquid crystal molecules 30a as viewed in a direction normal to a substrate. In FIG. 4(b), FIG. 4(c) and any other figure illustrating the orientation of the liquid crystal molecules 30a as viewed in the direction normal to the substrate, a black-spotted end of a liquid crystal molecule 30a drawn as an ellipse indicates that the liquid crystal molecule 30a is inclined such that this end is closer than the other end to the substrate on which the picture element electrode 14 having the openings 14a is provided. This applies to all of the subsequent figures. Hereinafter, a single unit lattice (formed by four openings 14a) in the picture element region shown in FIG. 1(a) will be described. FIG. 1(b), FIG. 2(a) and FIG. 2(b) respectively correspond to cross-sectional views taken along respective diagonals of FIG. 4(a), FIG. 4(b) and FIG. 4(c). FIG. 1(b), FIG. 2(a) and FIG. 2(b) will also be referred to in the following description.

When the picture element electrode 14 and the counter electrode 22 are at the same potential, i.e., in a state where no voltage is applied across the liquid crystal layer 30, the liquid crystal molecules 30a, whose orientation direction is regulated by the vertical alignment layer (not shown) provided on one surface of each of the TFT substrate 100a and the counter substrate 100b which is closer to the liquid crystal layer 30, take a vertical orientation as shown in FIG. 4(a).

When a voltage is applied across the liquid crystal layer 30 and an electric field represented by equipotential lines EQ shown in FIG. 2(a) is produced, a torque acts upon the liquid crystal molecules 30a having a negative dielectric anisotropy to direct the axial direction thereof to be parallel to the equipotential lines EQ. As described above with reference to FIG. 3(a) and FIG. 3(b), the direction of inclination (rotation) of the liquid crystal molecules 30a under an electric field represented by a portion of equipotential lines EQ perpendicular to the molecular axis thereof is not uniquely defined (FIG. 3(a)). Therefore, the orientation (inclination or rotation) thereof does not easily change. By contrast, the direction of inclination (rotation) of the liquid crystal molecules 30a on a portion of the equipotential lines EQ inclined with respect to the molecular axis thereof is uniquely defined. Therefore, the orientation thereof easily changes. As a result, as shown in FIG. 4(b), the liquid crystal molecules 30a incline, starting from those above the edge portions of the openings 14a where the molecular axis of the liquid crystal molecules 30a is inclined with respect to the equipotential lines EQ. Next, as described above with reference to FIG. 3(c), the surrounding liquid crystal molecules 30a also incline so as to be in conformity with the orientation of the liquid crystal molecules 30a above the edge portions of the openings 14a. Then, as shown in FIG. 4(c), the axial direction of the liquid crystal molecules 30a is stabilized (radially-inclined orientation).

As described above, where the shape of the openings 14a has rotational symmetry, upon application of a voltage, the liquid crystal molecules 30a in the picture element region successively incline. First, those above the edge portions of the openings 14a incline, and then those above the center of the openings 14a also incline. The orientation-regulating forces from the liquid crystal molecules 30a above the edge portions of the opening 14a act upon the liquid crystal molecules 30a above the center of each opening 14a and the vicinity thereof in an equilibrium manner. Therefore, the liquid crystal molecules 30a above the center of each opening 14a and the vicinity thereof are kept vertical to the substrate surface. The surrounding liquid crystal molecules 30a are inclined in a radial pattern about the liquid crystal molecules 30a above the center of each opening 14a and the vicinity thereof. The degree of inclination gradually increases as the liquid crystal molecules 30a are farther from the center of the opening 14a.

The liquid crystal molecules 30a, in a region corresponding to the generally circular unit solid portion 14b' surrounded by the four generally star-shaped openings 14a arranged in a square lattice pattern, also incline so as to be in conformity with the orientation of the liquid crystal molecules 30a which have been inclined by an oblique electric field produced in each edge portion of each opening 14a. The orientation-regulating forces from the liquid crystal molecules 30a above the edge portions of the unit solid portion 14b' act upon the liquid crystal molecules 30a above the center of each unit solid portion 14b' and the vicinity thereof in an equilibrium manner. Therefore, the liquid crystal molecules 30a above the center of each unit solid portion 14b' and the vicinity thereof are kept vertical to the substrate surface. The surrounding liquid crystal molecules 30a are inclined in a radial pattern about the liquid crystal molecules 30a above the center of the unit solid portion 14b' and the vicinity thereof. The degree of inclination gradually increases as the liquid crystal molecules 30a are farther from the center of the unit solid portion 14b'.

As described above, when liquid crystal domains, in each of which the liquid crystal molecules 30a take a radially-inclined orientation, are arranged in a square lattice pattern in the entirety of the picture element region, the existence probabilities of the liquid crystal molecules 30a of the respective axial directions have rotational symmetry. As a result, a high-quality display without rough non-uniformity can be realized at any viewing angle. In order to reduce the viewing angle dependence of a liquid crystal domain taking a radially-inclined orientation, the liquid crystal domain preferably has a high degree of rotational symmetry (preferably with at least a two-fold rotation axis, and more preferably with at least a four-fold rotation axis). In order to reduce the viewing angle dependence of the entire picture element region, the plurality of liquid crystal domains formed in the picture element region preferably form an arrangement (for example, a square lattice) represented as a combination of units (for example, unit lattices) having a high degree of rotational symmetry (preferably with at least a two-fold rotation axis, and more preferably with at least a four-fold rotation axis).

Figure 5:
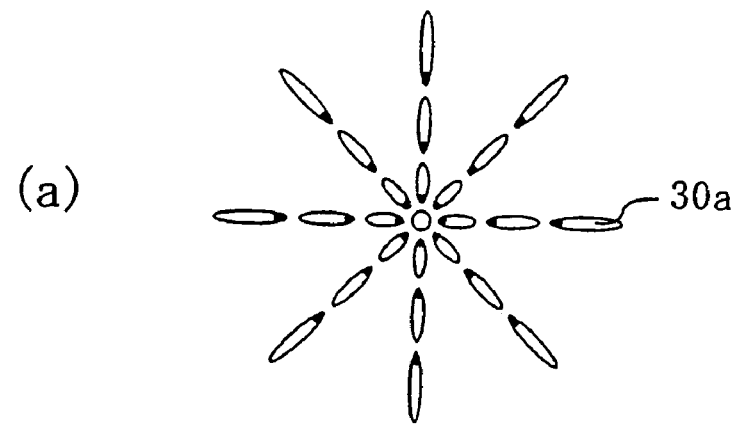
FIG. 5(a) through FIG. 5(c) each schematically show exemplary radially-inclined orientations of liquid crystal molecules.
Figure 5:
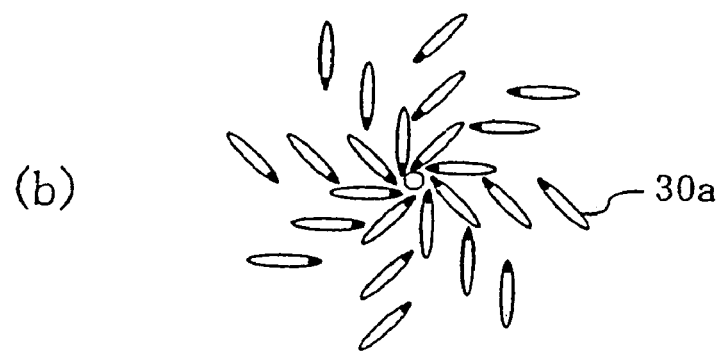
Figure 5:
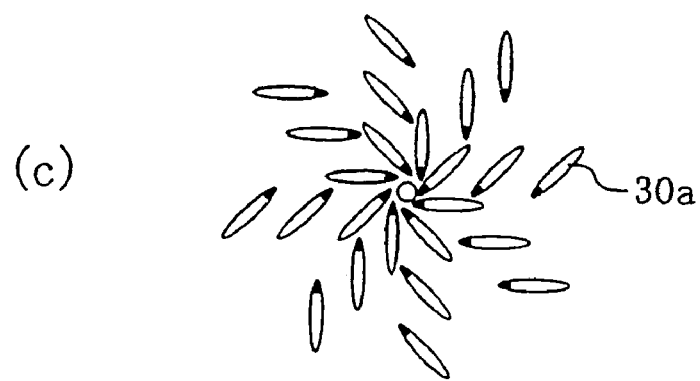

Regarding the stability of a radially-inclined orientation of the liquid crystal molecules 30a, the radially-inclined orientation having a counterclockwise or clockwise spiral pattern as shown in FIG. 5(b) or FIG. 5(c) respectively is more stable than the simple radially-inclined orientation as shown in FIG. 5(a). Such a spiral orientation is different from a normal twist orientation in which the orientation direction of the liquid crystal molecules 30a spirally changes along the thickness of the liquid crystal layer 30. In the spiral orientation, the orientation direction of the liquid crystal molecules 30a does not substantially change along the thickness of the liquid crystal layer 30 when viewed in a minute area. In other words, the orientation in a cross section (along a plane parallel to the layer surface) at any point along the thickness of the liquid crystal layer 30 is as shown in FIG. 5(b) or FIG. 5(c). There is substantially no twist deformation along the thickness of the liquid crystal layer 30. When viewed in a liquid crystal domain as a whole, however, there is a certain degree of twist deformation.

When a material obtained by adding a chiral agent to a nematic liquid crystal material having a negative dielectric anisotropy is used, upon application of a voltage, the liquid crystal molecules 30a take a radially-inclined orientation of a counterclockwise or clockwise spiral pattern about the opening 14a and the unit solid portion 14b', as shown in FIG. 5(b) or FIG. 5(c), respectively. Whether the spiral pattern is counterclockwise or clockwise is determined by the type of chiral agent used. By controlling the liquid crystal layer 30 above the opening 14a to obtain a radially-inclined orientation of a spiral pattern upon application of a voltage, the direction of the spiral pattern of the radially-inclined liquid crystal molecules 30a surrounding the liquid crystal molecules 30a aligned vertical to the substrate surface, can be made uniform in all the liquid crystal domains. Therefore, a uniform display without roughness can be realized. Since the direction of the spiral pattern of the liquid crystal molecules 30a surrounding the liquid crystal molecules 30a aligned vertical to the substrate surface is definite, the response speed upon application of a voltage across the liquid crystal layer 30 is also increased.

In addition, when a larger amount of chiral agent is added, the orientation of the liquid crystal molecules 30a changes in a spiral pattern along the thickness of the liquid crystal layer 30 as in a normal twisted orientation. Where the orientation of the liquid crystal molecules 30a does not change in a spiral pattern along the thickness of the liquid crystal layer 30, the liquid crystal molecules 30a which are oriented vertical or parallel to the polarization axis of the polarization plate do not give a phase difference to incident light. Therefore, the incident light passing through a region of such an orientation does not contribute to the transmittance. By contrast, where the orientation of the liquid crystal molecules 30a changes in a spiral pattern along the thickness of the liquid crystal layer 30, the liquid crystal molecules 30a oriented vertical or parallel to the polarization axis of the polarization plate also give a phase difference to incident light, and the optical rotatory power can also be utilized. Therefore, the incident light passing through a region of such an orientation also contributes to the transmittance. Thus, a liquid crystal display device capable of realizing a bright display is provided.

In FIG. 1(a), the openings 14a each have a star-like shape, the unit solid portions 14b' each have a generally circular shape, and the openings 14a and the unit solid portions 14b' are arranged in a square lattice pattern. The shapes of the openings 14a and the unit solid portions 14b' and the arrangement thereof are not limited thereto.

Figure 6:
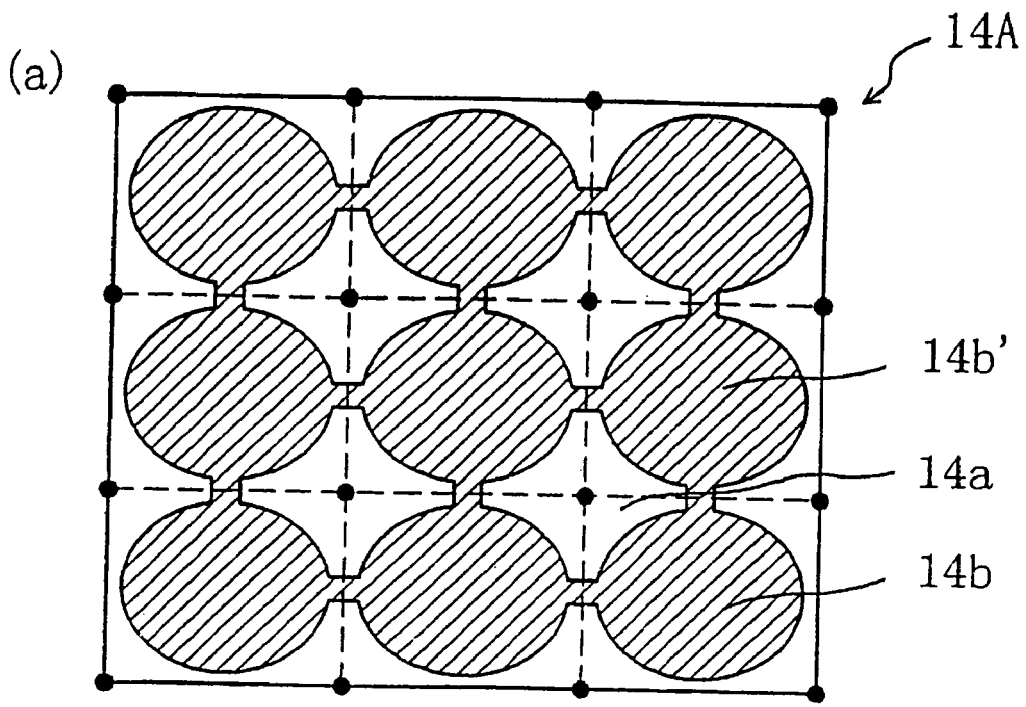
FIGS. 6(a) and 6(b) are each a plan view schematically showing another picture element electrode usable in a liquid crystal display device according to the present invention.
Figure 6:
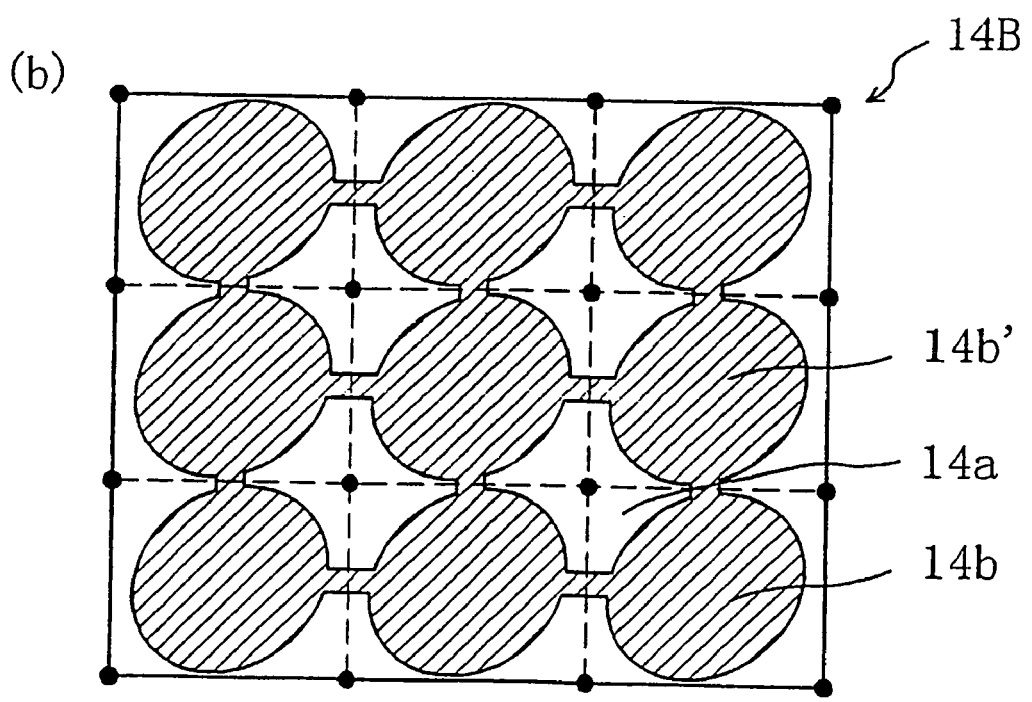

FIG. 6(a) and FIG. 6(b) are plan views respectively showing the picture element electrodes 14A and 14B having openings 14a and unit solid portions 14b' of different shapes.

The openings 14a and the unit solid portions 14b' of the picture element electrodes 14A and 14B shown in FIG. 6(a) and FIG. 6(b), respectively, are slightly distorted in shape from the openings 14a and the unit solid portions 14b' shown in FIG. 1(a). The openings 14a and the unit solid portions 14b' of the picture element electrodes 14A and 14B are regularly arranged to have a two-fold rotation axis (not a four-fold rotation axis) and to form oblong rectangular unit lattices. In both of the picture element electrodes 14A and 14B, the openings 14a have a distorted star-like shape, and the unit solid portions 14b' have a generally elliptical shape (a distorted circular shape). The picture element electrodes 14A and 14B also provide a liquid crystal display device having a high display quality and a superb viewing angle characteristic.

Figure 7:
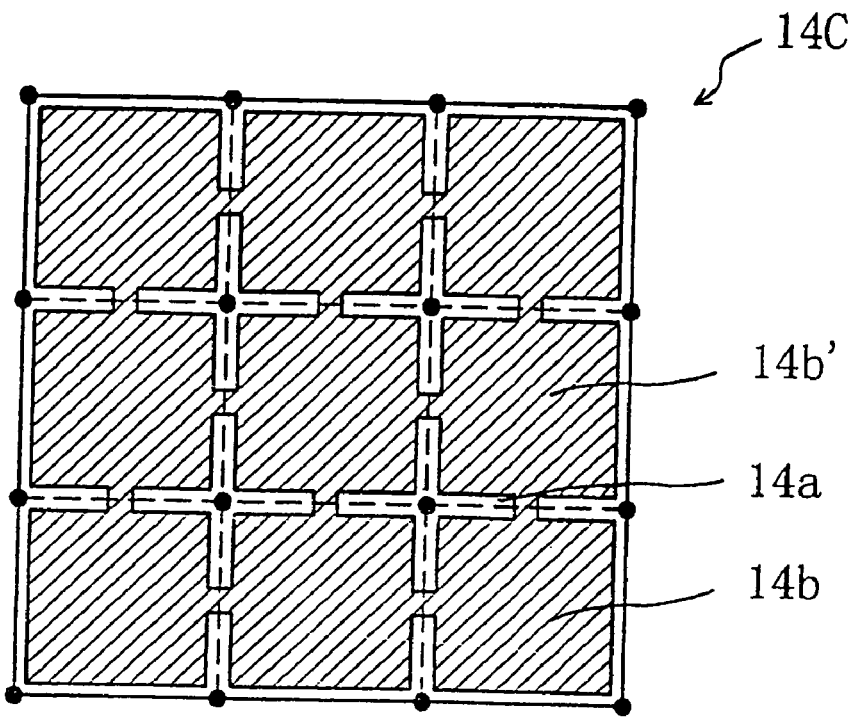
FIGS. 7(a) and 7(b) are each a plan view schematically showing still another picture element electrode usable in a liquid crystal display device according to the present invention.
Figure 7:
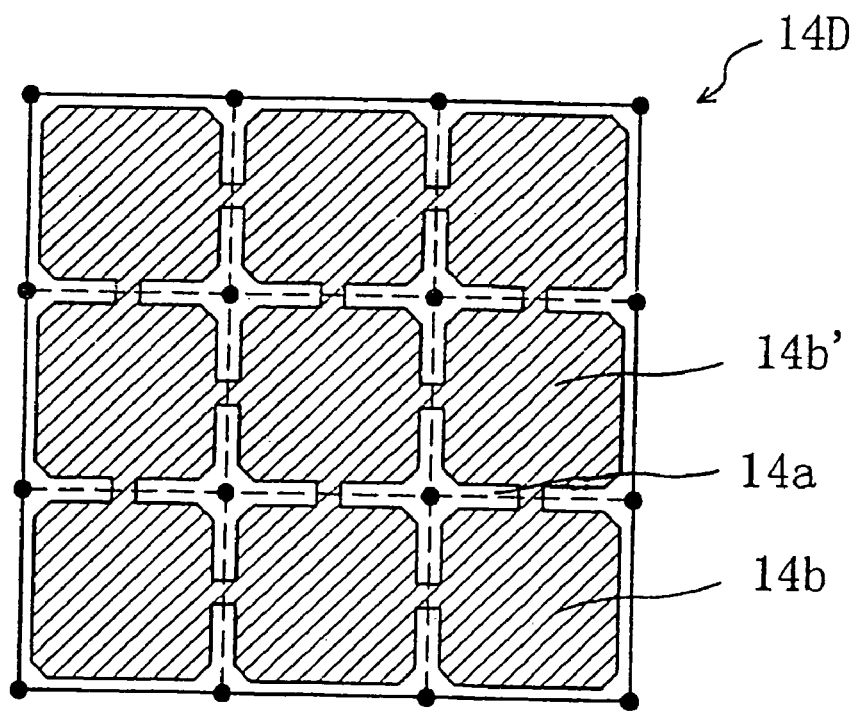

Picture element electrodes 14C and 14D as shown in FIG. 7(a) and FIG. 7(b) respectively are also usable.

In the picture element electrodes 14C and 14D, generally cross-shaped openings 14a are arranged in a square lattice pattern such that each unit solid portion 14b' has a generally square shape. Of course, these patterns may be distorted so as to form oblong rectangular unit lattices. As described above, the generally rectangular unit solid portions 14b' which are regularly arranged also provide a liquid crystal display device having a high display quality and a superb viewing angle characteristic (the term "rectangular" encompasses square and oblong rectangular).

In order to stabilize the radially-inclined orientation, it is preferable that the openings 14a and/or the unit solid portions 14b' are generally circular or generally elliptical than being generally rectangular. The reason is that where the openings 14a and/or the unit solid portions 14b' are circular or elliptical, the edges of the openings 14a (the edges of the unit solid portions 14B') are continuous (smooth) and thus the orientation direction of the liquid crystal molecules 30a changes continuously (smoothly).

By contrast, in order to realize a brighter display, the unit solid portions 14b' are preferably closer to being generally rectangular. Where the unit solid portions 14b' are generally rectangular, the area size ratio of the solid portion 14b with respect to the picture element region can be higher, and thus the area size of a region of the liquid crystal layer directly influenced by the electric field produced by the electrodes can be increased. As a result, the effective numerical aperture is increased.

Figure 8:
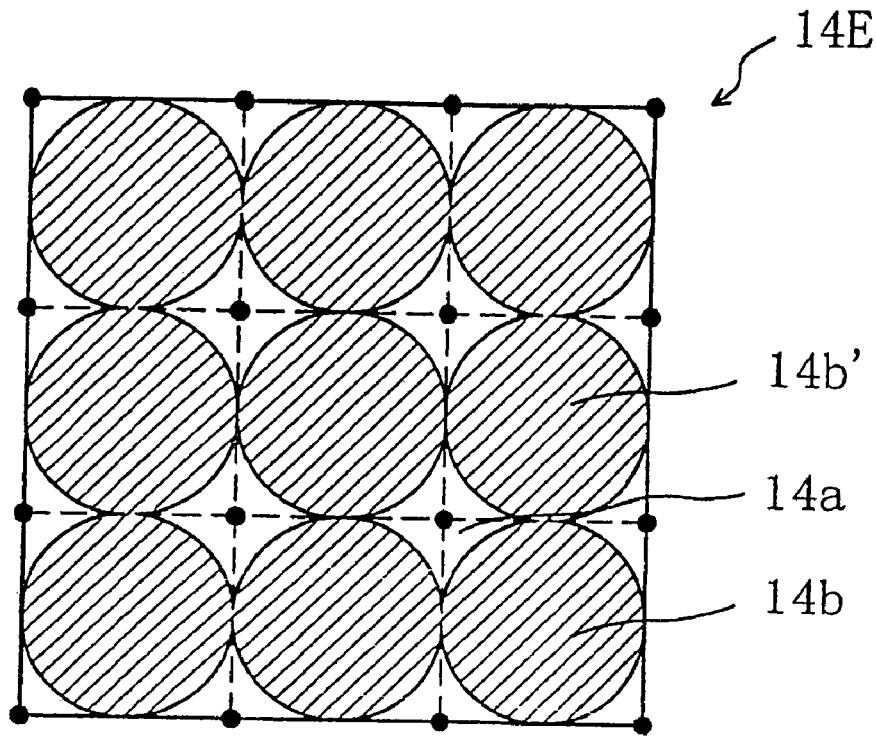
FIGS. 8(a) and 8(b) are each a plan view schematically showing still another picture element electrode usable in a liquid crystal display device according to the present invention.
Figure 8:
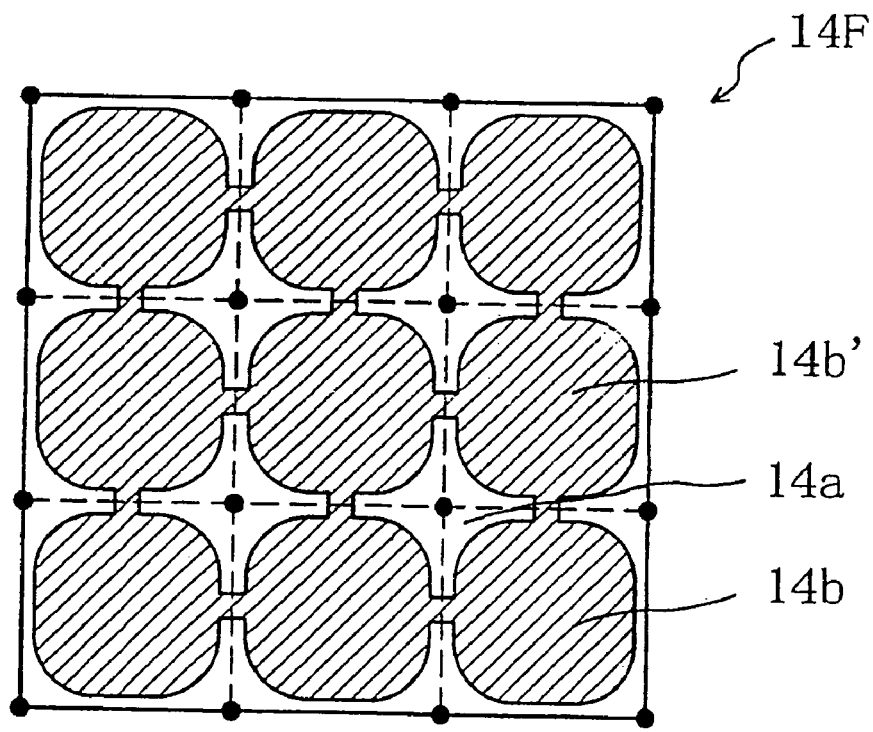

In view of the above-mentioned continuity of the orientation direction of the liquid crystal molecules 30a, picture element electrodes 14E and 14F as shown in FIG. 8(a) and FIG. 8(b) respectively are also usable. The picture element electrode 14E shown in FIG. 8(a) is a variation of the picture element electrode 14 shown in FIG. 1(a), and has openings 14a defined only by four arcs. The picture element electrode 14F shown in FIG. 8(b) is a variation of the picture element electrode 14D shown in FIG. 7(b), and the edges of the openings 14a bordered with the unit solid portions 14b' are arc-shaped. In both of the picture element electrodes 14E and 14F, the openings 14a and the unit solid portions 14b' have a four-fold rotation axis and are arranged in a square lattice pattern (having four-fold rotation axis). Alternatively, as shown in FIG. 6(a) and FIG. 6(b), the openings 14a and the unit solid portions 14b' may be distorted in shape so as to have a two-fold rotation axis and arranged in an oblong rectangular lattice pattern (having two-fold rotation axis).

Figure 9:
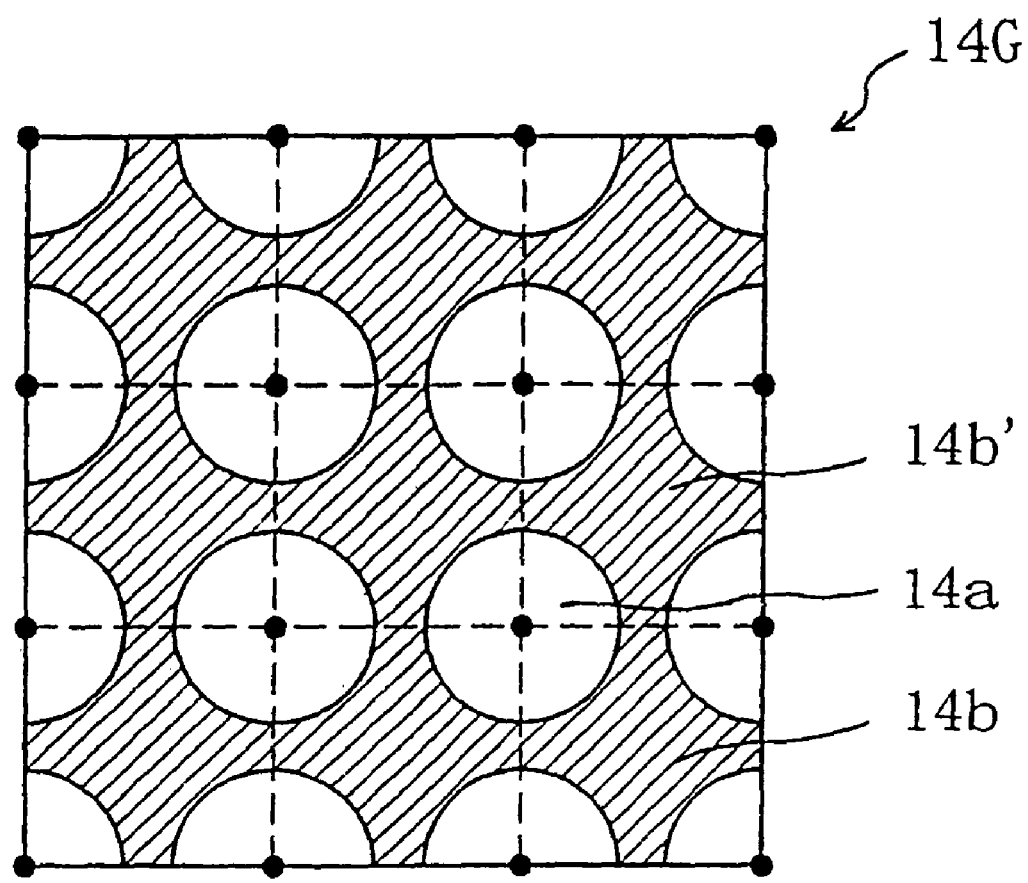
FIG. 9 is a plan view schematically showing still another picture element electrode usable in a liquid crystal display device according to the present invention.
Figure 10:
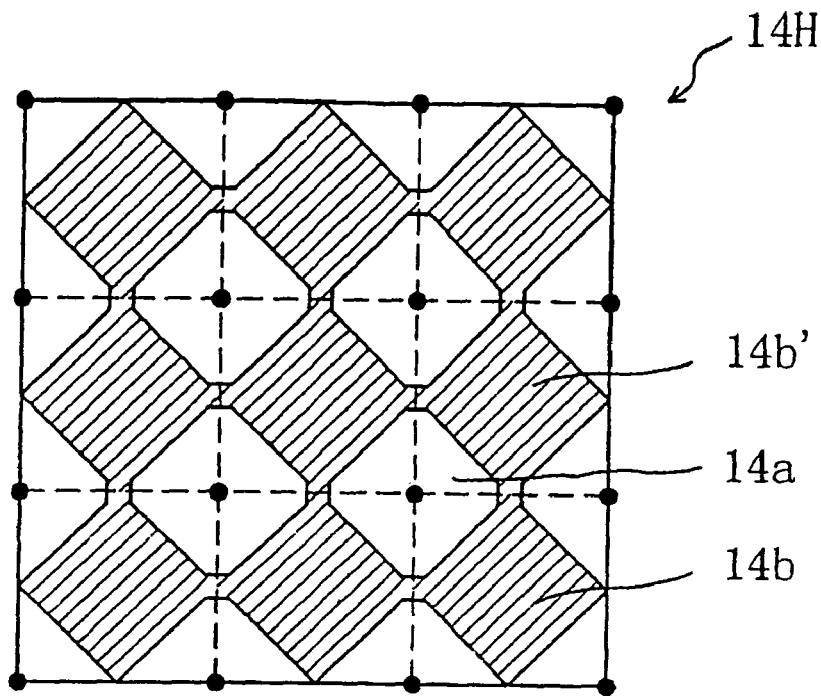
FIGS. 10(a) and 10(b) are each a plan view schematically showing still another picture element electrode usable in a liquid crystal display device according to the present invention.
Figure 10:
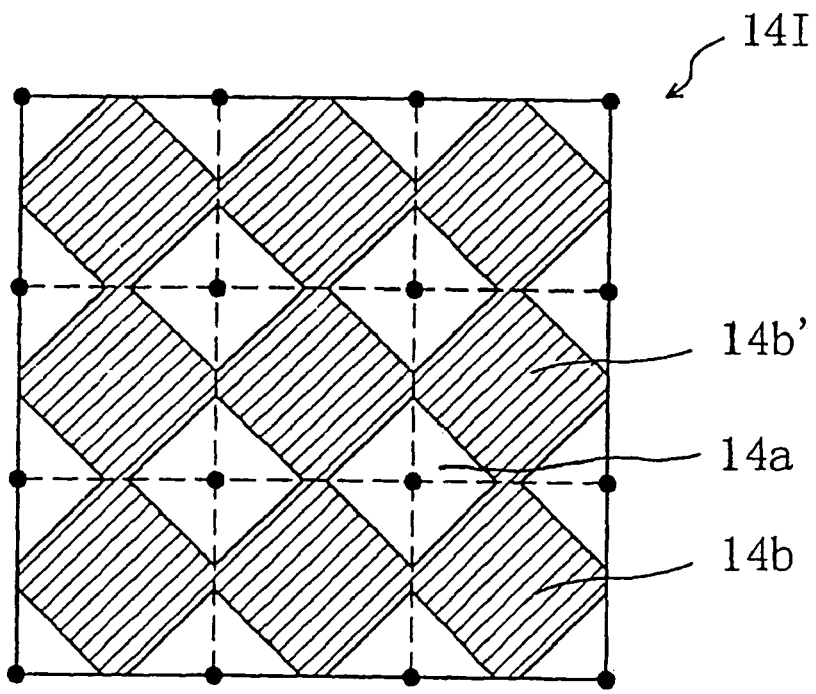

In the above-described examples, the openings 14a are generally star-shaped or generally cross-shaped and the unit solid portions 14b' are generally circular, generally elliptical, generally square (rectangular) or generally rectangular with rounded corners. Alternatively, the openings 14a and the unit solid portions 14b' may be inverted in a negative/positive manner. For example, FIG. 9 is a plan view showing a picture element electrode 14G having a pattern in which the openings 14a and the solid portion 14b of the picture element electrode 14 shown in FIG. 1(a) are inverted in a negative/positive manner. The picture element electrode 14G, shown in FIG. 9, having a pattern inverted in negative/positive manner has substantially the same functions as those of the picture element electrode 14 shown in FIG. 1(a). FIG. 10(a) and FIG. 10(b) respectively show a picture element electrode 14H and a picture element electrode 14I, which have patterns inverted to each other in a negative/positive manner. Where the openings 14a and the unit solid portions 14b' are both generally square as in the case of the picture element electrodes 14H and 14I, the pattern obtained by the negative/positive inversion may be the same as the pre-inversion pattern.

Even in the case where the openings 14a and the unit solid portions 14b' in FIG. 1(b) are inverted as shown in FIG. 9, it is preferable to form a part (a half or a quarter) of the opening 14a in the end portions of the picture element electrode 14, such that the unit solid portions 14b' having rotational symmetry are formed. With such a pattern, the effect by the oblique electric field is provided in the edge portions of the picture element region as in the central portion thereof, which realizes a stable radially-inclined orientation in the entirety of the picture element region.

Hereinafter, whether the pattern should be inverted in a negative/positive manner or not will be described with reference to FIG. 9, which shows the picture element electrode 14G where the openings 14a and the unit solid portions 14b' in FIG. 1(b) are inverted.

With or without the negative/position inversion, the length of each edge of the opening 14a is the same. No difference is presented by these patterns in terms of the function of producing an oblique electric field. However, the area size ratio of the unit solid portions 14b' (with respect to the entire area size of the picture element region) may be different between these patterns. More specifically, the area size of the solid portion 14b for producing an electric field exerted on the liquid crystal molecules in the liquid crystal layer (the area actually having the conductive film) may be different between these patterns.

The voltage applied across the liquid crystal domains formed in positional correspondence with the openings 14a is lower than the voltage applied across the liquid crystal domains formed in positional correspondence with the solid portions 14b. Therefore, for example, in a normally black mode, the display provided by the liquid crystal domains formed in positional correspondence with the openings 14a is darker. In other words, as the area size ratio of the openings 14a increases, the display brightness tends to decrease. Thus, it is preferable that the area size ratio of the solid portion 14b is higher.

Which of the pattern in FIG. 1(a) or FIG. 9 provides a larger area size ratio of the solid portion 14b depends upon the pitch (size) of the unit lattice.

Figure 11:
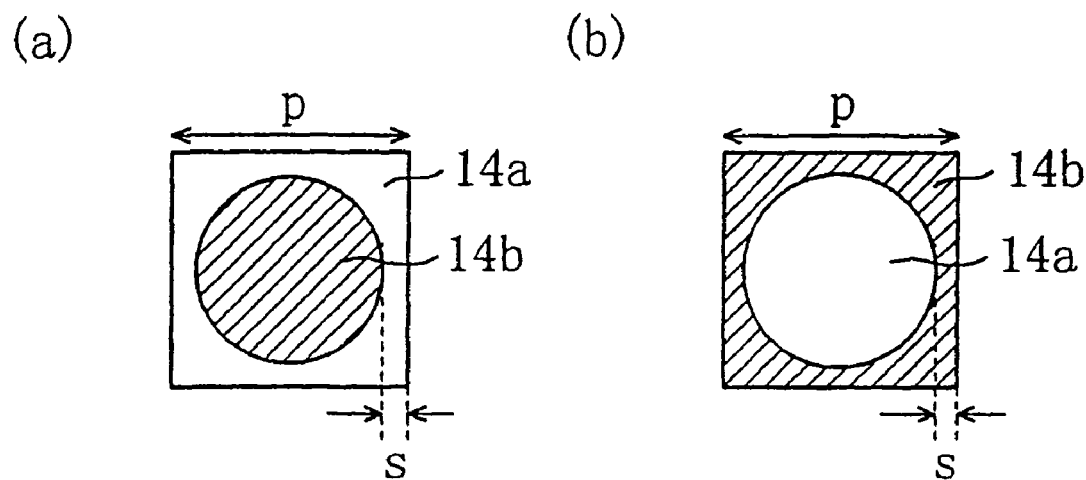
FIG. 11(a) schematically shows a unit lattice of the pattern shown in FIG. 1(a), FIG. 11(b) schematically shows a unit lattice of the pattern shown in FIG. 9.
FIG. 11(c) is a graph illustrating the relationship between pitch p and the area size ratio of a solid portion.
Figure 11:
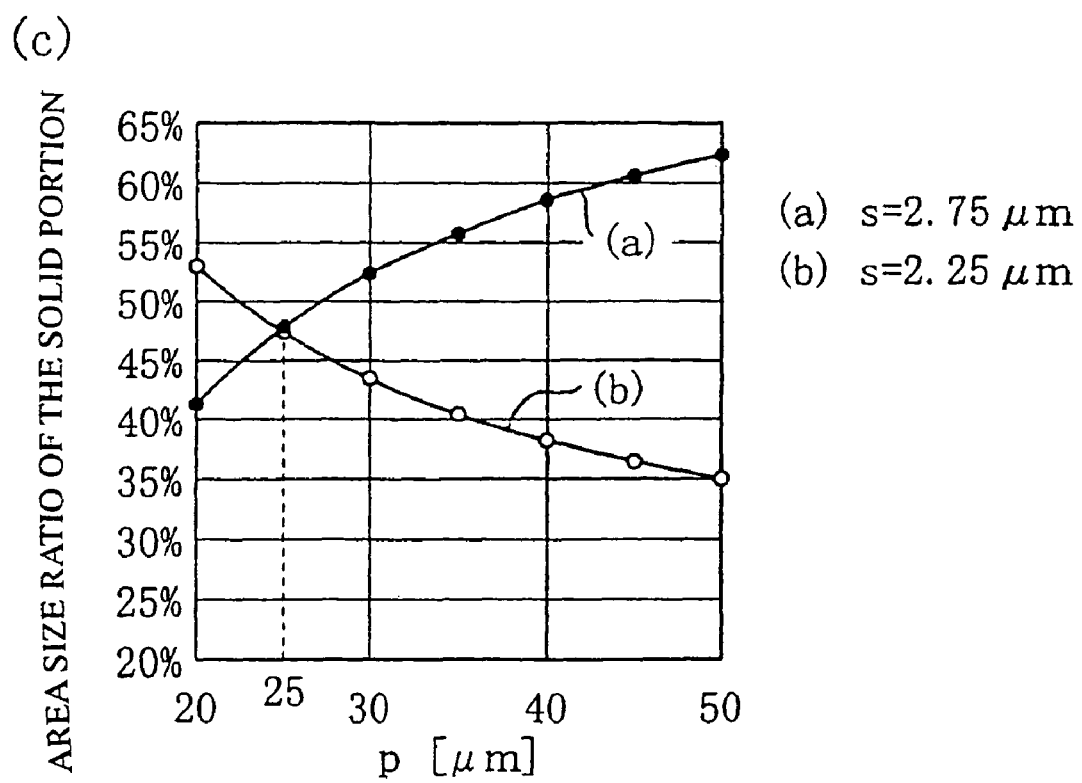

FIG. 11(a) shows a unit lattice of the pattern shown in FIG. 1(a), and FIG. 11(b) shows a unit lattice of the pattern shown in FIG. 9 (centered around the opening 14a). In FIG. 11(b), portions for connecting the unit solid portions 14b' to each other (branches extending in four directions from the circular area) in FIG. 9 are omitted. The length of each side of the square unit lattice (pitch) is p, and the length between the unit solid portion 14b' and the side edge of the unit lattice (the one-side space) is s.

Various picture element electrodes 14 which are different in the values of pitch p and one-side space were produced, and the stability of the radially-inclined orientation and the like were examined. As a result, it was found out that in order to produce an oblique electric field required for obtaining a radially-inclined orientation using a picture element electrode 14 having the pattern shown in FIG. 11(a) (hereinafter, referred to as a "positive pattern"), the one-side space s needs to be at least about 2.75 µm. It was also found out that in order to produce an oblique electric field required for obtaining a radially-inclined orientation using a picture element electrode 14 having the pattern shown in FIG. 11(b) (hereinafter, referred to as a "negative pattern"), the one-side space s needs to be at least about 2.25 µm. The area size ratio of the solid portion 14b with different values of pitch p were examined using the above-mentioned value of the one-side space s as the lower limit. The results are shown in Table 1 and FIG. 11(c).

TABLE 1

| | Area size ratio of the solid portion (%) | |
|---|---|---|
| Pitch (μm) | Positive (a) | Negative (b) |
| 20 | 41.3 | 52.9 |
| 25 | 47.8 | 47.2 |
| 30 | 52.4 | 43.3 |
| 35 | 55.8 | 40.4 |
| 40 | 58.4 | 38.2 |
| 45 | 60.5 | 36.4 |
| 50 | 62.2 | 35.0 |

As can be appreciated from Table 1 and FIG. 11(c), when the pitch p is about 25 μm or longer, the area size ratio of the solid portion 14b is higher in the positive pattern (FIG. 11(a)); whereas when the pitch p is shorter than 25 μm, the area size ratio of the solid portion 14b is higher in the negative pattern (FIG. 11(b)). Accordingly, the pattern to adopted in view of the display brightness and the stability of orientation changes, with the value of pitch p of about 25 μm as the border. For example, in the case where three or less unit lattices are provided in the width direction of the picture element electrode 14 having a width of 75 μm, the positive pattern shown in FIG. 11(a) is preferable; whereas in the case where four or more unit lattices are provided, the negative pattern shown in FIG. 11(b) is preferable. In any other pattern than those described above, a positive pattern or a negative pattern can be selected such that the area size ratio of the solid portion 14b is larger.

The number of the unit lattices is obtained as follows. The size of the unit lattice is calculated such that one, or at least two (integer), unit lattices are located in the width direction (horizontal or vertical direction) of the picture element electrode 14, and the area size ratio of the solid portion is calculated for each size of the unit lattice. Then, the size of the unit lattice at which the area size ratio of the solid portion is maximum is selected. It should be noted that the orientation-regulating force of the oblique electric field is lowered and thus a stable radially-inclined orientation is unlikely to be obtained, when the diameter of the unit solid portion 14b' is less 15 μm in the case of a positive pattern and when the diameter of the opening 14a is less 15 μm in the case of a negative pattern. The above-mentioned lower limit of the diameter is for the case where the thickness of the liquid crystal layer 30 is about 3 μm. When the thickness of the liquid crystal layer 30 is smaller than about 3 μm, a stable radially-inclined orientation is obtained even when the diameter of the unit solid portion 14b' and the opening 14a is shorter than the above-mentioned lower limit. When the thickness of the liquid crystal layer 30 is larger than about 3 μm, the lower limit of the diameter of the unit solid portion 14b' and the opening 14a for obtaining a stable radially-inclined orientation is higher than the above-mentioned value.

As described below, the stability of the radially-inclined orientation can be increased by forming a protrusion in the opening 14a or on the counter substrate 100b. The above-described conditions are for the case where no protrusion is formed.

Hereinafter, with reference to FIG. 12(a) and FIG. 12(b), the liquid crystal display device 100 according to the present invention will be described in more detail. FIG. 12(a) shows a picture element electrode 14 having an external shape defined to have no opening and three unit solid portions 14b'.

As shown in FIG. 12(a) and FIG. 12(b), the TFT substrate 100a includes a picture element electrode 14 provided in each picture element region, a thin film transistor (not shown) electrically connected to the picture element electrode 14, and a scanning line 2 and a signal line 4 both electrically connected to the thin film transistor. The TFT substrate 100a further includes a storage capacitor line 6 and a storage capacitor electrode 8 opposing the storage capacitor line 6 and electrically connected to a drain electrode of the thin film transistor.

As shown in FIG. 12(b), a first insulating layer (first inter-layer insulating layer) 3 is provided between the storage capacitor line 6 and the storage capacitor electrode 8. A second insulating layer (second inter-layer insulating layer) 7 is provided so as to cover the above-mentioned lines and the thin film transistor. The picture element electrode 14 is provided on the second insulating layer 7.

Figure 13:
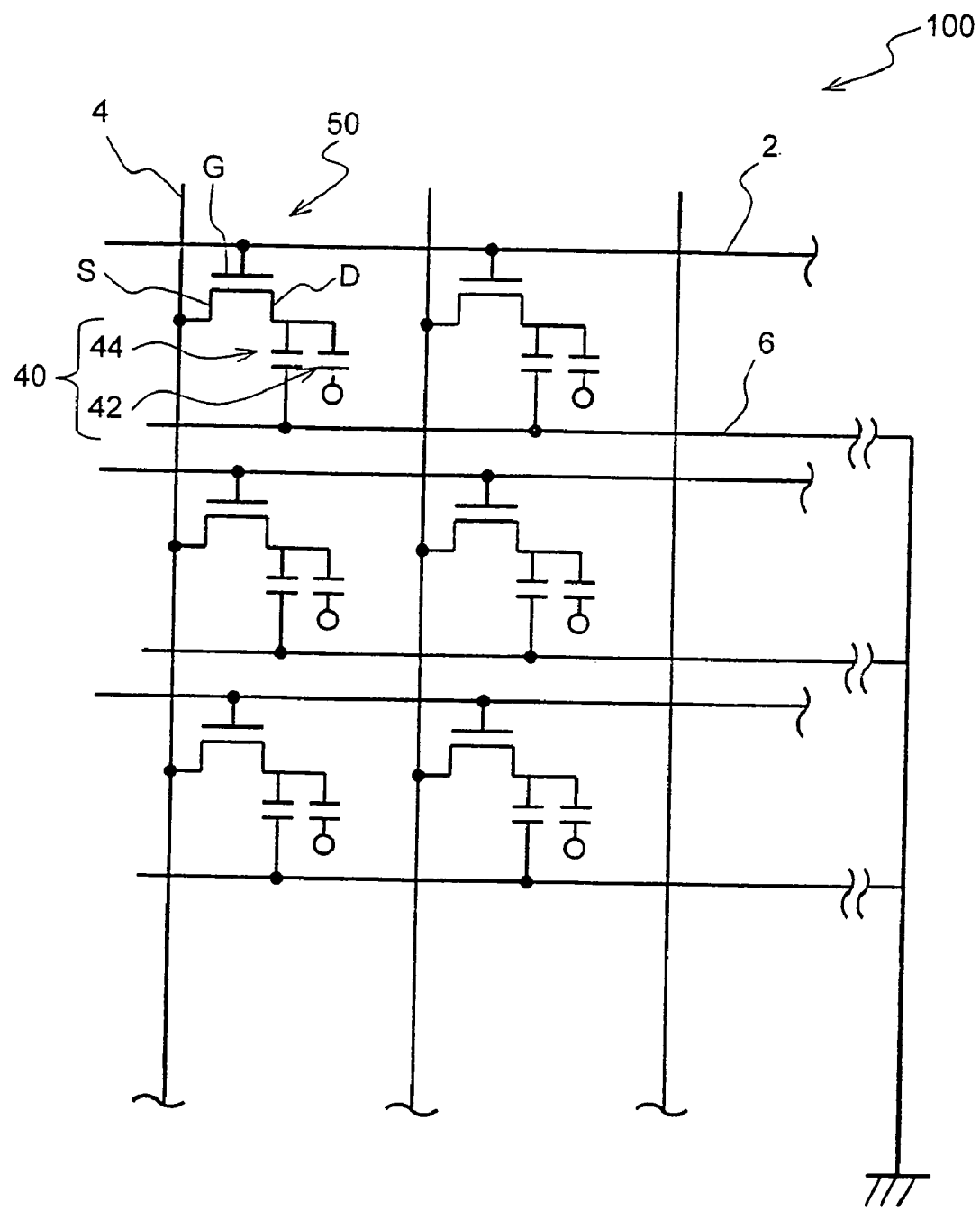
FIG. 13 is a diagram showing an equivalent circuit of the liquid crystal display device 100 according to the present invention.

The picture element electrode 14, the counter electrode 22 and the liquid crystal layer 30 form a "liquid crystal capacitor". The storage capacitor line 6, the storage capacitor electrode 8 and the first insulating layer 3 form a "storage capacitor" (also referred to as an "accumulated capacitor"). In other words, as shown in FIG. 13 showing an equivalent circuit, the liquid crystal display device 100 includes a picture element capacitor 40 electrically connected to each of a plurality of thin film transistors 50. The picture element capacitance 40 includes a liquid crystal capacitor 42 and a storage capacitor 44 connected electrically in parallel to the liquid crystal capacitor 42. If the picture element capacitance 40 includes only the liquid crystal capacitor 42, the voltage is lowered by a current leak of the liquid crystal capacitor 42. In order to suppress or prevent this, the storage capacitor 44 is provided.

The storage capacitor line 6 and the storage capacitor electrode 8 which are included in the storage capacitor 44 are typically formed of a light-shielding material. In this embodiment, the storage capacitor line 6 is formed by patterning the same metal layer as that used for a gate electrode G of the thin film transistor 50 and the scanning line 2 (for example, a single layer or laminated layers of Al, Ta, W, ITO or a compound thereof). The storage capacitor electrode 8 is formed by patterning the same metal layer as that used for a source electrode S and a drain electrode D of the thin film transistor 50 and the signal line 4 (for example, a single layer or laminated layers of Al, Ta, W, ITO or a compound thereof).

The first insulating layer 3 is typically a part of a gate insulating layer (for example, an SiN layer or an $SiO_2$ layer) formed in substantially the entirety of the TFT substrate 100a so as to cover the gate electrode G of the thin film transistor 50 and the scanning line 2. In this embodiment, the second insulating layer 7 is a film formed of a resin material so as to cover the source electrode S and the drain electrode D of the thin film transistor 50, the signal line 4 and the storage capacitor electrode 8 (the second insulating layer 7 is, for example, a resin film having a thickness of 2.5 μm to 3.2 μm).

As shown in FIG. 12(a) and FIG. 12(b), the storage capacitor line 6, the storage capacitor electrode 8 and the first insulating layer 3 are mostly located between two adjacent unit solid portions 14b'. Namely, in the liquid crystal display device 100 of the present invention, a major part of the storage capacitor 44 is located in an area of the picture element region where no solid portion 14b is provided (namely, in an area in the TFT substrate 100a where the conductive film of the picture element electrode 14 is not provided). Therefore, the effective numerical aperture (transmittance) is suppressed from being lowered due to the storage capacitor 44 typically including a light-shielding member, and thus the area size of the solid portion 14b contributing to the display can be increased. As a result, a bright display is realized.

The effect that the effective numerical aperture is increased owing to the above-described structure is specific to liquid crystal display devices having an electrode structure for realizing a radially-inclined orientation. The reason is as follows. In an electrode structure for realizing a radially-inclined orientation, as described above with reference to FIG. 1 through 11, areas where no solid portion 14*b* (conductive film) is provided are actively formed in the picture element region by forming the openings 14*a* in the picture element electrode 14, or by defining the external shape of the picture element electrode 14 such that the electrode 14 has a plurality of unit solid portions 14*b*'. By contrast, in general liquid crystal display devices (for example, TN type liquid crystal display devices), the picture element electrodes have substantially the same shape as that of the picture element regions (typically, generally rectangular). Therefore, the effect of increasing the numerical aperture is not provided even if the storage capacitor is located at a different position in the picture element region. Rather, in such general liquid crystal display devices, a storage capacitor is formed by overlapping a storage capacitor line and a part of the picture element electrode with an insulating film interposed therebetween.

In this embodiment, the TFT substrate 100*a* includes the second insulating layer 7 for covering the thin film transistor 50 and the storage capacitor electrode 8, and the picture element electrode 14 is provided on the second insulating layer 7. Owing to such a structure, the picture element electrode 14 can be provided so as to partially overlap the thin film transistor 50, the scanning line 2, the signal line 4, and the like. This further increases the numerical aperture.

In order to produce an oblique electric field having a sufficient strength to obtain a radially-inclined orientation, the second insulating layer 7 is preferably a thick film. The storage capacitor electrode 8 included in the storage capacitor 44 is electrically connected to the drain electrode D of the thin film transistor 50, and has substantially the same potential as that of the solid portion 14 of the picture element electrode 14. Therefore, if a part of the storage capacitor electrode 8 is located in an area with no solid portion 14*b*, the equipotential line EQ produced upon application of a voltage does not sufficiently drop at the area with no solid portion 14*b*. As a result, a sufficiently strong oblique electric field may not be produced above the unit solid portion 14*b*' or the vicinity thereof.

Where the second insulating layer 7 is a thick film, the voltage drop caused by the second insulating layer 7 can be sufficiently large and thus the equipotential line EQ can sufficiently drop at the area with no solid portion 14*b*. As a result, a sufficiently strong oblique electric field can be produced above the unit solid portion 14*b*' and the vicinity thereof. Also where the second insulating layer 7 is a thick film, one surface of the second insulating layer 7 which is closer to the liquid crystal layer 3 can be substantially flat. This prevents the solid portion 14*b* of the picture element electrode 14 formed on the surface from being stepped.

Figure 14:
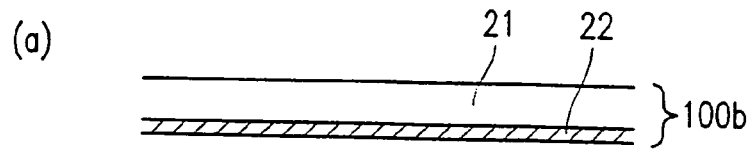
FIG. 14(a) and FIG. 14(b) are each a cross-sectional view schematically showing a liquid crystal display device having a thin film as a second insulating layer.
Figure 14:
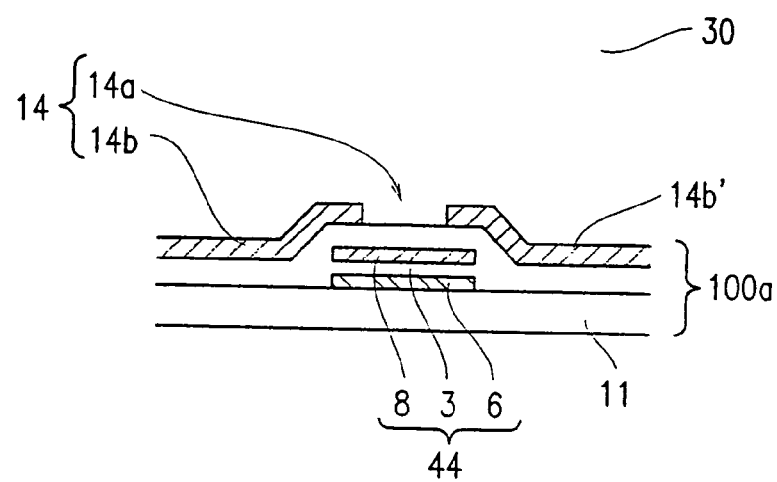
Figure 14:
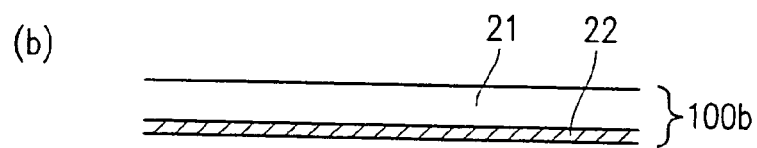
Figure 14:
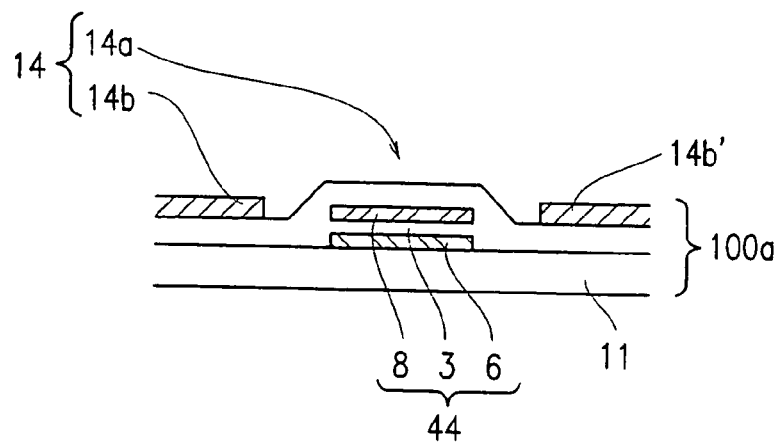

By contrast, where the second insulating layer 7 is a thin layer (for example, a thin film formed of an inorganic material) as shown in FIG. 14(*a*), a sufficiently strong oblique electric field may not be produced above the unit solid portion 14*b*' or the vicinity thereof. In this case, one surface of the second insulating layer 7 which is closer to the liquid crystal layer 30 may be stepped, reflecting the thickness of the storage capacitor 44. This may cause the solid portion 14*b* of the picture element electrode 14 to be stepped. A sufficiently strong oblique electric field can be produced by, as shown in FIG. 14(*b*), keeping a certain interval between two adjacent unit solid portions 14*b*' such that the storage capacitor 44 and the solid portion 14*b* do not substantially overlap each other. However, such a structure lowers the area size ratio of the solid portion 14*b* and thus does not provide a sufficient effect of increasing the effective numerical aperture.

Specifically, in order to obtain a sufficiently stable radially-inclined orientation, the second insulating layer 7 has a thickness of preferably 1 μm or greater, and more preferably 2.5 μm or greater. The second insulating layer 7 is easily formed to be a thick film by using a resin material (for example, a photosensitive transparent resin material such as an acrylic resin).

Figure 12:
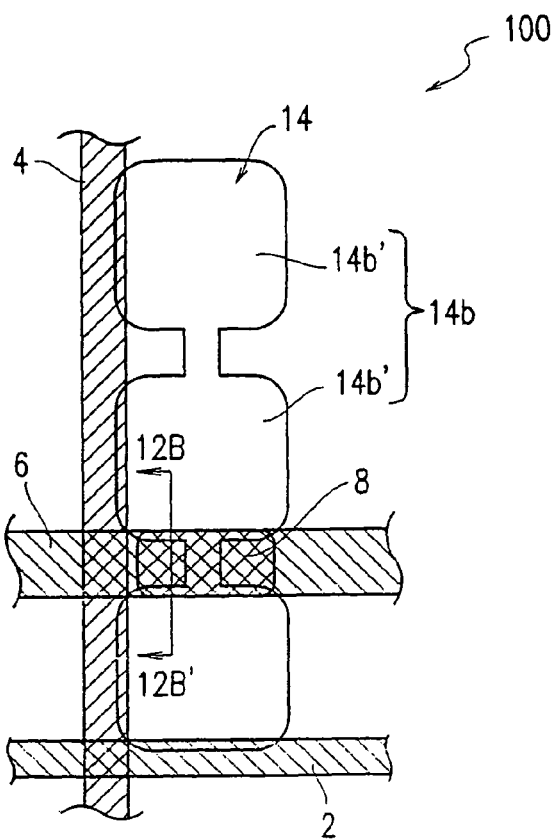
Figure 12:
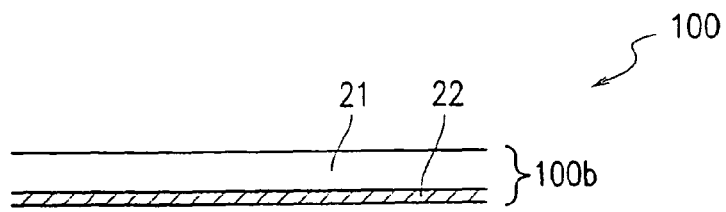
Figure 12:
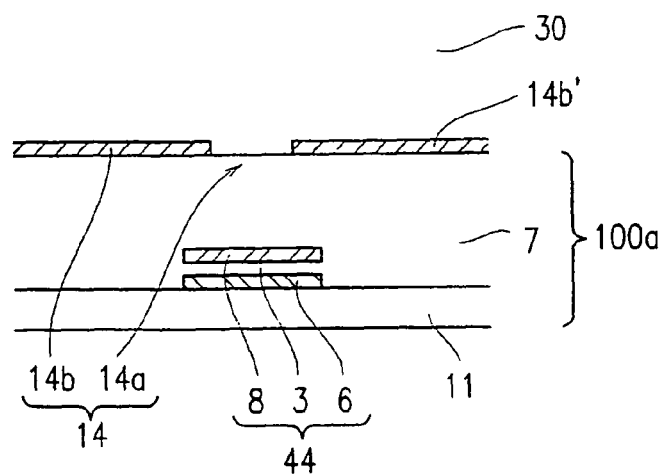

FIG. 12(*a*) and FIG. 12(*b*) show an example in which a major part of the storage capacitor 44 is located in an area with no solid portion 14*b*. The present invention is not limited to this. The effect of increasing the effective numerical aperture can be provided by locating at least a part of the storage capacitor 44 in an area with no solid portion 14*b*. In order to sufficiently increase the numerical aperture, however, it is preferable that a largest possible part of the storage capacitor 44 is located in an area with no solid portion 14*b*. Specifically, preferably at least ¼ of, more preferably at least ½ of, and still more preferably almost the entirety of, the storage capacitor 44 is located in an area with no solid portion 14*b*.

The value of capacitance required of the storage capacitor 44 is varied in accordance with the specifications of the liquid crystal display device. Due to a design-related reason, it may be occasionally difficult to locate the entirety of the storage capacitor 44 in an area with no solid portion 14*b*. In this case, the storage capacitor 44 may overlap the solid portion 14*b* as necessary. It is acceptable to simply enlarge the width of the storage capacitor line 6 or the storage capacitor electrode 8 in order to obtain a desired value of capacitance. Nonetheless, it is recommended to use a branch structure for the storage capacitor line 6 or the storage capacitor electrode 8. This enhances the degree of designing freedom regarding the arrangement of the storage capacitor 44 in the picture element region, and thus provides a sufficient effective numerical aperture while a sufficient value of capacitance is guaranteed.

FIG. 15(*a*) and FIG. 15(*b*) schematically show a liquid crystal display device 200 using a branch structure for the storage capacitor line 6 and the storage capacitor electrode 8.

As shown in FIG. 15(*a*) and FIG. 15(*b*), the storage capacitor line 6 includes a line stem 6*a* extending generally parallel to the scanning line 2 and a line branch 6*b* branched from the line stem 6*a*. The storage capacitor electrode 8 includes an electrode stem 8*a* opposing the line stem 6*a* with the first insulating layer interposed therebetween and an electrode branch 8*b* branched from the electrode stem 8*a*.

The striped line stem 6*a* and the strip-like electrode stem 8*a* oppose each other with the first insulating layer 3 interposed therebetween and form a part of the storage capacitor 44. The line branch 6*b* and the electrode branch 8*b* also oppose each other with the first insulating layer 3 interposed therebetween and form a part of the storage capacitor 44. In this embodiment, the line branch 6*b* and the electrode branch 8*b* are branched so as to overlap the center of the unit solid portion 14*b*' and the vicinity thereof.

Typically, a contact hole is formed in a part of the second insulating layer 7 which is on the electrode branch 8*b*, and the picture element electrode 14 and the electrode branch 8*b* are connected to each other via the contact hole. Namely, the picture element electrode 14 is electrically connected to the drain electrode of the thin film transistor via the electrode branch 8*b* (the storage capacitor electrode 8).

In the liquid crystal display device 200, as shown in FIG. 15(*a*) and FIG. 15(*b*), a part of the storage capacitor 44, more specifically, a major part of the storage capacitor 44, which is formed of the line stem 6a, the electrode stem 8a and a part of the first insulating layer 3 located therebetween, is located in an area with no solid portion 14b. Therefore, the liquid crystal display device 200 provides the effect of increasing the numerical aperture, like the liquid crystal display device 100.

In the liquid crystal display device 200, a branch structure is adopted for the storage capacitor electrode 8 so as to form a contact section in the solid portion 14b of the picture element electrode 14. A branch structure is adopted also for the storage capacitor line 6 so as to form a capacitance overlapping the solid portion 14b (formed of the line branch 6b, the electrode branch 8b and a part of the first insulating layer 3 located therebetween). In this way, a capacitance overlapping the solid portion 14b may be formed when necessary.

Next, with reference to FIG. 16, another liquid crystal display device 300 according to the present invention will be described. In the liquid crystal display device 300, the picture element electrode 14 has a plurality of openings 14a unlike the liquid crystal display devices 100 and 200, but exerts an orientation-regulating force for providing a radially-inclined orientation like the liquid crystal display devices 100 and 200.

As shown in FIG. 16, a storage capacitor line 6 of the liquid crystal display device 300 has two line stems 6a. The storage capacitor line 6 also includes a line branch 6b branched from the line stems 6a so as to connect the line stems 6a. Thus, the storage capacitor line 6 has a ladder shape as a whole.

As shown in FIG. 16, a storage capacitor electrode 8 of the liquid crystal display device 300 has two electrode stems 8a respectively opposing the line stems 6a. The storage capacitor electrode 8 also includes an electrode branch 8b branched from the electrode stems 8a so as to connect the electrode stems 8a. Thus, the storage capacitor electrode 8 has an H shape as a whole.

Also in the liquid crystal display device 300, a part of the storage capacitor is located in an area with no solid portion 14b, and the storage capacitor line 6 and the storage capacitor electrode 8 respectively have the line branch 6b and the electrode branch 8b. Therefore, the same effect as that of the liquid crystal display devices 100 and 200 is provided.

In addition, the storage capacitor line 6 includes a plurality of line stems 6a, and the storage capacitor electrode 8 includes a plurality of electrode stems 8a. Owing to such a structure, each of the line stems 6a and each of the electrode stems 8a can have a narrower width. This enables a major part of the storage capacitor, which is formed of each line stem 6a and each electrode stem 8a (and a part of the first insulating layer 3 located therebetween), to be located in an area with no solid portion 14b. The degree of designing freedom is enhanced by forming a plurality of line stems 6a in the storage capacitor line 6 and a plurality of electrode stems 8a in the storage capacitor electrode 8. As a result, a larger part of the storage capacitor 44 can be located in an area with no solid portion 14b. The liquid crystal display device can be designed to have a higher numerical aperture.

Next, with reference to FIG. 17(a) through FIG. 17(d), an orientation-regulating structure provided in a counter substrate will be described. FIG. 17(a) through FIG. 17(d) each schematically show a counter substrate 400b having an orientation-regulating structure 28. The orientation-regulating structure 28 shown in each of FIG. 17(a) through FIG. 17(d) exerts an orientation-regulating force upon the liquid crystal molecules in the liquid crystal layer 30 at least in a state where a voltage is applied between the picture element electrode 14 and the counter electrode 22, and acts to place the liquid crystal molecules 30a in the liquid crystal layer 30 into a radially-inclined orientation. The orientation-regulating direction provided by the orientation-regulating structure 28 matches the orientation-regulating direction provided by an oblique electric field produced in the vicinity of the unit solid portion 14b'.

The orientation-regulating structure 28 shown in FIG. 17(a) is realized by an opening 22a of the counter electrode 22. A vertical alignment film (not shown) is provided on one surface of a counter substrate 300b which is closer to the liquid crystal layer 30.

The orientation-regulating structure 28 exerts an orientation-regulating force only in the presence of an applied voltage. The orientation-regulating structure 28 is only required to exert an orientation-regulating force upon the liquid crystal molecules 30a in each liquid crystal domain formed by the unit area 14b of the picture element electrode 14. Therefore, the size of the opening 22a is smaller than the opening 14a in the picture element electrode 14 and is smaller than the unit solid portion 14b' (see, for example, FIG. 1(a)). A sufficient effect can be provided, as long as the opening 22a has an area size less than or equal to one half of that of the opening 14a or the unit solid portion 14b'. Where the opening 22a of the counter electrode 22 is provided at a position opposing the center of the unit solid portion 14b' of the picture element electrode 14, the continuity of the orientation of the liquid crystal molecules 30a increases, and the position of the central axis of the radially-inclined orientation can be fixed.

As described above, in the case where an orientation-regulating structure exerting an orientation-regulating force only in the presence of an applied voltage is adopted, almost all the liquid crystal molecules 30a in the liquid crystal layer 30 take a vertical orientation in the absence of an applied voltage. Therefore, in a normally black mode, almost no light leakage occurs in a black display state. This realizes a display with a superb contrast ratio.

However, in the absence of an applied voltage, the orientation-regulating force is not exerted and thus the radially-inclined orientation is not formed. In addition, when the applied voltage is low, the orientation-regulating force is weak. For these reasons, when an excessively large stress is applied to the liquid crystal panel, an after image may be observed.

The orientation-regulating structures 28 shown in each of FIG. 17(b) through FIG. 17(d) exerts an orientation-regulating force regardless of the presence/absence of an applied voltage. Such an orientation-regulating structure 28 provides a stable radially-inclined orientation at any display gray level and a high resistance to a stress.

The orientation-regulating structure 28 shown in FIG. 17(b) has a protrusion 22b protruding toward the liquid crystal layer 30 from the counter electrode 22. Although there is no particular limitation on the material of the protrusion 22b, the protrusion 22b can be easily formed by using a dielectric material such as a resin. A vertical alignment film (not shown) is provided on one surface of the counter substrate 400b which is closer to the liquid crystal layer 30. The protrusion 22b places the liquid crystal molecules 30a into a radially-inclined orientation by the effect of the configuration of the surface thereof (the surface having a vertical alignment power). The protrusion 22b shown in FIG. 15(a) or FIG. 16 has the same function. It is preferable to use a resin material deformable by heat, in which case the protrusion 22b having a mildly humped cross-section as shown in FIG. 17(b) can be easily formed by heat treatment performed after patterning. As shown in the figure, the protrusion 22b having a mildly humped cross-section with a vertex (for example, a part of a sphere) or a conical protrusion provides a superb effect of fixing the central position of the radially-inclined orientation.

The orientation-regulating structure 28 shown in FIG. 17(c) is realized by a horizontal alignment surface, opposing the liquid crystal layer 30, of an opening (or a recess) 23a formed in a dielectric layer 23 formed below the counter electrode 22 (i.e., on one side of the counter electrode 22). In this embodiment, the surface of the opening 23a is made a horizontal alignment surface by avoiding a vertical alignment film 24, formed on one surface of the counter substrate 400b which is closer to the liquid crystal layer 30, from being formed only in the opening 23a. Alternatively, as shown in FIG. 17(d), a horizontal alignment film 25 may be provided only in the opening 23a.

The horizontal alignment film shown in FIG. 17(d) may be provided by, for example, first forming the vertical alignment film 24 on the entire surface of the counter substrate 200b, and then selectively irradiating a part of the vertical alignment film 24 which is in the opening 23a with UV light so as to reduce the vertical alignment power thereof. The horizontal alignment power required for the orientation-regulating structure 28 does not need to be so high that the resulting pretilt angle is as small as that resulting from an alignment film which is used in a TN type liquid crystal display device. For example, a pretilt angle of 45 degrees or less is acceptable.

As shown in FIG. 17(c) and FIG. 17(d), on the horizontal alignment surface in the opening 23a, the liquid crystal molecules 30a are urged to be oriented horizontal with respect to the substrate surface. As a result, the liquid crystal molecules 30a take an orientation which is continuous with the orientation of the surrounding, vertically aligned liquid crystal molecules 30a on the vertical alignment film 24. Thus, the radially-inclined orientation as shown in each of FIG. 17(c) and FIG. 17(d) is obtained.

A radially-inclined orientation can be obtained only by selectively providing a horizontal alignment surface (for example, a surface of an electrode or a horizontal alignment film) on the flat surface of the counter electrode 22, without forming a recess (which is realized by the opening in the dielectric layer 23) in the surface of the counter electrode 22. Nonetheless, the recess has an effect of further stabilizing the radially-inclined orientation by virtue of the surface configuration thereof.

It is preferable to use, for example, a color filter layer or an overcoat layer of a color filter layer as the dielectric layer 23 in order to form a recess in the surface of the counter substrate 400b which is closer to the liquid crystal layer 30. In this manner, the number of production steps does not increase. In the structures shown in FIG. 17(c) and FIG. 17(d), no region of the liquid crystal layer 30 is supplied with a voltage via the protrusion 22b, unlike in the structure shown in FIG. 17(b). Therefore, the light utilization efficiency is reduced very little.

FIG. 18(a) show a cross-sectional structure of a liquid crystal display device 400 having any of the orientation-regulating structures described above. In FIG. 18(a), the storage capacitor of a TFT substrate 100a is omitted.

The liquid crystal display device 400 includes the TFT substrate 100a having a picture element electrode 14 including a solid portion 14b, and a counter substrate 400b having an orientation-regulating structure 28. In this embodiment, the orientation-regulating structure 28 exerts an orientation-regulating force even in the absence of an applied voltage (FIG. 17(b) through FIG. 17(d)). The orientation-regulating structure 28 shown in FIG. 17(a) is also usable. Instead of the TFT substrate 100a shown in FIG. 18(a), a TFT substrate 200a shown in FIG. 15 is usable.

The orientation-regulating structure 28 provided in the counter substrate 400b is located in an area corresponding to the unit solid portion 14b' of the picture element electrode 14, more specifically, in an area corresponding to the center of the unit solid portion 14b' and the vicinity thereof. In a state where a voltage is applied across the liquid crystal layer 30, i.e., in a state where a voltage is applied between the picture element electrode 14 and the counter electrode 22, such an arrangement allows the orientation-regulating direction provided by the oblique electric field produced in the vicinity of the solid portion 14b to match the orientation-regulating direction provided by the orientation-regulating structure 28. As a result, the radially-inclined orientation is stabilized. This is schematically shown in FIG. 18(a) through FIG. 18(c). FIG. 18(a) shows a state in the absence of an applied voltage. FIG. 18(b) shows a state where the orientation has just started to change (initial ON state) after application of a voltage, and FIG. 18(c) schematically shows a steady state in the presence of an applied voltage.

As shown in FIG. 18(a), the orientation-regulating force exerted by the orientation-regulating structure 28 (FIG. 17(b) through FIG. 17(d)) acts upon the liquid crystal molecules 30a in the vicinity thereof even in the absence of an applied voltage, and forms a radially-inclined orientation.

When a voltage starts to be applied, an electric field represented by equipotential lines EQ shown in FIG. 18(b) is produced (by the solid portion 14b), and a liquid crystal domain in which the liquid crystal molecules 30a are in a radially-inclined orientation is formed in a region corresponding to each opening 14a and a region corresponding to each unit solid portion 14b'. Then, the liquid crystal layer 30 reaches a steady state shown in FIG. 18(c). The inclination direction of the liquid crystal molecules 30a in each liquid crystal domain matches the inclination direction of the liquid crystal molecules 30a caused by the orientation-regulating force of the orientation-regulating structure 28 provided in each corresponding region.

As can be appreciated from the above, the orientation-regulating structure 28 provided in the counter substrate 400b can further stabilize the radially-inclined orientation provided by the picture element electrode 14, and can suppress the display quality from being lowered due to a stress applied to a liquid crystal cell or the like.

When a stress is applied to the liquid crystal display device 400 in a steady state, the radially-inclined orientation in the liquid crystal layer 30 is once destroyed. Upon removal of the stress, however, the radially-inclined orientation is restored because the orientation-regulating force by the picture element electrode 14 and the orientation-regulating structure 28 acts upon the liquid crystal molecules 30a. In consequence, the generation of an after image due to a stress is suppressed. When the orientation-regulating force by the orientation-regulating structure 28 is too strong, retardation occurs due to the radially-inclined orientation even in the absence of an applied voltage. This may lower the display contrast ratio. However, the orientation-regulating force by the orientation-regulating structure 28 does not need to be very strong because such a force is only required to have an effect of stabilizing the radially-inclined orientation formed by the picture element electrode 14 and fixing the position of the central axis thereof. An orientation-regulating force which would not cause such a degree of retardation as to deteriorate the display quality is sufficient.

For example, in the case where the structure having the protrusion 22b shown in FIG. 17(b) is adopted, each protrusion 22b only needs to have a diameter of about 15 μm and a height (thickness) of about 1 μm for the unit solid portion 14b' having a diameter of about 30 μm to about 35 μm. With such protrusions, a sufficient orientation-regulating force can be obtained and the reduction in the contrast ratio caused by retardation can be suppressed to a practical level.

In the above, the orientation-regulating structures provided in the counter substrate are described. Instead of, or in addition to, the orientation-regulating structures described above, protrusions may be provided in a TFT substrate to stabilize the radially-inclined orientation.

With reference to FIG. 19(a) and FIG. 19(b), a structure of a liquid crystal display device 500 including protrusions 60 in a TFT substrate 500a will be described. FIG. 19(a) is a plan view of the liquid crystal display device 500 viewed in a direction normal to a substrate, and FIG. 19(b) is a cross-sectional view thereof taken along line 19B-19B' in FIG. 19(a). FIG. 19(b) shows a state where no voltage is applied across a liquid crystal layer. Although neither FIG. 19(a) nor FIG. 19(b) shows a storage capacitor, the liquid crystal display device 500 includes a storage capacitor, at least a part of which is located in an area with no solid portion 14b, like the liquid crystal display devices 100, 200 and 300.

As shown in 19(a) and FIG. 19(b), the liquid crystal display device 500 is different from the liquid crystal display devices described above in that a TFT substrate 500a has a protrusion 60 in the opening 14a of the picture element electrode 14. On a surface of the protrusion 60, a vertical alignment film (not shown) is provided.

As shown in FIG. 19(a), the protrusion 60 has the same shape of cross-section in a planar direction as that of the opening 14a, and is generally star-shaped in this embodiment. Adjacent protrusions 60 are connected to one another and completely surround the unit solid portions 14b' in a generally circular manner. As shown in FIG. 19(b), the protrusion 60 has a trapezoidal cross-section in a direction perpendicular to the surface of the substrate 11. Namely, the cross-section of the protrusion 60 has a top surface 60t parallel to the substrate surface and side surfaces 60s inclined at a tapering angle θ (<90 degrees) with respect to the substrate surface. The vertical alignment film (not shown) is provided so as to cover the protrusion 60. Therefore, the side surfaces 60s of the protrusion 60 exerts an orientation-regulating force upon the liquid crystal molecules 30a in the liquid crystal layer 30 in the same direction as the orientation-regulating direction provided by the oblique electric field. Thus, the side surfaces 60s act to stabilize the radially-inclined orientation.

With reference to FIG. 20(a) through FIG. 20(d), the functions of the protrusion 60 will be described.

First, with reference to FIG. 20(a) through FIG. 20(d), the relationship between the orientation of the liquid crystal molecule 30a and the surface configuration having a vertical alignment power will be described.

As shown in FIG. 20(a), a liquid crystal molecule 30a on a horizontal surface is oriented vertical to a surface having a vertical alignment power (typically, a surface of a vertical alignment film) by the orientation-regulating force thereof. When an electric field represented by an equipotential line EQ perpendicular to the axial direction of the liquid crystal molecule 30a is applied to the liquid crystal molecule 30a in such a vertical orientation state, a torque urging the liquid crystal molecule 30a to incline clockwise or a torque urging the liquid crystal molecule 30a to incline counterclockwise is produced with the same probability. Therefore, in a region of the liquid crystal layer 30 which is between a pair of parallel plate-shape electrodes opposing each other, liquid crystal molecules 30a subjected to a clockwise torque and liquid crystal molecules 30a subjected to a counterclockwise torque both exist. As a result, the transition to the orientation in accordance with the voltage applied across the liquid crystal layer 30 may not proceed smoothly.

As shown in FIG. 20(b), when an electric field represented by a horizontal equipotential line EQ is applied to a liquid crystal molecule 30a oriented vertical to an inclined surface, the liquid crystal molecule 30a is inclined in whichever direction that requires less inclination for the liquid crystal molecule 30a to be parallel to the equipotential line EQ (in the clockwise direction in the example of the figure). As shown in FIG. 20(c), liquid crystal molecules 30a oriented vertical to a horizontal surface are inclined in the same direction as that of the liquid crystal molecule 30a located on an inclined surface (in the clockwise direction in the example of the figure), such that the orientation of the former liquid crystal molecules 30a is continuous (in conformity) with the orientation of the latter liquid crystal molecule 30a.

As shown in FIG. 20(d), on a surface having a continuous concave/convex pattern and having a trapezoidal cross-section, liquid crystal molecules 30a on a top surface portion and a bottom surface portion are oriented such that the orientation directions thereof are in conformity with the orientation directions regulated by the liquid crystal molecules 30a on the respective inclined portions of the surface.

The liquid crystal display device in this embodiment stabilizes the radially-inclined orientation by matching the direction of the orientation-regulating force provided by the above-mentioned surface configuration (protrusions) and the orientation-regulating direction provided by the oblique electric field.

FIG. 21(a) and FIG. 21(b) each show a state where a voltage is applied across the liquid crystal layer 30. FIG. 21(a) schematically shows a state where the orientation, of the liquid crystal molecules 30a has just started to change (initial ON state) in accordance with the voltage applied across the liquid crystal layer 30. FIG. 21(b) schematically shows a state where the orientation of the liquid crystal molecules 30a, which has been changing in accordance with the applied voltage, has reached a steady state. In FIG. 21(a) and FIG. 21(b), curves EQ represent equipotential lines.

When the picture element electrode 14 and the counter electrode 22 are at the same potential (a state where no voltage is applied across the liquid crystal layer 30), the liquid crystal molecules 30a in the picture element region are oriented vertical to the surfaces of the substrates 11 and 21, as shown in FIG. 19(b). In this state, the liquid crystal molecules 30a in contact with the vertical alignment film (not shown) provided on the side surfaces 60s of each protrusion 60 are oriented vertical to the side surfaces 60s, and the liquid crystal molecules 30a in the vicinity of the side surfaces 60s are inclined by the interaction with the surrounding liquid crystal molecules 30a (by the property as an elastic body) as shown in FIG. 19(b).

When a voltage is applied across the liquid crystal layer 30, a potential gradient represented by the equipotential lines EQ shown in FIG. 21(a) is produced. The equipotential lines EQ are parallel to the surfaces of the solid portion 14b of the picture element electrode 14 and the counter electrode 22 in a region of the liquid crystal layer 30 which is between the solid portion 14b and the counter electrode 22. The equipotential lines EQ drop in a region corresponding to the opening 14a of the picture element electrode 14. As a result, an oblique electric field represented by an inclined portion of the equipotential lines EQ is produced in a region of the liquid crystal layer 30 above each edge portion EG of each opening 14a (a peripheral portion within the opening 14a including an external boundary of the opening 14a).

By the oblique electric field, as described above and represented by the arrows in FIG. 21(a), the liquid crystal molecules 30a above the right edge portion EG of each opening 14a incline (rotate) clockwise, and the liquid crystal molecules 30a above the left edge portion EG of each opening 14a incline (rotate) counterclockwise. As a result, the liquid crystal molecules 30a above the edge portions EG are oriented parallel to the corresponding portions of the equipotential lines EQ. The orientation-regulating direction provided by the oblique electric field is the same as the orientation-regulating direction provided by the side surfaces 60s located above the edge portions EG.

As described above, the liquid crystal molecules 30a change the orientation thereof, starting from those located on the inclined portion of the equipotential line EQ, and reach a steady state. Such a steady state is schematically shown in FIG. 21(b). The liquid crystal molecules 30a located above the center of the opening 14a and the vicinity thereof, i.e., above the center of the top surface 60t of the protrusion 60 and the vicinity thereof, are influenced substantially equally by the respective orientations of the liquid crystal molecules 30a above the opposing edge portions EG of the opening 14a, and therefore are kept vertical to the equipotential lines EQ. The liquid crystal molecules 30a far from the center of the opening 14a (the top surface 60t of the protrusion 60) are inclined by the influence of the orientation of the liquid crystal molecules 30a at the closer edge portion EG. In this manner, an inclined orientation symmetric about the center SA of the opening 14a (the top surface 60t of the protrusion 60) is formed. Also in a region corresponding to each unit solid portion 14b' substantially surrounded by the openings 14a and the protrusions 60, an inclined orientation symmetric about the center SA of the unit solid portion 14b' is formed.

As described above, in the liquid crystal display device 500 like in the liquid crystal display device 100, a liquid crystal domain taking a radially-inclined orientation is formed in positional correspondence with each opening 14a and each unit solid portion 14b'. Since the protrusions 60 are formed so as to completely surround the unit solid portions 14b' in a generally circular manner, the liquid crystal domain is formed in positional correspondence with the generally circular area surrounded by the protrusions 60. In addition, the side surfaces of the protrusion 60 formed in each opening 14a act to incline the liquid crystal molecules 30a above the edge portions EG of the opening 14a in the same direction as the orientation direction provided by the oblique electric field, and thus stabilize the radially-inclined orientation.

Naturally, the orientation-regulating force provided by the oblique electric field acts only in the presence of an applied voltage. The strength of the force depends on the strength of the electric field (the level of the applied voltage). Accordingly, when the strength of the electric field is small (i.e., when the applied voltage is low), the orientation-regulating force provided by the oblique electric field is weak. When an external force is applied to the liquid crystal panel in this state, the radially-inclined orientation may be destroyed by the flow of the liquid crystal material. Once destroyed, the radially-inclined orientation cannot be recovered unless a voltage high enough to produce an oblique electric field for exerting a sufficiently strong orientation-regulating force is applied. By contrast, the orientation-regulating force provided by the side surfaces 60s of the protrusion 60 is exerted regardless of the level of the applied voltage, and is very strong as is known as the anchoring effect of the alignment film. Therefore, even if the radially-inclined orientation is destroyed by the flow of the liquid crystal material, the liquid crystal molecules 30a in the vicinity of the side surfaces 60s of the protrusion 60 are kept oriented in the same direction as that of the radially-inclined orientation. Once the flow of the liquid crystal material stops, the radially-inclined orientation is easily recovered.

As can be appreciated from the above, the liquid crystal display device 500 has a feature of being strong against external forces in addition to the features of the liquid crystal display device 100. Owing to such a feature, the liquid crystal display device 500 is preferably used for a personal computer or a PDA which is often used as a mobile device and thus is likely to be subjected to an external force.

In the case where the protrusions 60 are formed of a highly transparent material, there is an advantage of improving the contribution ratio, to the display, of the liquid crystal domains formed in positional correspondence with the openings 14a. By contrast, in the case where the protrusions 60 are formed of an opaque material, there is an advantage of preventing light leakage caused by retardation of the liquid crystal molecules 30a inclined by the side surface 60s of the protrusions 60. Which material is to be adopted can be determined based on the use of the liquid crystal display device or the like. In either case, it is advantageous to use a photosensitive resin in simplifying the step of patterning the protrusions 60 in accordance with the openings 14a. In order to obtain a sufficient orientation-regulating force, each protrusion 60 preferably has a height of about 0.5 μm to about 2 μm when the liquid crystal layer 30 has a thickness of about 3 μm. In general, the height of each protrusion 60 is preferably about ⅙ to about ⅔ of the thickness of the liquid crystal layer 30.

As described above, the liquid crystal display device 500 has a protrusion 60 in each opening 14a of a picture element electrode 14. The side surfaces 60s of each protrusion 60 exert an orientation-regulating force upon the liquid crystal molecules 30a in the liquid crystal layer 30 in the same direction as the orientation-regulating direction provided by the oblique electric field. With reference to FIG. 22(a) through FIG. 22(c), preferable conditions for the side surfaces 60s to have an orientation-regulating force in the same direction as the orientation-regulating direction provided by the oblique electric field will be described.

FIG. 22(a) through FIG. 22(c) are cross-sectional views schematically showing liquid crystal display devices 500A, 500B and 500C, respectively, and correspond to FIG. 21(a). The liquid crystal display devices 500A, 500B and 500C each have a protrusion in each opening 14a, but are different from the liquid crystal display device 500 in the positional relationship between the entirety of the protrusion 60 as one structure element and the opening 14a.

As shown in FIG. 21(a), in the liquid crystal display device 500 described above, the protrusion 60 as a structure element is entirely formed in the opening 14a and has a bottom surface smaller than the opening 14a. In the liquid crystal display device 500A shown in FIG. 22(a), a protrusion 60A has a bottom surface matching the opening 14a in size. In the liquid crystal display device 500B shown in FIG. 22(b), a protrusion 60B has a bottom surface larger than the opening 14a and covers the solid portion (conductive film) 14b around the opening 14a. None of the protrusions 60, 60A and 60B has a solid portion 14b on any side surface 60s thereof. As a result, as shown in the respective figures, the equipotential lines EQ are generally flat above the solid portion 14b and drop at the opening 14a. Therefore, the side surfaces 60c of the protrusions 60A and 60B of the liquid crystal display devices 500A and 500B exert an orientation-regulating force in the same direction as that of the orientation-regulating force provided by the oblique electric field and stabilize the radially-inclined orientation, like the protrusion 60 of the liquid crystal display device 500.

By contrast, as show in FIG. 22(c), a protrusion 60C of the liquid crystal display device 500C has a bottom surface larger than the opening 14a and has a part of the solid portion 14b around the opening 14a provided on side surfaces 60s thereof. By the influence of the part of the solid portion 14b provided on the side surfaces 60s, the equipotential lines EQ are humped. The humped part of the equipotential lines EQ is inclined in the opposite direction to the part of the equipotential lines EQ dropping at the opening 14a. This indicates that an oblique electric field is produced in the direction opposite to the direction of the oblique electric field providing the radially-inclined orientation of the liquid crystal molecules 30a. In order to provide the side surfaces 60s with an orientation-regulating force in the same direction as the orientation-regulating direction provided by the oblique electric field, it is preferable that the solid portion (conductive film) 14b is not provided on the side surfaces 60s.

Next, with reference to FIG. 23, a cross-sectional structure of the protrusion 60 shown in FIG. 19(a) taken along line 23A-23A' in FIG. 19(a) will be described.

As described above, the protrusions 60 shown in FIG. 19(a) is formed so as to completely surround the unit solid portions 14b' in a generally circular manner. Therefore, as shown in FIG. 23, portions for connecting adjacent unit solid portions 14b' to one another (branches extending from each circle in four directions) are provided on the protrusions 60. Due to such a structure, in the step of depositing a conductive film for forming the solid portion 14b of the picture element electrode 14, the line may be disrupted on the protrusion 60, or may be exfoliated in a post-production step, with a high possibility.

Such a risk of disruption or exfoliation is eliminated in a liquid crystal display device 500D shown in FIG. 24(a) and FIG. 24(b). In the liquid crystal display device 500D, an independent protrusion 60D is completely accommodated in each opening 14a. With such a structure, the conductive film forming the solid portion 14b is provided on a flat surface of the substrate 11. Although the protrusions 60D are not formed so as to completely surround the unit solid portions 14b' in a generally circular manner, a generally circular liquid crystal domain is formed in positional correspondence with each unit solid portion 14b' and thus the radially-inclined orientation is stabilized like in the previous examples.

The effect of stabilizing the radially-inclined orientation is not limitedly provided only by a protrusion 60 formed in an opening 14a of the patterns described above. Substantially the same effect is provided by a protrusion 60 formed in an opening 14a of any pattern described in this embodiment. In order to provide a sufficient effect of stabilizing the orientation by the protrusions 60 against an external force, it is preferable that the protrusions 60 have a pattern (as viewed in a direction normal to a substrate) of surrounding a maximum possible area of the liquid crystal layer 30. For example, the effect of stabilizing the orientation by the protrusions 60 is greater with a positive pattern having circular unit solid portions 14b' than with a negative pattern having circular openings 14a.

In a liquid crystal display device according to the present invention, each picture element electrode has openings. This may cause a problem that the light utilization factor is lowered because a sufficient retardation change is not obtained due to a sufficient level of voltage not being applied across regions of liquid crystal layer corresponding to the openings. This can be solved by the following arrangement. A dielectric layer is provided on one surface of the electrode having the openings (upper electrode) which is farther from the liquid crystal layer, and another electrode (lower electrode) is provided so as to oppose at least a part of each opening of the upper electrode with the dielectric layer interposed therebetween (i.e., a two-layer electrode is provided). With such a structure, a sufficient level of voltage can be applied across the regions of the liquid crystal layer corresponding to the openings. As a result, the light utilization factor and the response characteristic can be improved.

FIG. 25(a) through FIG. 25(c) schematically show a cross-sectional structure of one picture element region of a liquid crystal display device 600. The liquid crystal display device 600 includes a picture element electrode (two-layer electrode) 16 including a lower electrode 12, an upper electrode 14 and a dielectric layer 13 provided therebetween. The upper electrode 14 of the picture element electrode 16 is substantially equivalent to the above-described picture element electrode 14, and has openings and solid portions of any of various shapes and arrangements. Hereinafter, the functions of the picture element electrode 16 having the two-layer structure will be described.

The picture element electrode 16 of the liquid crystal display device 600 has a plurality of openings 14a (including 14a1 and 14a2). FIG. 25(a) schematically shows an orientation of the liquid crystal molecules 30a in the liquid crystal layer 30 in the absence of an applied voltage (OFF state). FIG. 25(b) schematically shows a state where the orientation has just started to change (initial ON state) in accordance with the voltage applied across the liquid crystal layer 30. FIG. 25(c) schematically shows a state where the orientation of the liquid crystal molecules 30a, which has been changing in accordance with the applied voltage, has reached a steady state. In the example shown in FIG. 25, the lower electrode 12, provided so as to oppose the openings 14a1 and 14a2 with the dielectric layer 13 interposed therebetween, overlaps the openings 14a1 and 14a2 and also exists in positional correspondence with an area between the openings 14a1 and 14a2 (where the upper electrode 14 exists). The lower electrode 12 is not limited to being arranged in this manner. The relationship between the area size of the opening 14a1 or 14a2 and the area size of the lower electrode 12 may be that the area size of the lower electrode 12=the area size of the opening 14a, or the area size of the lower electrode 12<the area size of the opening 14a. Namely, the lower electrode 12 only needs to be provided so as to oppose at least a part of the opening 14a with the dielectric layer 13 interposed therebetween. In a structure where the lower electrode 12 is provided in the opening 14, there may be an area including neither the lower electrode 12 nor the upper electrode 14 (a gap area) in a plane viewed in a direction normal to the substrate 11. In this case, a sufficiently high voltage may not be applied across a region of the liquid crystal layer 30 corresponding to the gap area. In order to stabilize the orientation in the liquid crystal layer 30, the width of the gap area is preferably sufficiently small, typically equal to or less than about 4 μm. A part of the lower electrode 12 provided in positional correspondence with the conductive film of the upper electrode 14 with the dielectric layer 13 interposed therebetween does not substantially influence the electric field to be applied across the liquid crystal layer 30. Therefore, the lower electrode 12 does not need to be specifically patterned, but causes no problem if patterned.

As shown in FIG. 25(a), when the picture element electrode 16 and the counter electrode 22 are at the same potential (a state where no voltage is applied across the liquid crystal layer 30), the liquid crystal molecules 30a in the picture element region are oriented vertical to the surfaces of the substrates 11 and 21. Herein, the upper electrode 14 and the lower electrode 12 of the picture element electrode 16 have an equal potential for the sake of simplicity.

When a voltage is applied across the liquid crystal layer 30, a potential gradient represented by the equipotential lines EQ shown in FIG. 25(b) is produced. In a region of the liquid crystal layer 30 which is between the upper electrode 14 of the picture element electrode 14 and the counter electrode 22, a uniform potential gradient represented by the equipotential lines EQ parallel to the surfaces of the upper electrode 14 and the counter electrode 22 is produced. In regions of the liquid crystal layer 30 which are above the openings 14a1 and 14a2 of the upper electrode 14, a potential gradient corresponding to the potential difference between the lower electrode 12 and the counter electrode 22 is produced. Since the potential gradient produced in the liquid crystal layer 30 at this point is influenced by the voltage drop caused by the dielectric layer 13, the equipotential lines EQ in the liquid crystal layer 30 drop at the openings 14a1 and 14a2 (i.e., a plurality of "troughs" are formed in the equipotential lines EQ). The lower electrode 12 is provided in positional correspondence with the openings 14a1 and 14a2 with the dielectric layer 13 interposed therebetween. Therefore, in regions of the liquid crystal layer 30 corresponding to the centers of the openings 14a1 and 14a2 and the vicinity thereof, a potential gradient represented by the equipotential lines EQ parallel to the surfaces of the upper electrode 14 and the counter electrode 22 is produced ("bottom of the troughs" of the equipotential lines EQ). In a region of the liquid crystal layer 30 above an edge portion EG of the opening 14a1 or 14a2 (a peripheral portion within the opening including an external boundary of the opening), an oblique electric field represented by an inclined part of the equipotential lines EQ is produced.

As is clear from a comparison between FIG. 25(a) and FIG. 2(a), the liquid crystal display device 600 has the lower electrode 12. Owing to this structure, a sufficient level of voltage can act even upon the liquid crystal molecules 30a in a liquid crystal domain in a region corresponding to each opening 14a.

Upon the liquid crystal layer 30a having a negative dielectric anisotropy, a torque acts to direct the axial direction of such liquid crystal molecules 30a to be parallel to the equipotential lines EQ. Accordingly, as represented by the arrows in FIG. 25(b), the liquid crystal molecules 30a above the right edge portion EG of each opening 14a incline (rotate) clockwise, and the liquid crystal molecules 30a above the left edge portion EG of each opening 14a incline (rotate) counterclockwise. As a result, the liquid crystal molecules 30a above the edge portions EG are oriented parallel to the corresponding portions of the equipotential lines EQ.

In FIG. 25(b), an electric field (oblique electric field) represented by a part of the equipotential lines EQ inclined with respect to the axial direction of the liquid crystal molecules 30a is produced in the edge portions EG of the openings 14a1 and 14a2 in the liquid crystal display device 600. When this occurs, as shown in FIG. 3(b), the liquid crystal molecules 30a are inclined in whichever direction that requires less inclination for the liquid crystal molecules 30a to be parallel to the equipotential line EQ (in the counterclockwise direction in the example of the figure). As shown in FIG. 3(c), a liquid crystal molecule 30a, located in a region where the electric field represented by a part of the equipotential line EQ vertical to the axial direction of the liquid crystal molecule 30a is produced, is inclined in the same direction as that of the liquid crystal molecules 30a on the inclined part of the equipotential line EQ, such that the orientation of the former liquid crystal molecule 30a is continuous (in conformity) with the orientation of the latter liquid crystal molecules 30a.

As described above, the liquid crystal molecules 30a change the orientation thereof, starting from those located on the inclined part of the equipotential lines EQ, and reach a steady state. When this occurs, as schematically shown in FIG. 25(c), an inclined orientation (radially-inclined orientation) symmetric about the center SA of each of the openings 14a1 and 14a2 is formed. The liquid crystal molecules 30a above an area of the upper electrode 14 between the adjacent openings 14a1 and 14a2 are also inclined so as to be oriented continuously (in conformity) with the liquid crystal molecules 30a above the edge portions of the openings 14a1 and 14a2. The liquid crystal molecules 30a located above a region equally distanced from an edge portion EG of the opening 14a1 and the adjacent edge portion EG of the opening 14a2 are influenced substantially equally by the respective orientations of the liquid crystal molecules 30a above such edge portions EG. Therefore, such liquid crystal molecules 30a remain in a vertical orientation state, like the liquid crystal molecules 30a located above the center of each of the openings 14a1 and 14a2. As a result, a region of the liquid crystal layer above the upper electrode 14 between the adjacent openings 14a1 and 14a2 obtains a radially-inclined orientation. The inclination, direction is different between a region of liquid crystal layer corresponding to each of the openings 14a1 and 14a2 and a region of the liquid crystal layer corresponding to an area between the openings 14a1 and 14a2. This will be described regarding the liquid crystal molecules 30a at the center of each radially-inclined orientation in FIG. 25(c). The liquid crystal molecules 30a above the openings 14a1 and 14a2 are oriented in the shape of a cone that spreads toward the counter electrode, whereas the liquid crystal molecules 30a above the inter-opening areas are oriented in the shape of a cone that spreads toward the upper electrode 14. These radially-inclined orientations are both formed so as to be in conformity with the inclination direction of the liquid crystal molecules 30a above the edge portions, and thus are continuous with each other.

As described above, when a voltage is applied across the liquid crystal layer 30, the liquid crystal molecules 30a incline, starting from those above the edge portions EG of the plurality of openings 14a1 and 14a2 in the upper electrode 14. Then, the surrounding liquid crystal molecules 30a also incline to be in conformity with the liquid crystal molecules 30a above the edge portions EG. Thus, a radially-inclined orientation is formed. As the number of the openings 14a in one picture element region is larger, the number of the liquid crystal molecules 30a initially starting to incline in response to the electric field is larger, and thus the time required for forming a radially-inclined orientation in the entire picture element region is shorter. Namely, the response speed of the liquid crystal display device can be improved by increasing the number of the openings 14a in the picture element electrode 16 in each picture element region. Where the picture element electrode 16 has a two-layer structure including an upper electrode 14 and a lower electrode 12, even the liquid crystal molecules in positional correspondence with the openings 14a can be acted upon by a sufficient level of electric field and thus the response speed of the liquid crystal display device is improved.

When the picture element electrode 16 of the above-described two-layer structure is adopted, the structure shown in FIG. 26 can be used, for example. In FIG. 26, the storage capacitor electrode 8 acts as a part of the lower electrode 12, and the second insulating layer 7 acts as the dielectric layer 13.

A liquid crystal display device including the picture element electrode 16 of the two-layer structure is used as a transmission-reflection combination type liquid crystal display device as well as a transmission type or reflection type liquid crystal display device (see, for example, Japanese Laid-Open Patent Publication No. 11-101992).

A transmission-reflection combination type liquid crystal display device (hereinafter, referred to as a "combination type liquid crystal display device") refers to a liquid crystal display device having a transmission area T for providing a display in a transmission mode and a reflection area R providing a display in a reflection mode in one picture element region (see FIG. 25(a)). The transmission area T and the reflection area R are typically defined by a transmission electrode and a reflection electrode, respectively. The reflection area may be defined by a combination of a reflection layer and a transmission electrode, instead of by a reflection electrode.

The combination type liquid crystal display device can provide a display only in the reflection mode or only in the transmission mode in a switchable manner, or can provide a display in both modes simultaneously. Accordingly, the display can provided in the reflection mode in an environment with bright ambient light, and in the transmission mode in a dark environment. When the display is provided in both modes simultaneously, a reduction in the contrast ratio, which occurs when the transmission type liquid crystal display device is used in an environment with bright ambient light (in a state where fluorescent light or sunlight is directly incident on a display surface at a specific angle), can be suppressed. A transmission-reflection combination type liquid crystal display device can thus compensate for the defect of a transmission type liquid crystal display device. The area size ratio between the transmission area T and the reflection area R can be appropriately set in accordance with the use of the liquid crystal display device. For a liquid crystal display device used only as a transmission type device, the area size ratio of the reflection area can be reduced to the extent that the reflection mode display cannot be provided. Still, the above-described defect of a transmission type liquid crystal display device can be compensated for.

As shown in FIG. 25(a), the liquid crystal display device 600 can be used as a combination type device by, for example, providing a reflection electrode as the upper electrode 14 and a transparent electrode as the lower electrode 12. In order to match the voltage-transmittance characteristic between the reflection mode display and the transmission mode display, it is preferable to adjust the thickness of the liquid crystal layer 30 in the reflection area R and the thickness of the liquid crystal layer 30 in the transmission area R or to adjust the level of voltage applied to the upper electrode 14 and the level of voltage applied to the lower electrode 12.

(Arrangement of the Polarization Plate and the Phase Plate)

A so-called vertical orientation type liquid crystal display device including a liquid crystal layer, in which liquid crystal molecules having a negative dielectric anisotropy are in a vertical orientation state in the absence of an applied voltage, can provide a display in any of various display modes. For example, a birefringence mode can be used, in which a display is provided by controlling the birefringence of the liquid crystal layer using the electric field. In addition, an optical rotation mode, or a combination of the optical rotation mode and the birefringence mode, can be used. Any of the liquid crystal display devices described above can be used as a birefringence mode liquid crystal display device by providing a pair of polarization plates outside the pair of substrates (for example, by providing the pair of polarization plates on the surfaces of the TFT substrate and the counter substrate, the surfaces being farther from the liquid crystal layer 30). When necessary, a phase compensation element (typically, a phase plate) may be provided. A liquid crystal display device providing a bright display can be obtained using generally circular polarization.

Other Embodiments

So far, the present invention has been described by way of liquid crystal display devices having an orientation-regulating structure for forming a liquid crystal domain taking a radially-inclined orientation (an electrode structure having a unit solid portion and an opening). The present invention is not limited to this, and is widely applicable to any liquid crystal display device which includes a vertical orientation type liquid crystal layer having a vertical orientation state in the absence of an applied voltage and performs orientation regulation using an electrode structure having an opening or a slit. The present invention can increase the effective numerical aperture of such a liquid crystal display device.

With reference to FIG. 27(a) and FIG. 27(b), another liquid crystal display device 700 according to the present invention will be described. The liquid crystal display device 700 is of a so-called MVA (Multi-domain Vertically Aligned) type. FIG. 27(a) is a plan view of the liquid crystal display device 700 viewed in a direction normal to a substrate, and FIG. 27(b) is a cross-sectional view thereof taken along line 27B-27B' in FIG. 27(a). FIG. 27(b) shows a state where a voltage is applied across the liquid crystal layer.

The liquid crystal display device 700 includes an active matrix substrate (TFT substrate) 700a, a counter substrate (color filter substrate) 700b, and a vertical orientation type liquid crystal layer 30 provided between the TFT substrate 700a and the counter substrate 700b.

Liquid crystal molecules 30a included in the liquid crystal layer 30 have a negative dielectric anisotropy. When no voltage is applied across the liquid crystal layer 30, the liquid crystal molecules 30a are oriented vertical to a surface of, and by virtue of, a vertical alignment film (not shown) provided on one surface of each of the TFT substrate 700a and the counter substrate 700b, the surface being closer to the liquid crystal layer 30.

The TFT substrate 700a of the liquid crystal display device 700 includes a transparent substrate (for example, a glass substrate) 11 and a picture element electrode 19 provided on a surface thereof. The counter substrate 700b includes a transparent substrate (for example, a glass substrate) 21 and a counter electrode 22 provided on a surface thereof. The orientation in the liquid crystal layer 30 in each picture element region is changed in accordance with the voltage applied between the picture element electrode 19 and the counter electrode 22, which are arranged to oppose each other with the liquid crystal layer 30 interposed therebetween. A display is realized by utilizing a phenomenon that the polarization state or amount of light passing through the liquid crystal layer 30 changes along with the change in the orientation in the liquid crystal layer 30.

As shown in FIG. 27(a), the picture element electrode 19 of the TFT substrate 700a has a plurality of slits 19a. In the upper half of the picture element, the plurality of slits 19a each extend from the upper left to the lower right and are parallel to each other at a predetermined interval. In the lower half of the picture element, the plurality of slits 19a each extend from the lower left to the upper right and are parallel to each other at a predetermined interval.

When a voltage is applied between the picture element electrode 19 and the counter electrode 22, an oblique electric field represented by an inclined part of equipotential lines EQ is produced in a region of the liquid crystal layer 30 which is above each edge portion of each slit 19a of the picture element electrode 19 (a peripheral portion within the slit 19a including an external boundary of the slit 19a). Accordingly, upon application of a voltage, the liquid crystal molecules 30a having a negative dielectric anisotropy, which are in a vertical orientation state in the absence of an applied voltage, are inclined in the inclination direction of the oblique electric field produced in each edge portion of each slit 19a. Namely, when a voltage is applied between the picture element electrode 19 and the counter electrode 22, the liquid crystal layer 30 is orientation-regulated by the oblique electric field produced in the edge portions of the plurality of slits 19a.

In the liquid crystal display device 700, the liquid crystal layer 30 is orientation-regulated by the oblique electric field produced in the edge portions of the slits 19a. As a result, upon application of a voltage, the liquid crystal molecules 30a in each picture element region are oriented in four directions crossing perpendicular to each side of the slits 19a (in FIG. 27(a), in the upper right direction, the lower right direction, the upper left direction, and the lower left direction). In other words, in the liquid crystal display device 700, the picture element region is in a multi-domain state. Owing to this, the liquid crystal display device 700 has a superb viewing angle characteristic.

The counter substrate 700b of the liquid crystal display device 700 has a plurality of ribs 29 on one surface thereof which is closer to the liquid crystal layer 30. The direction in which the ribs 29 extend matches the direction in which the slits 19a extend. The ribs 29 are located between two adjacent slits 19a.

A surface of each rib 29 has a vertical alignment power (typically, a vertical alignment film (not shown) is provided so as to cover the rib 29). The liquid crystal molecules 30a are oriented generally vertical to, and by the anchoring effect of, inclined side surfaces 29a of the rib 29. When a voltage is applied across the liquid crystal layer 30 in such a state, the other liquid crystal molecules 30a in the vicinity of the rib 29a are inclined in conformity with the inclination direction of the liquid crystal molecules 30a provided on the inclined side surfaces 29a caused by the anchoring effect thereof.

The orientation-regulating direction provided by the oblique electric field produced in each edge portion of the slit 19a of the picture element electrode 19 matches the orientation-regulating direction provided by the rib 29. Therefore, the orientation in the liquid crystal layer, which is placed into a multi-domain state by the oblique electric field upon application of a voltage, is further stabilized by the rib 29. In this embodiment, the counter substrate 700b has a plurality of ribs 29 provided in positional correspondence with areas between the plurality of slits 19a of the picture element electrode 19. Alternatively, the counter electrode 22 may have a plurality of slits provided in positional correspondence with areas between the plurality of slits 19a of the picture element electrode 19.

The TFT substrate 700a of the liquid crystal display device 700 includes a storage capacitor 44. Specifically, the storage capacitor 44 includes a storage capacitor line 6, a storage capacitor electrode 8 opposing the storage capacitor line 6 and electrically connected to a drain electrode of a thin film transistor (not shown), and a first insulating layer (first inter-layer insulating layer) 3 provided therebetween.

The storage capacitor line 6 includes a line stem 6a extending generally parallel to a scanning line (not shown here) and four line branches 6b branched from the line stem 6a and extending along the slits 19a. The storage capacitor electrode 8 includes an electrode stem 8a opposing the line stem 6a with the first insulating layer 3 interposed therebetween and electrode branches 8b branched from the electrode stem 8a and opposing the line branches 6b with the first insulating layer 3 interposed therebetween.

A second insulating layer (second inter-layer insulating layer) 7 is provided so as to cover the above-mentioned lines and the thin film transistor. The picture element electrode 19 is provided on the second insulating layer 7. In this embodiment, the second insulating layer 7 is a thick film formed of a resin material.

As shown in FIG. 27(a) and FIG. 27(b), in the liquid crystal display device 700, a part of the storage capacitor 44 overlaps the slit 19a of the picture element electrode 19. Specifically, a part of the line stem 6a, a part of the electrode stem 8a, the line branch 6b and the electrode branch 8b are located to overlap the slit 19a, and thus a part of the storage capacitor 44 overlaps the slit 19a.

Owing to such a structure, the effective numerical aperture (transmittance) is suppressed from being lowered due to the storage capacitor 44 typically including a light-shielding material, and the size of an area contributing to the display (the area of the picture element electrode 19 where the conductive film is provided) can be increased. Thus, a bright display is realized.

In this embodiment, the TFT substrate 700a includes the second insulating layer 7 for covering the thin film transistor and the storage capacitor electrode 8, and the picture element electrode 19 is provided on the second insulating layer 7. Owing to such a structure, the picture element electrode 19 can be provided so as to partially overlap the thin film transistor, the scanning line, a signal line and the like. Thus, the numerical aperture can be further increased.

In order to produce an oblique electric field having a sufficient strength to perform orientation regulation in the edge portions of the slit 19a, the second insulating layer 7 is preferably a thick film as in this embodiment. The storage capacitor electrode 8 included in the storage capacitor 44 is electrically connected to the drain electrode of the thin film transistor, and has substantially the same potential as that of the conductive film of the picture element electrode 19. Therefore, if a part of the storage capacitor electrode 8 overlaps the slit 19a, the equipotential line EQ produced upon application of a voltage does not sufficiently drop at the slit 19a. As a result, a sufficiently strong oblique electric field may not be produced in the edge portions of the slit 19a.

Where the second insulating layer 7 is a thick film, the voltage drop caused by the second insulating layer 7 can be sufficiently large and thus the equipotential line EQ can sufficiently drop at the slit 19a. As a result, a sufficiently strong oblique electric field can be produced in the edge portions of the slit 19a. Also where the second insulating layer 7 is a thick film, one surface of the second insulating layer 7 which is closer to the liquid crystal layer 30 can be substantially flat. This prevents the picture element electrode 19 provided on this surface from being stepped.

Specifically, in order to obtain a sufficiently stable orientation-regulating force, the second insulating layer 7 has a thickness of preferably 1 μm or greater, and more preferably 2.5 μm or greater. The second insulating layer 7 is easily formed to be a thick film by using a resin material (for example, a photosensitive transparent resin material such as an acrylic resin).

In order to sufficiently increase the numerical aperture, it is preferable that a largest possible part of the storage capacitor 44 overlaps the slit 19a of the picture element electrode 19. Specifically, preferably at least ¼ of, more preferably at least ½ of, and still more preferably almost the entirety of, the storage capacitor 44 overlaps the slit 19a. In this embodiment, the storage capacitor line 6 and the storage capacitor electrode 8 respectively include the line branches 6b and the electrode branches 8b extending along the slits 19b. Where the storage capacitor line 6 and the storage capacitor electrode 8 have such a branch structure, a larger part of the storage capacitor 44 can overlap the slit 19a (or the opening). Thus, the liquid crystal display device can be designed to have a higher numerical aperture.

INDUSTRIAL APPLICABILITY

According to the present invention, a liquid crystal display device having a wide viewing angle characteristic, providing a high display quality, and realizing a bright display can be provided.

According to the present invention, liquid crystal domains taking a radially-inclined orientation are formed stably and highly continuously. Therefore, the display quality of a conventional liquid crystal display device having a wide viewing angle characteristic can be further improved.

Moreover, at least a part of a storage capacitor is located in a region where a solid portion of the picture element electrode is not provided. Therefore, the effective numerical aperture (transmittance) is suppressed from being lowered due to the storage capacitor typically including a light-shielding material, and the size of an area contributing to the display can be increased. Thus, a bright display is realized.

Also, according to the present invention, at least part of a storage capacitor overlaps an opening or a slit of the picture element electrode. Therefore, the effective numerical aperture (transmittance) is suppressed from being lowered due to the storage capacitor, and a bright display can be realized.

The invention claimed is:

1. A liquid crystal display device, comprising:
a first substrate, a second substrate, and a liquid crystal layer provided between the first substrate and the second substrate;
the liquid crystal display device having a plurality of picture element regions;
wherein:
the first substrate includes a picture element electrode provided on the side of the liquid crystal layer, the picture element electrode being provided in each of the plurality of picture element regions, and a switching element electrically connected to the picture element electrode;
the second substrate includes a counter electrode opposing the picture element electrode with the liquid crystal layer interposed therebetween; and
in each of the plurality of picture element regions, the picture element electrode includes a solid portion including a plurality of unit solid portions; and the liquid crystal layer is in a vertical orientation state when no voltage is applied between the picture element electrode and the counter electrode, and when a voltage is applied between the picture element electrode and the counter electrode, forms a liquid crystal domain taking a radially-inclined orientation in a region corresponding to each of the plurality of unit solid portions by an oblique electric field produced in the vicinity of each of the plurality of unit solid portions of the picture element electrode;
the liquid crystal display device further comprising, in each of the plurality of picture element regions, a storage capacitor connected electrically in parallel to a liquid crystal capacitor which includes the picture element electrode, the counter electrode, and the liquid crystal layer; wherein:

in each of the plurality of picture element regions, the first substrate has an area where no solid portion of the picture element electrode is provided;
at least a part of the storage capacitor is located in the area of the first substrate where no solid portion is provided;
the switching element is a thin film transistor;
the storage capacitor includes a storage capacitor line, a storage capacitor electrode opposing the storage capacitor line and electrically connected to a drain electrode of the thin film transistor, and a first insulating layer provided between the storage capacitor line and the storage capacitor electrode;
the first substrate further includes a second insulating layer for covering at least the thin film transistor and the storage capacitor electrode;
the picture element electrode is provided on the second insulating layer;
the second insulating layer is formed of a resin material; and
the second insulating layer has a thickness of 1 µm or greater.

2. The liquid crystal display device of claim 1, wherein at least a part of the storage capacitor line, at least a part of the storage capacitor electrode, and at least a part of the first insulating layer are located in the area.

3. The liquid crystal display device of claim 1, wherein the first substrate includes a scanning line electrically connected to a gate electrode of the thin film transistor and a signal line electrically connected to a source electrode of the thin film transistor.

4. The liquid crystal display device of claim 3, wherein:
the storage capacitor line includes at least one line stem extending generally parallel to the scanning line and a line branch branched from the at least one line stem; and
the storage capacitor electrode includes at least one electrode stem opposing the at least one line stem with the first insulating layer interposed therebetween and an electrode branch branched from the at least one electrode stem.

5. The liquid crystal display device of claim 4, wherein the line branch and the electrode branch are branched so as to overlap a central portion of one of the plurality of unit solid portions or the vicinity thereof.

6. The liquid crystal display device of claim 4, wherein the at least one line stem is a plurality of line stems, and the at least one electrode stem is a plurality of electrode stems.

7. The liquid crystal display device of claim 1, wherein the plurality of unit solid portions each have a shape having rotational symmetry.

8. The liquid crystal display device of claim 1, wherein the plurality of unit solid portions each have a generally circular shape.

9. The liquid crystal display device of claim 1, wherein the plurality of unit solid portions each have a generally rectangular shape with generally arc-shaped corners.

10. The liquid crystal display device of claim 1, wherein the plurality of unit solid portions each have a shape with acute corners.

11. The liquid crystal display device of claim 1, wherein the plurality of unit solid portions have substantially the same shape and substantially the same size as one another, and form at least one unit lattice arranged to have rotational symmetry.

12. The liquid crystal display device of claim 1, wherein the picture element electrode further has at least one opening, and the liquid crystal layer forms a liquid crystal domain taking a radially-inclined orientation in a region corresponding to the at least one opening by the oblique electric field when a voltage is applied between the picture element electrode and the counter electrode.

13. The liquid crystal display device of claim 12, wherein the at least one opening includes a plurality of openings having substantially the same shape and substantially the same size as one another, and at least some of the plurality of openings forms at least one unit lattice arrange to have rotational symmetry.

14. The liquid crystal display device of claim 13, wherein each of the at least the some of the plurality of openings has a shape having rotational symmetry.

15. The liquid crystal display device of claim 13, wherein each of the at least the some of the plurality of openings has a generally circular shape.

16. The liquid crystal display device of claim 13, wherein in each of the plurality of picture element regions, a sum of area sizes of the plurality of openings of the picture element electrode is smaller than an area size of the solid portion of the picture element electrode.

17. The liquid crystal display device of claim 13, further comprising a protrusion provided in each of the plurality of openings of the picture element electrode, wherein the protrusion has the same cross-sectional shape as that of the plurality of openings in a planar direction, and a side surface of the protrusion exerts an orientation-regulating force acting upon the liquid crystal molecules in the liquid crystal layer in the same direction as an orientation-regulating direction provided by the oblique electric field.

18. The liquid crystal display device of claim 1, wherein the second substrate has an orientation-regulating structure in an area corresponding to each of the plurality of unit solid portions, the orientation-regulating structure exerting an orientation-regulating force for placing the liquid crystal molecules in the liquid crystal layer into a radially-inclined orientation at least in a state where a voltage is applied between the picture element electrode and the counter electrode.

19. The liquid crystal display device of claim 18, wherein the orientation-regulating structure is provided in an area corresponding to a central portion of each of the plurality of unit solid portions or the vicinity thereof.

20. The liquid crystal display device of claim 18, wherein in the liquid crystal domain formed in correspondence with each of the plurality of unit solid portions, the orientation-regulating direction provided by the orientation-regulating structure is in conformity with the direction of the radially-inclined orientation provided by the oblique electric field.

21. The liquid crystal display device of claim 18, wherein the orientation-regulating structure exerts an orientation-regulating force even in a state where no voltage is applied between the picture element electrode and the counter electrode.

22. The liquid crystal display device of claim 18, wherein the orientation-regulating structure is a protrusion included in the counter substrate and protruding toward the liquid crystal layer.

23. The liquid crystal display device of claim 21, wherein a part of the storage capacitor overlaps the orientation-regulating structure.

24. The liquid crystal display device of claim 1, wherein the liquid crystal domain takes a spiral radially-inclined orientation.

25. A liquid crystal display device, comprising:
a first substrate, a second substrate, and a liquid crystal layer provided between the first substrate and the second substrate;
the liquid crystal display device having a plurality of picture element regions;
wherein:
the first substrate includes a picture element electrode provided on the side of the liquid crystal layer, the picture element electrode being provided in each of the plurality of picture element regions, and a switching element electrically connected to the picture element electrode;
the second substrate includes a counter electrode opposing the picture element electrode with the liquid crystal layer interposed therebetween; and
in each of the plurality of picture element regions, the picture element electrode has at least one opening or slit; and the liquid crystal layer is in a vertical orientation state when no voltage is applied between the picture element electrode and the counter electrode, and when a voltage is applied between the picture element electrode and the counter electrode, is orientation-regulated by an oblique electric field produced in an edge portion of the at least one opening or slit of the picture element electrode;
the liquid crystal display device further comprising, in each of the plurality of picture element regions, a storage capacitor connected electrically in parallel to a liquid crystal capacitor which includes the picture element electrode, the counter electrode, and the liquid crystal layer; wherein:
at least a part of the storage capacitor overlaps the at least one opening or slit of the picture element electrode;
the switching element is a thin film transistor;
the storage capacitor includes a storage capacitor line, a storage capacitor electrode opposing the storage capacitor line and electrically connected to a drain electrode of the thin film transistor, and a first insulating layer provided between the storage capacitor line and the storage capacitor electrode;
the first substrate further includes a second insulating layer for covering at least the thin film transistor and the storage capacitor electrode;
the picture element electrode is provided on the second insulating layer;
the second insulating layer is formed of a resin material; and
the second insulating layer has a thickness of 1 μm or greater.

* * * * *